United States Patent

Arai et al.

[11] Patent Number: 6,118,749
[45] Date of Patent: Sep. 12, 2000

[54] METHOD FOR RECORDING/ REPRODUCING OPTICAL INFORMATION RECORDING MEDIUM, OPTICAL PICKUP APPARATUS, OBJECTIVE LENS AND DESIGN METHOD OF OBJECTIVE LENS

[75] Inventors: Norikazu Arai; Hiroyuki Yamazaki; Shinichiro Saito, all of Hachioji, Japan

[73] Assignee: Konica Corporation, Tokyo, Japan

[21] Appl. No.: 09/478,514

[22] Filed: Jan. 6, 2000

Related U.S. Application Data

[62] Division of application No. 08/953,683, Oct. 17, 1997.

[30] Foreign Application Priority Data

| Oct. 23, 1996 | [JP] | Japan | 8-280750 |
| Feb. 26, 1997 | [JP] | Japan | 9-042222 |
| Jul. 23, 1997 | [JP] | Japan | 9-197076 |

[51] Int. Cl.[7] .................................................. G11B 7/12
[52] U.S. Cl. .................... 369/112; 369/44.12; 369/93; 369/44.23
[58] Field of Search .................... 369/112, 110, 369/103, 109, 93, 94, 44.11, 44.12, 44.14, 44.23, 44.37, 47, 48, 54, 58

[56] References Cited

U.S. PATENT DOCUMENTS

| 5,446,565 | 8/1995 | Komma et al. | 369/94 X |
| 5,835,283 | 11/1998 | Yamanaka | 359/719 |
| 5,966,364 | 10/1999 | Kamatani | 369/94 X |

FOREIGN PATENT DOCUMENTS

| 62124504 | 5/1987 | European Pat. Off. . |
| 0 367 878 | 5/1990 | European Pat. Off. . |
| 0 457 553A2 | 11/1991 | European Pat. Off. . |
| 0 621 5406 | 8/1994 | European Pat. Off. . |
| 0 730 2437 | 11/1995 | European Pat. Off. . |
| 0 806 2493 | 3/1996 | European Pat. Off. . |
| 0 731 458A1 | 9/1996 | European Pat. Off. . |
| 0 785 543A2 | 7/1997 | European Pat. Off. . |
| 97118080 | 7/1998 | European Pat. Off. . |
| 7-57271 | 3/1995 | Japan . |

Primary Examiner—Muhammad Edun
Attorney, Agent, or Firm—Finnegan, Henderson, Farabow, Garrett & Dunner, L.L.P.

[57] ABSTRACT

An optical pickup apparatus includes a light source for emitting a light flux; and a converging optical system having a first, second, and third divided surface, which are divided in the order named from the vicinity of an optical axis of the converging optical system, for converging the light flux emitted from the light source, wherein a beam spot passing through the first and third divided surfaces is formed onto a first optical information recording medium having a transparent substrate whose thickness is t1, and a beam spot passing through the first and second surfaces is formed onto a second optical information recording medium having a transparent substrate whose thickness is t2 that is more than t1. The optical pickup apparatus further includes an image sensor for receiving a light flux reflected from the first and/or second optical information recording medium.

126 Claims, 55 Drawing Sheets defocus= 0.0 (μm)

defocus= +8.7 (μm)

SPHERICAL ABERRATION

SPHERICAL ABERRATION defocus= +0.3 ($\mu$m)

defocus= +10.5 ($\mu$m)

SPHERICAL ABERRATION

SPHERICAL ABERRATION

SPHERICAL ABERRATION

SPHERICAL ABERRATION defocus= +0.2(μm)

defocus= +11.8(μm)

defocus= +3.0 (μm)

defocus= +12.2 (μm)

defocus= +0.3(μm)

defocus= +9.9(μm)

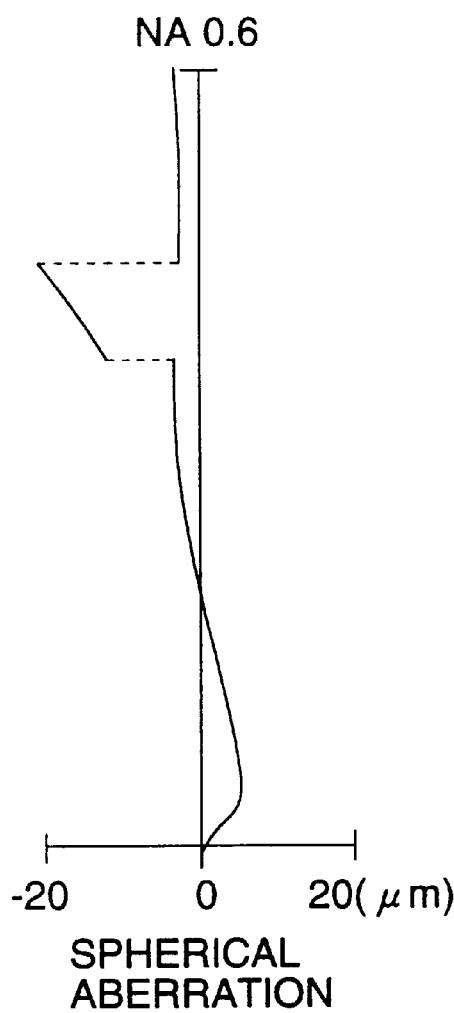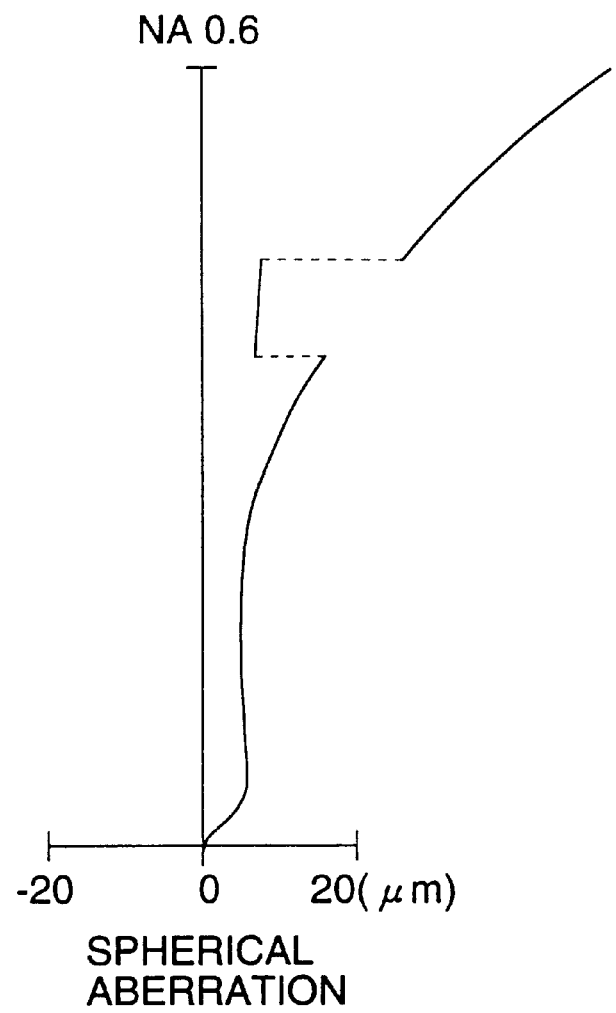

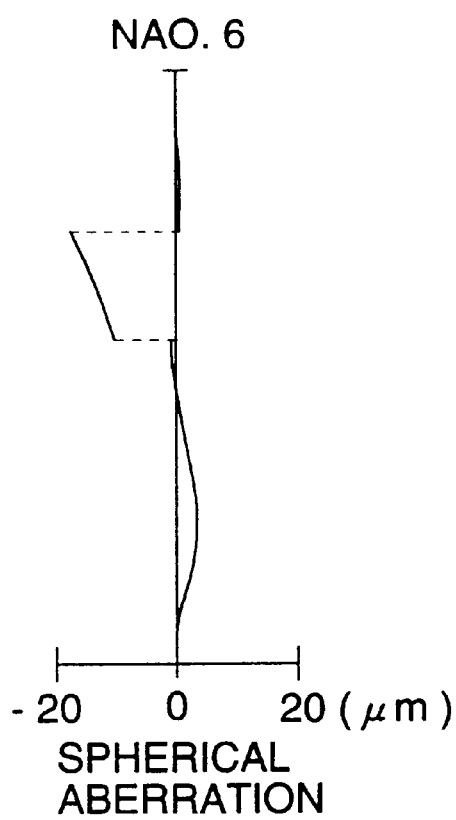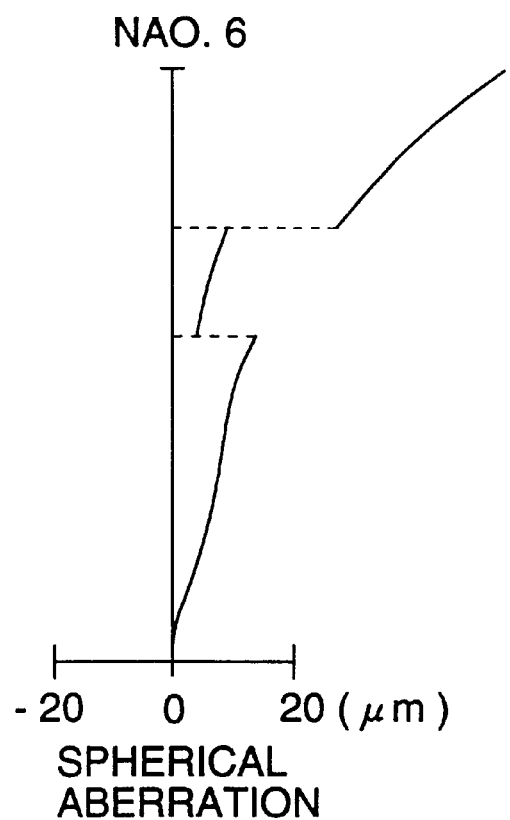

defocus= +0.3 (μm)

defocus= +9.7 (μm)

METHOD FOR RECORDING/ REPRODUCING OPTICAL INFORMATION RECORDING MEDIUM, OPTICAL PICKUP APPARATUS, OBJECTIVE LENS AND DESIGN METHOD OF OBJECTIVE LENS

This is a division of application Ser. No. 08/953,683, filed Oct. 17, 1997, which is incorporated herein by reference.

BACKGROUND OF THE INVENTION

The present invention relates to a method for recording/ reproducing optical information recording medium wherein a light flux emitted from a light source is converged on an information recording surface by a light-converging optical system, and information is recorded on an optical information recording medium to be reproduced, or information on the information recording surface is reproduced, an optical pickup apparatus, an objective lens used for the foregoing, and a design method of the objective lens.

Recently, in association with practical use of a short wavelength red semiconductor laser, there has been advanced development of DVD (digital video disk, or digital versatile disk) representing an optical information recording medium which is the same in size as CD (compact disk) that is a conventional optical information recording medium (optical disk) and has higher capacity and higher density. In this DVD, numerical aperture NA of the objective lens on the optical disk side is 0.6 when the short wavelength semiconductor laser of 635 nm is used. Incidentally, in the DVD, a track pitch is 0.74 μm and the shortest pit length is 0.4 μm, which is less than a half of track pitch of 1.6 μm and shortest pit length of 0.83 μm of CD, representing that the DVD is of higher density. In addition to the CD and DVD mentioned above, optical disks of various standards, such as, for example, CD-R (recordable compact disk), LD (laser disk), MD (mini-disk), and MO (magneto-optical disk) have also been commercialized and have been spread. Table 1 shows a transparent substrate thickness and its necessary numerical aperture for each of various optical disks.

TABLE 1

| Optical disk | Transparent substrate thickness (mm) | Necessary numerical aperture NA (light source wavelength λ nm) |
|---|---|---|
| CD, CD-R (only for reproducing) | 1.20 | 0.45(λ = 780) |
| CD-R (recording and reproducing) | 1.20 | 0.50(λ = 780) |
| LD | 1.25 | 0.50(λ = 780) |
| MD | 1.20 | 0.45(λ = 780) |
| MO(ISO 3.5 inch 230 NB) | 1.20 | 0.55(λ = 780) |
| MO(ISO 3.5 inch 640 MB) | 1.20 | 0.55(λ = 680) |
| DVD | 0.60 | 0.60(λ = 635) |

Incidentally, for the CD-R, light source wavelength λ is required to be 780 (μm), but for the other optical disks, it is possible to use light sources having wavelengths other than those shown in Table 1, and in this case, necessary numerical aperture NA can be found in accordance with wavelength λ of the light source to be used. For example, in the case of CD, necessary numerical aperture NA is approximated to λ (μm)/1.73 and in the case of DVD, necessary numerical aperture NA is approximated to λ (μm)/1.06.

Now, it is an age where various optical disks having different sizes, substrate thickness, recording densities, and wavelengths to be used exist in the market as stated above, and optical pickup apparatuses capable of handling various optical disks have been proposed.

As one of them, there has been proposed an optical pickup apparatus wherein a light-converging optical system capable of working with each of different optical disks is provided and the light-converging optical system is switched depending on an optical disk to be reproduced. However, in this optical pickup apparatus, plural light-converging optical systems are needed, resulting in a cost increase, and a driving mechanism for switching the light-converging optical system is needed, resulting in a complicated apparatus, and its switching accuracy is required, which is not preferable.

Therefore, there have been proposed various optical pickup apparatuses each employing a single light-converging optical system and reproducing a plurality of optical disks.

As one of them, TOKKAIHEI 7-302437 discloses an optical pickup apparatus wherein a refraction surface of an objective lens is divided into plural ring-shaped areas, and each divided area forms an image on one of optical disks having different thickness for reproducing.

In addition, TOKKAIHEI 7-57271 discloses an optical pickup apparatus wherein an objective lens designed to make wavefront aberration owned by a converged beam to be 0.07λ or less is used in the case of a first optical disk with a transparent substrate having a thickness of t1, and the objective lens is defocused slightly in the case of a second optical disk with a transparent substrate having a thickness of t2, both for forming a light-converged spot.

However, in the optical pickup apparatus disclosed in TOKKAIHEI 7-302437, an incident light amount is divided to two focal points simultaneously by a single objective lens. It is therefore necessary to make the laser output to be high, which results in a cost increase. In the optical pickup apparatus disclosed in TOKKAIHEI 7-57271, on the other hand, there is caused an increase of the side lobe jitters when reproducing the second optical disk. In this case, in particular, the second optical disk is reproduced forcibly by the objective lens designed to make wavefront aberration to be 0.07λ or less in the case of the first optical disk. Therefore, the numerical aperture which makes it possible to reproduce the second optical disk is naturally limited.

SUMMARY OF THE INVENTION

An object of the invention, therefore, is to be capable of recording or reproducing plural optical information recording media with a single light-converging optical system, realizing at low cost without being complicated, and working also with optical information recording medium with high NA.

Further, the object of the invention is to improve light-converging characteristics of the optical pickup apparatus having adjusted spherical aberration which has been proposed by the inventors of the invention in U.S. application Ser. No. 08/761,892 and 08/885,763.

The objects mentioned above can be attained by the following structures.

An optical pickup apparatus having therein:
 a light source;
 a light-converging optical system which converges a light flux emitted from the light source and has an optical surface that is divided into a first surface, a second surface and a third surface so that a light flux passing through the first divided surface and the third divided surface forms a beam spot on the first optical information recording medium having a t1-thick transparent substrate, and a light flux passing through the first divided surface and the second divided surface forms a beam spot on the second optical information recording medium having a t2-thick (t1<t2) transparent substrate; and an image sensor that receives a light flux reflected on the first or the second optical information recording medium.

Each of FIGS. 4(a)–4(f) represents a diagram wherein a spherical aberration diagram of an objective lens is shown illustratively.

Figure 5A:
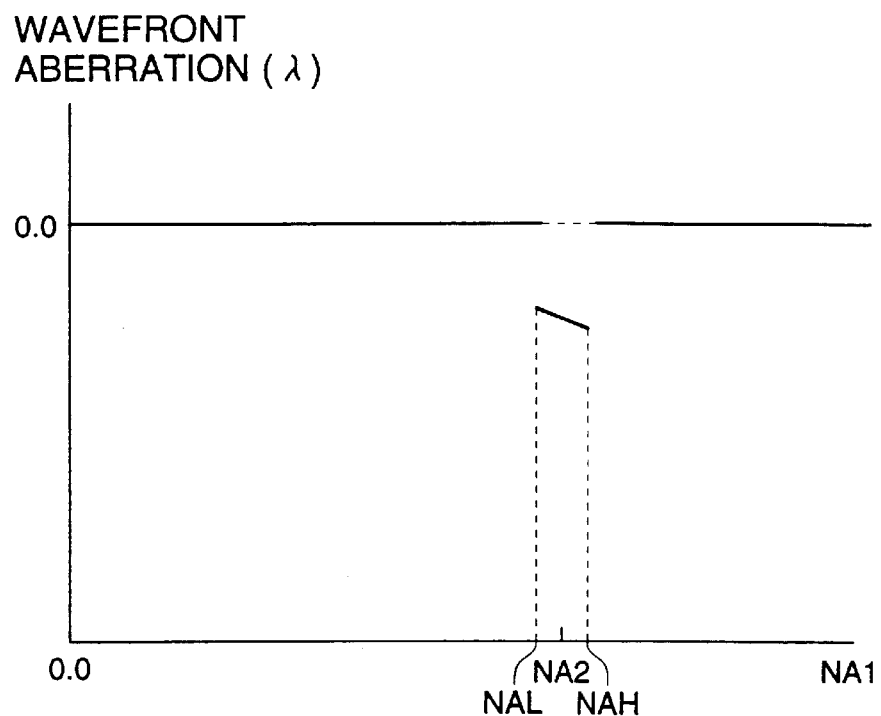
Figure 5B:
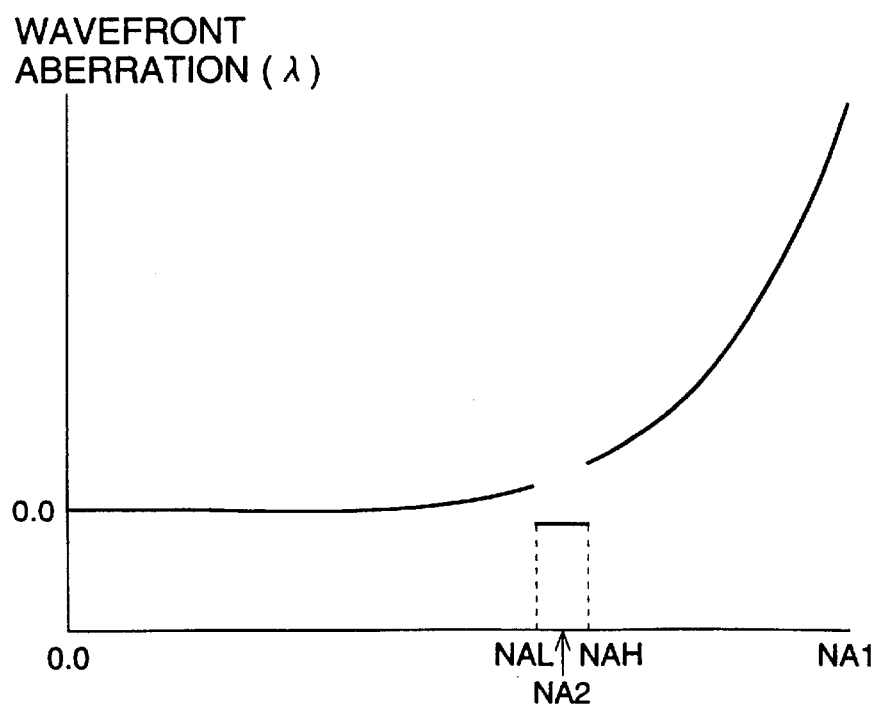

Each of FIGS. 5(a) and 5(b) represents a diagram wherein a wavefront aberration diagram of an objective lens is shown illustratively.

Figure 6:
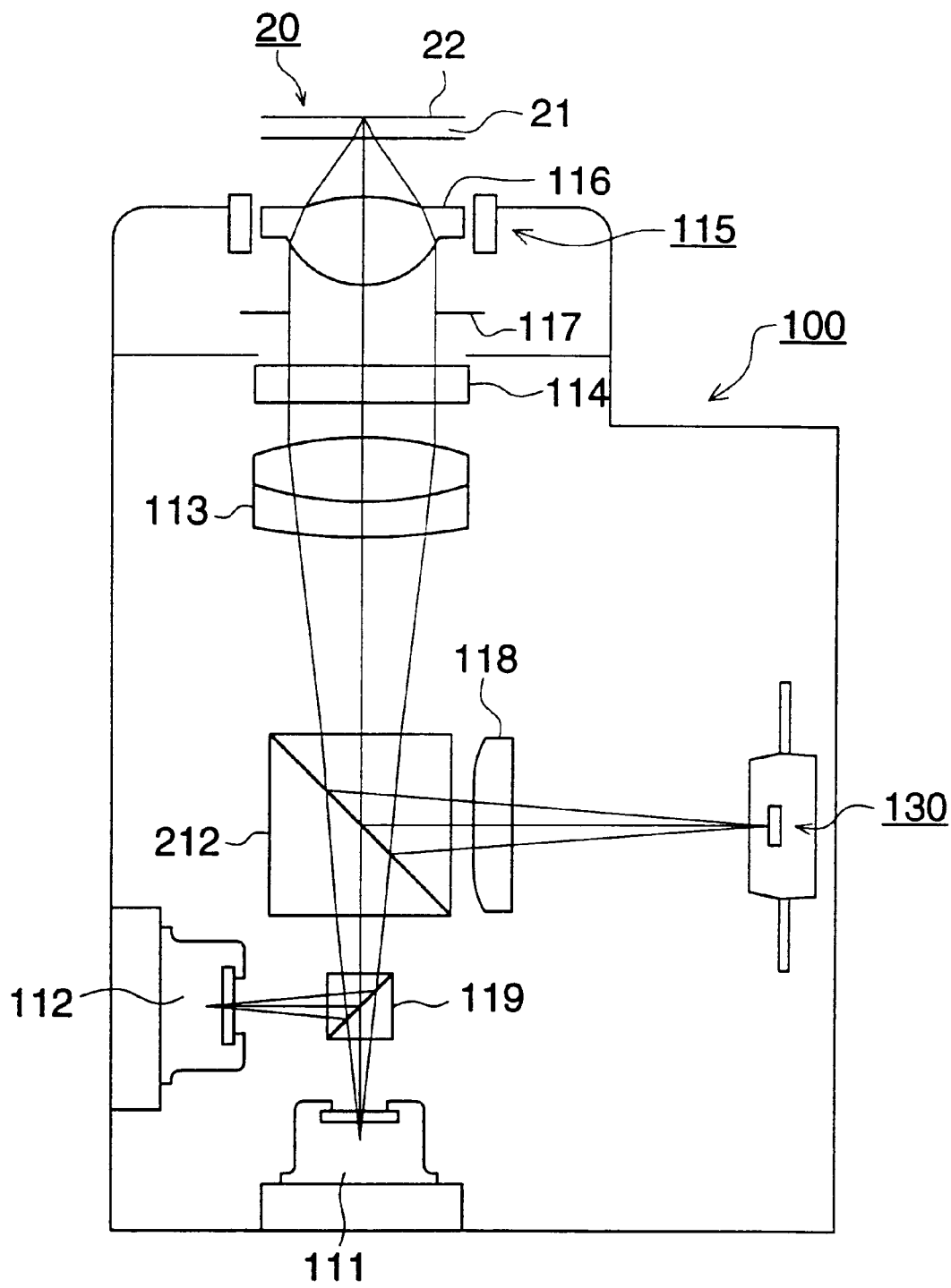

FIG. 6 is a schematic structure diagram of an optical pickup apparatus in the third example.

FIG. 7(a) is a sectional view showing illustratively an objective lens in the fourth example, and FIG. 7(b) is its front view viewed from the light source side.

Figure 8:
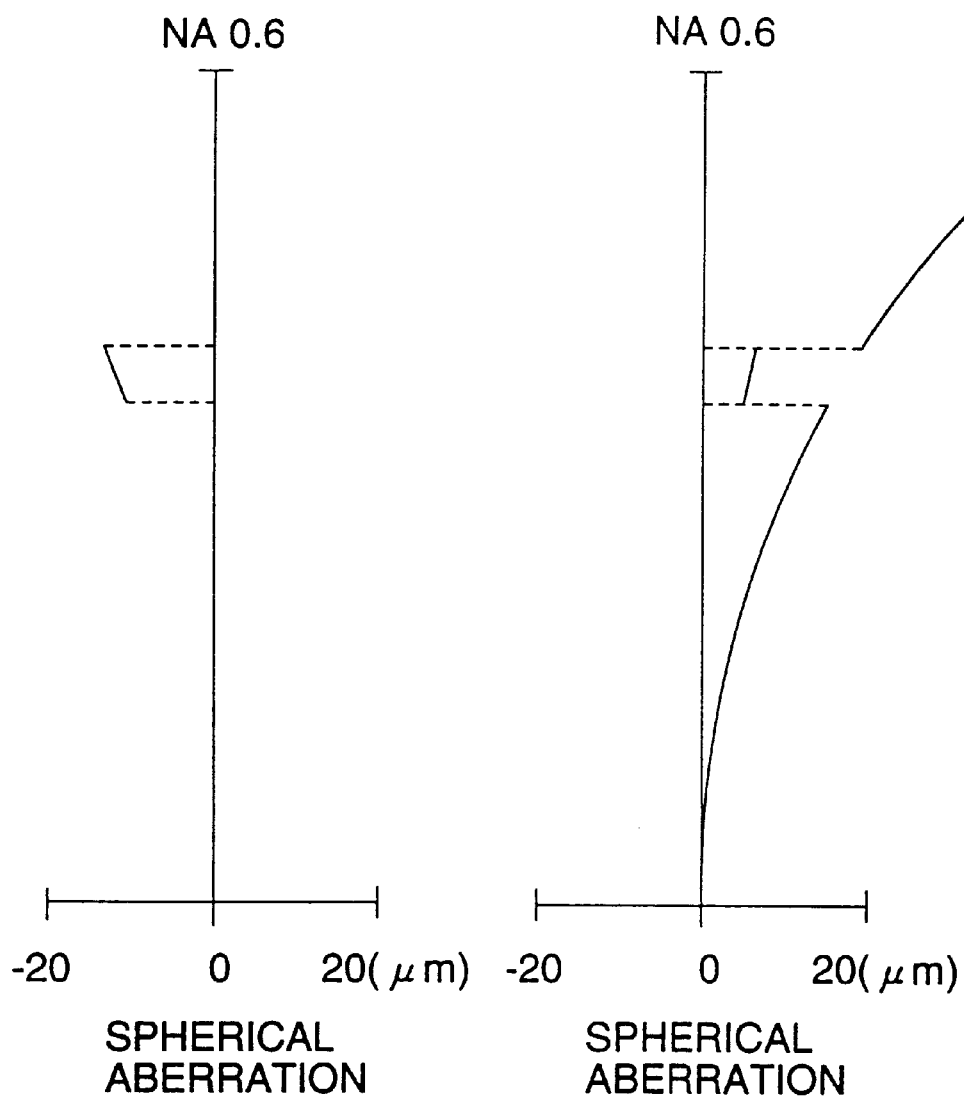

Each of FIGS. 8(a) and 8(b) is an aberration diagram of an objective lens in the first example.

Figure 9:
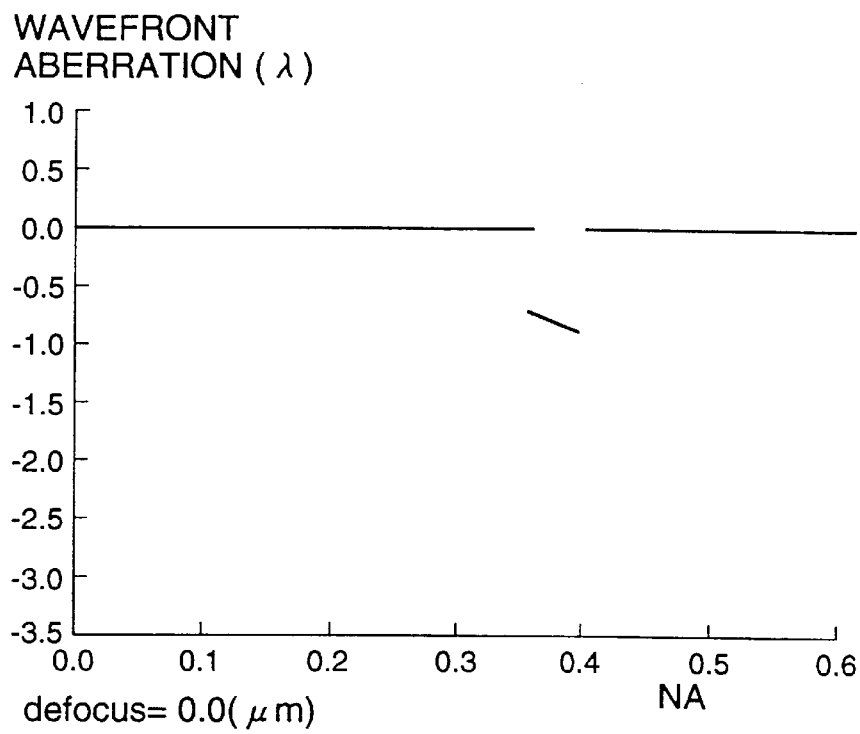
Figure 9:
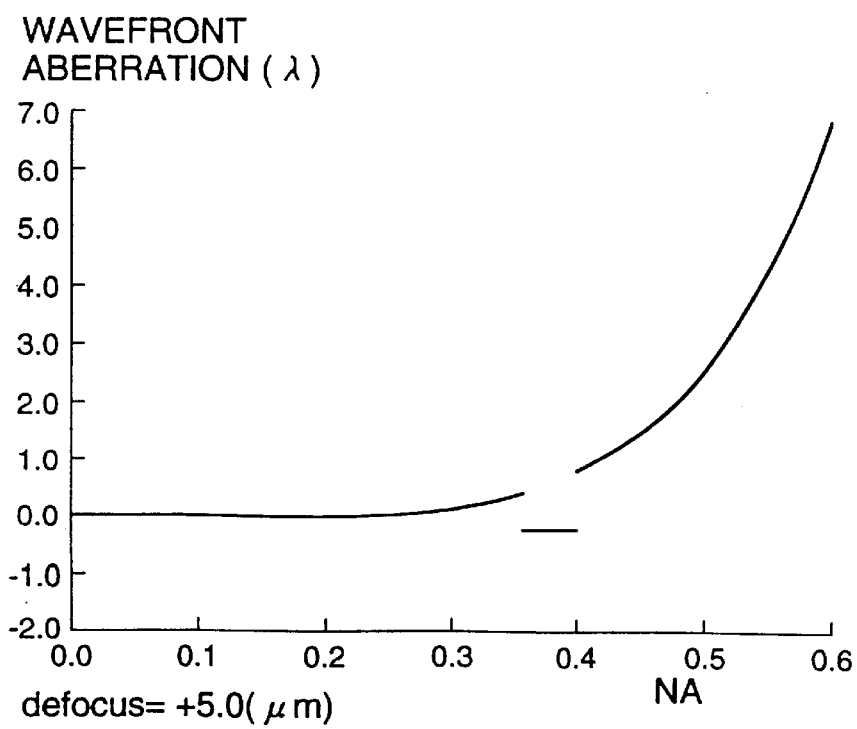

Each of FIGS. 9(a) and 9(b) is a diagram of wavefront aberration obtained by viewing in the state wherein the objective lens in the first example is defocused to the position where the best wavefront aberration is obtained.

Figure 10:
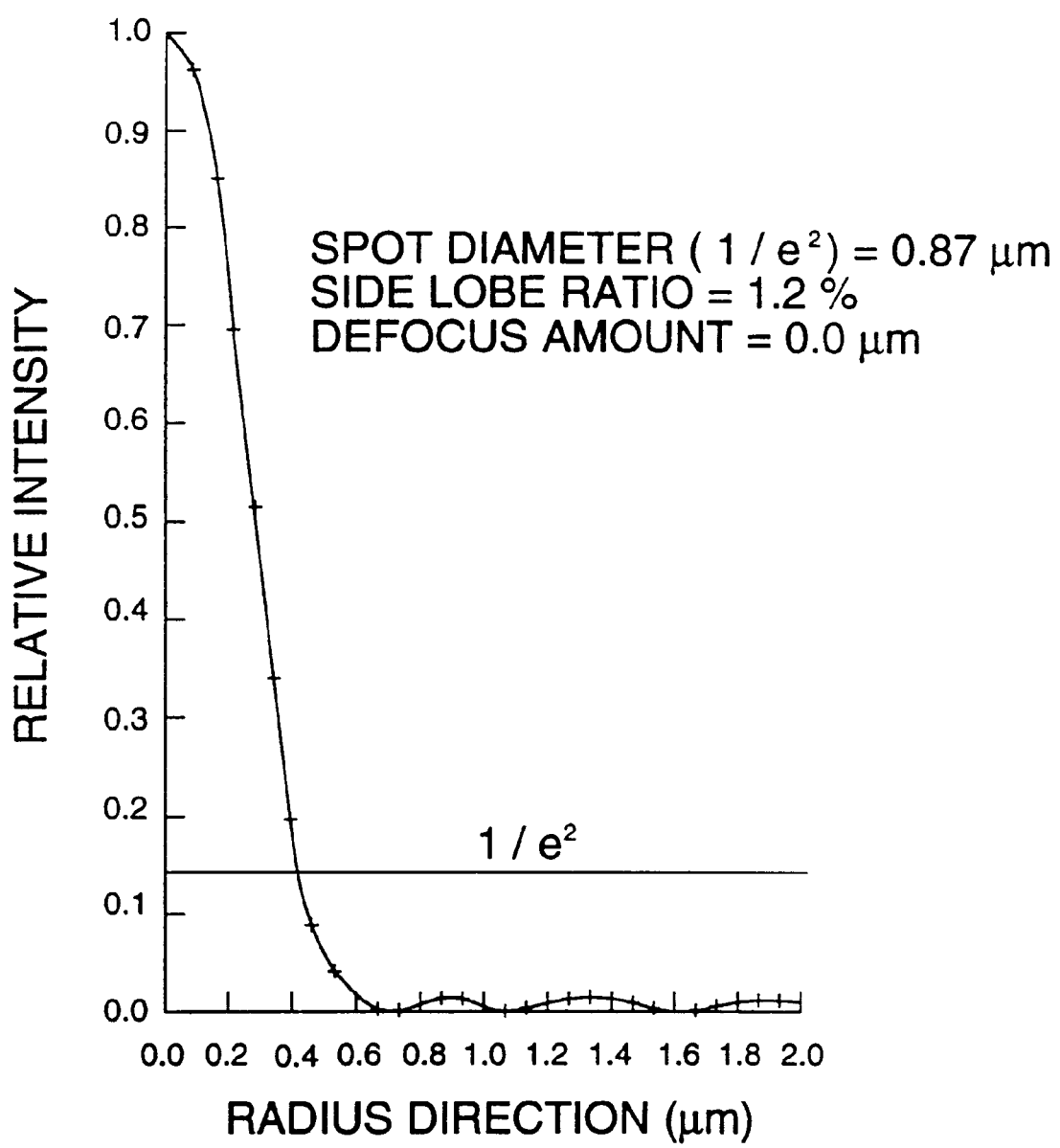

FIG. 10 is a distribution diagram for relative intensity of a light-converged spot having the best spot shape obtained in the course of reproducing a DVD with the objective lens in the first example.

Figure 11:
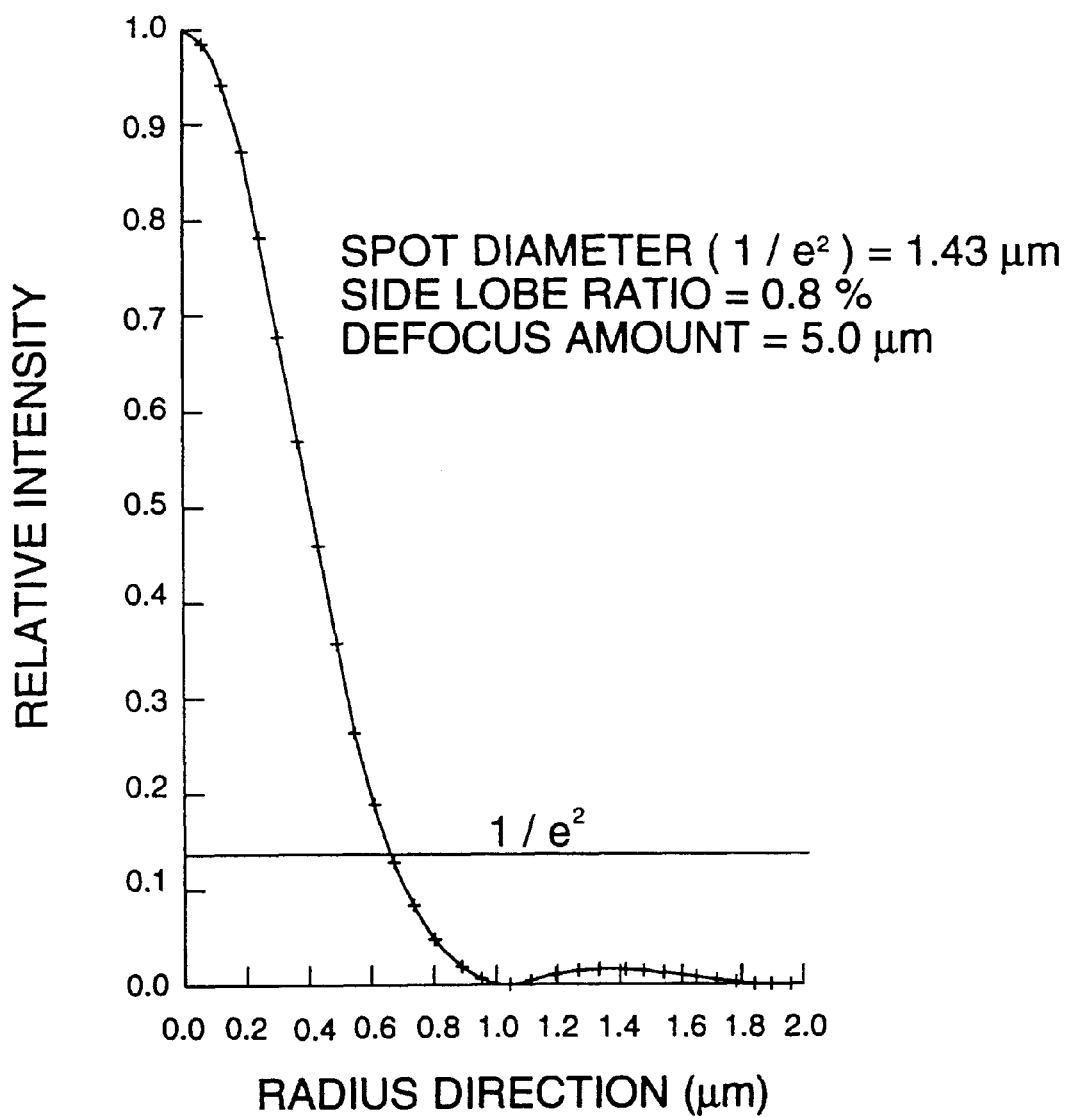

FIG. 11 represents a distribution diagram for relative intensity of a light-converged spot having the best spot shape obtained in the course of reproducing a CD in the first example.

Each of FIGS. 12(a) and 12(b) is an aberration diagram of an objective lens in the second example.

Each of FIGS. 13(a) and 13(b) is a diagram of wavefront aberration obtained by viewing in the state wherein the objective lens in the second example is defocused to the position where the best wavefront aberration is obtained.

Figure 14:
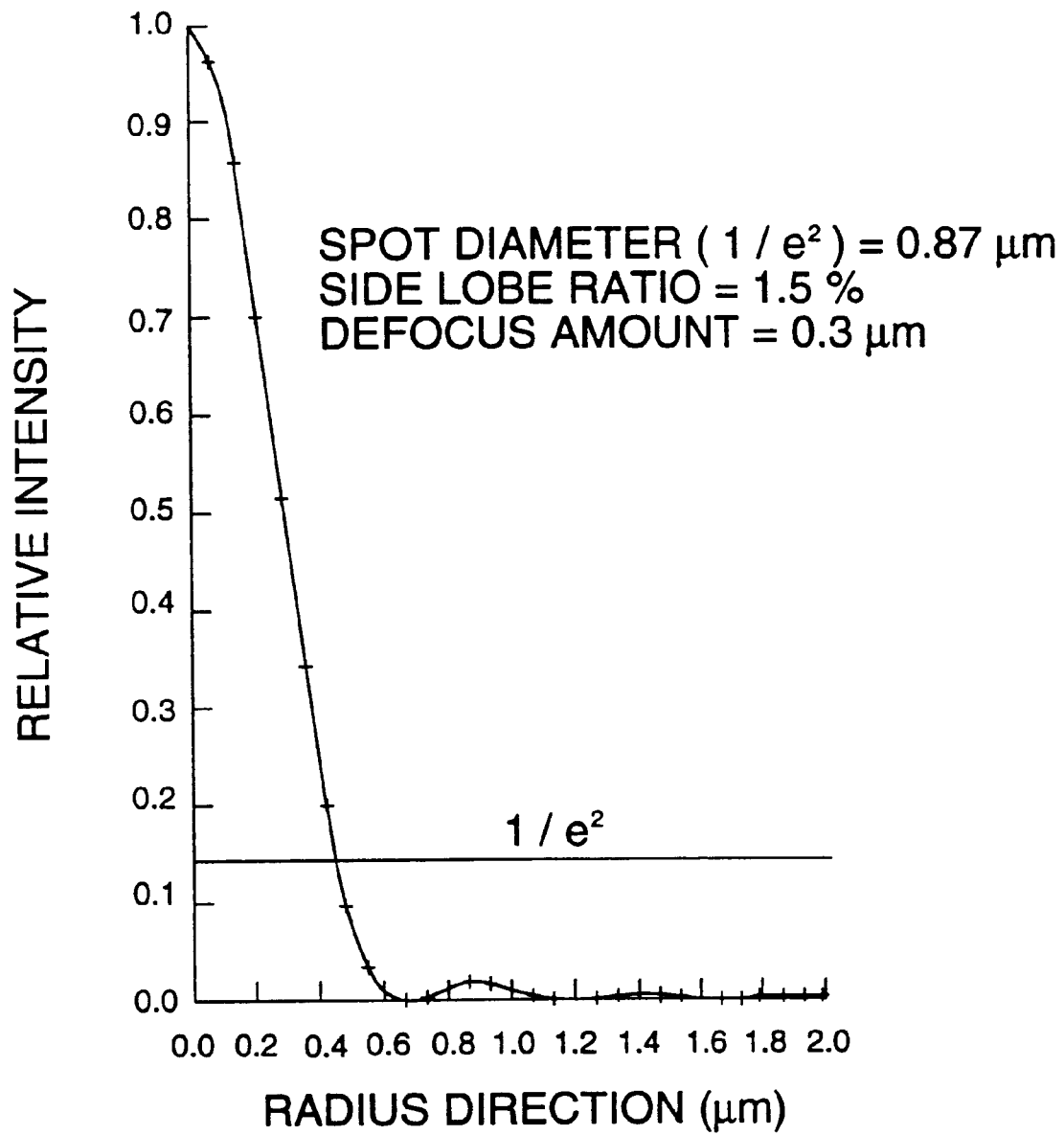

FIG. 14 is a distribution diagram for relative intensity of a light-converged spot having the best spot shape obtained in the course of reproducing a DVD with the objective lens in the second example.

Figure 15:
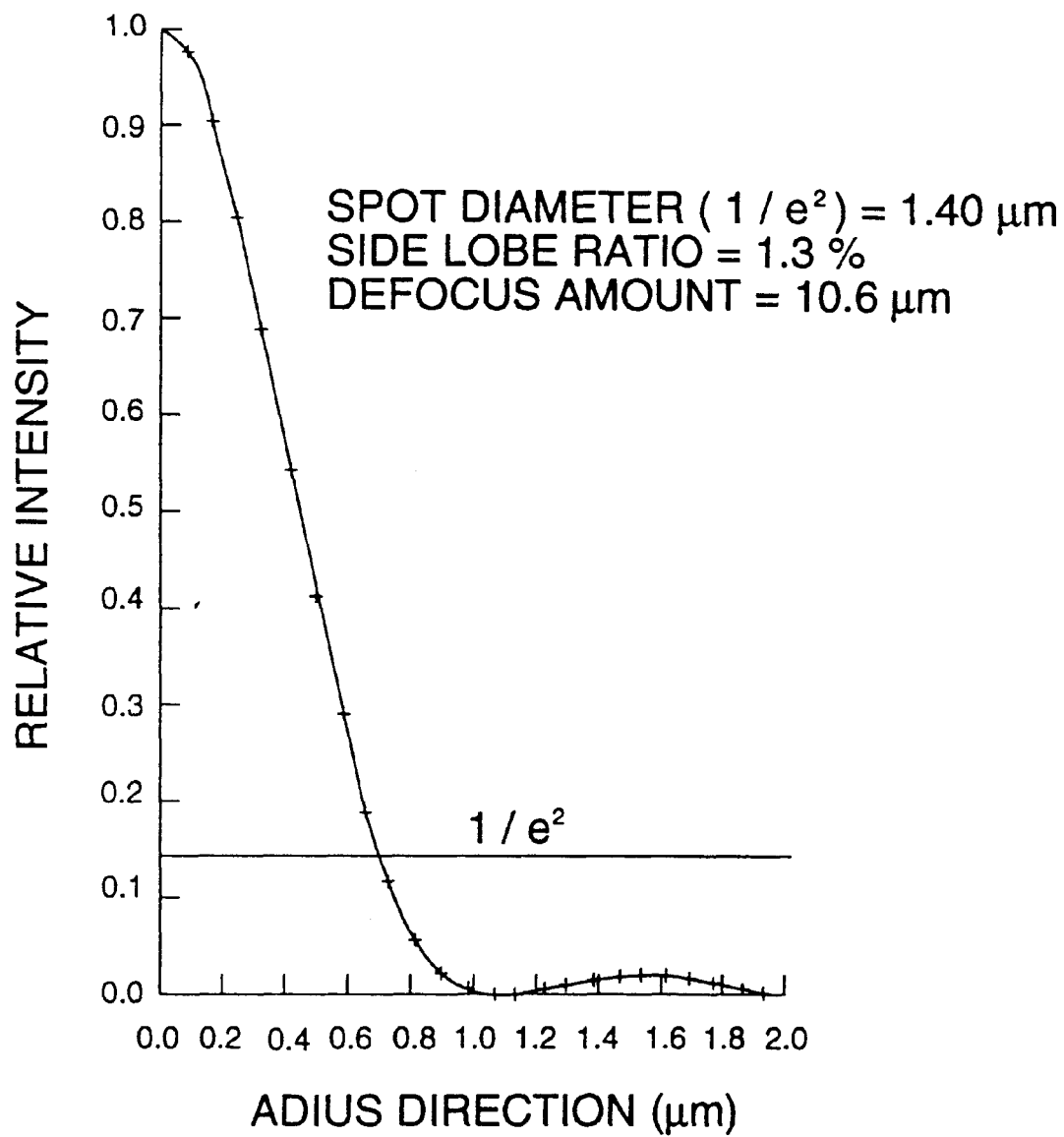

FIG. 15 represents a distribution diagram for relative intensity of a light-converged spot having the best spot shape obtained in the course of reproducing a CD with the objective in the second example.

Figure 16:
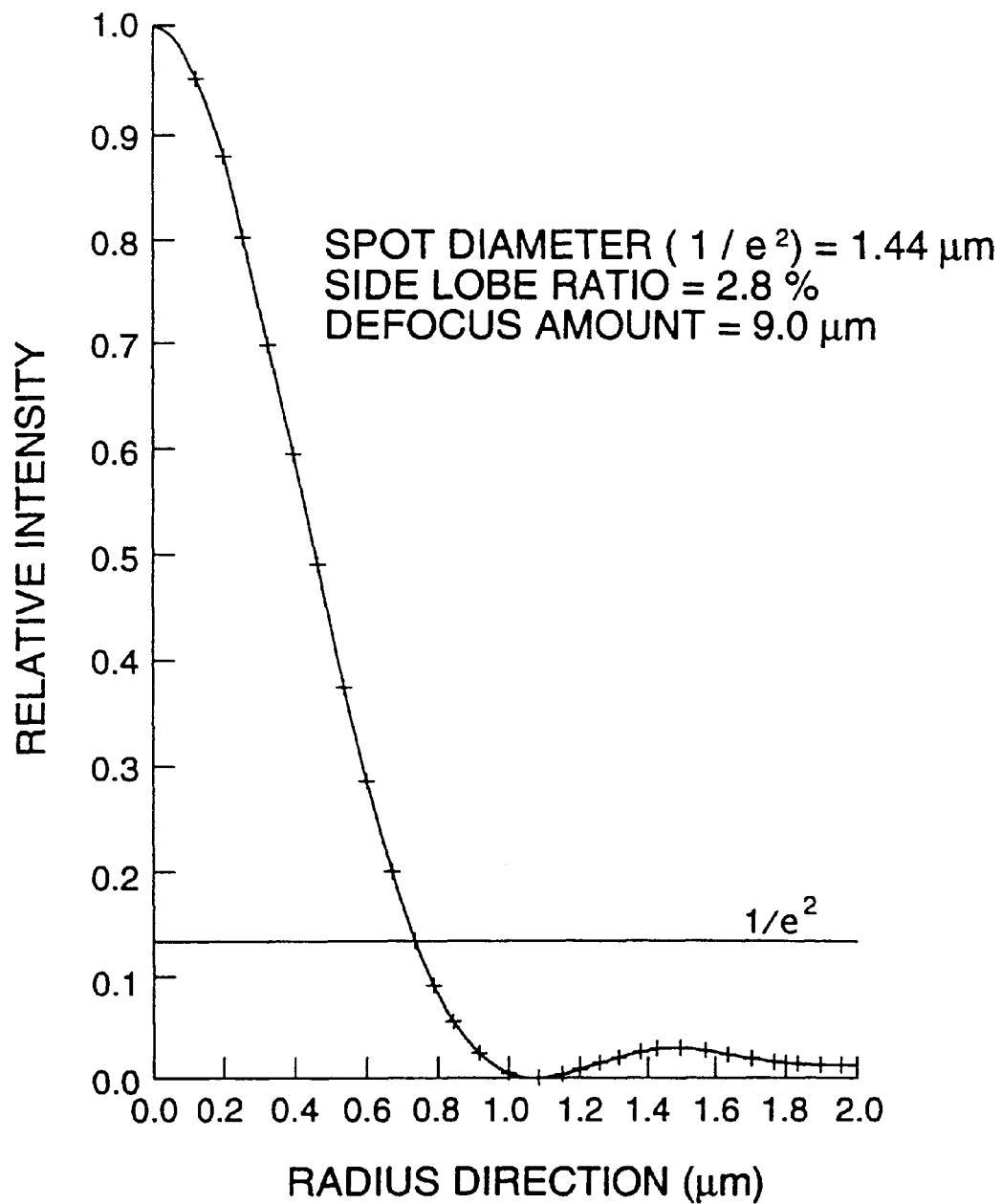

FIG. 16 represents a distribution diagram for relative intensity of a light-converged spot having the best spot shape obtained in the course of reproducing a CD with the objective lens at the wavelength of 635 nm in the second example.

Figure 17:
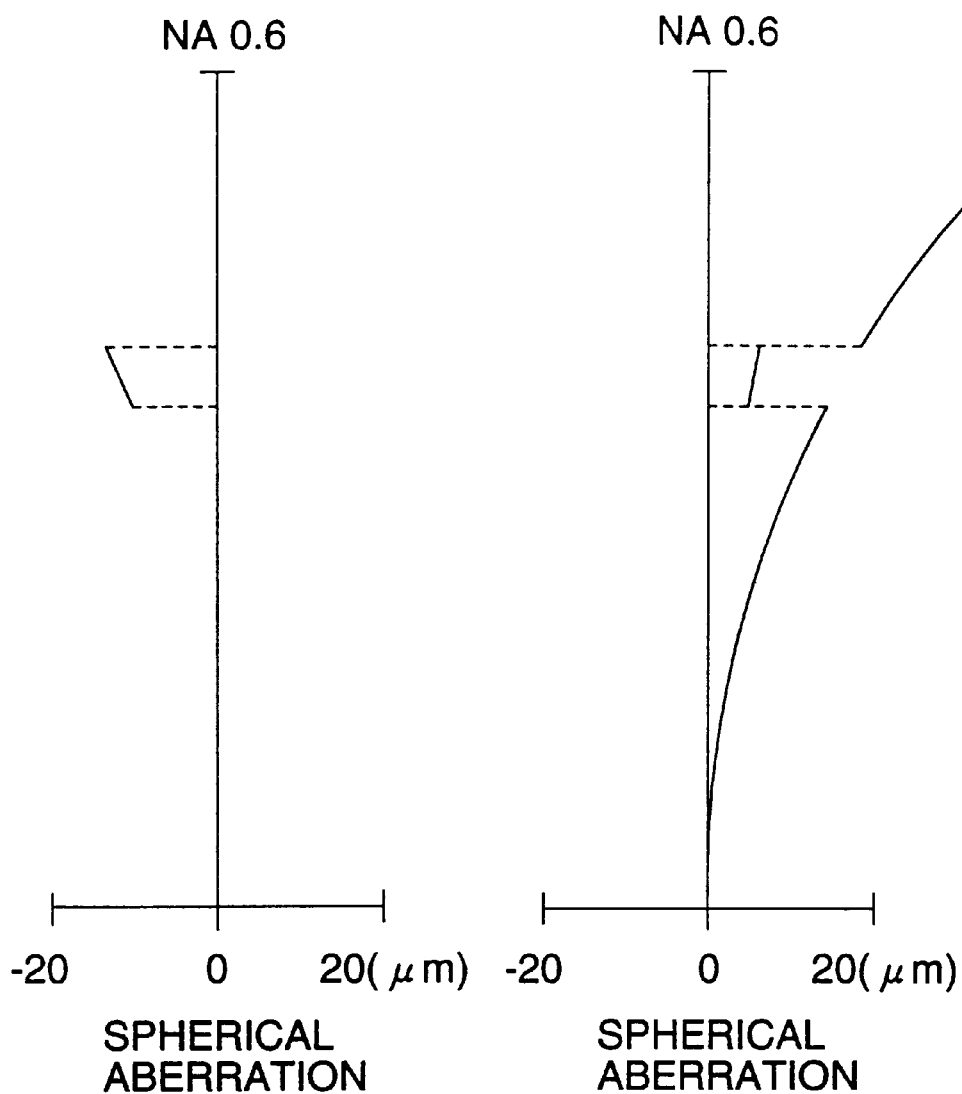

Each of FIGS. 17(a) and 17(b) is an aberration diagram of an objective lens in the third example.

Figure 18:
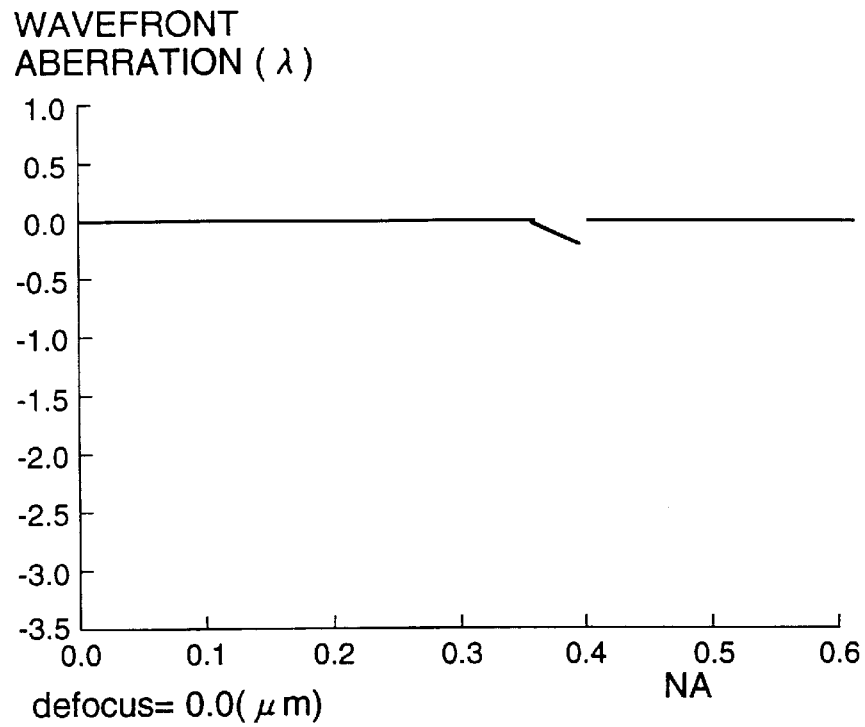
Figure 18:
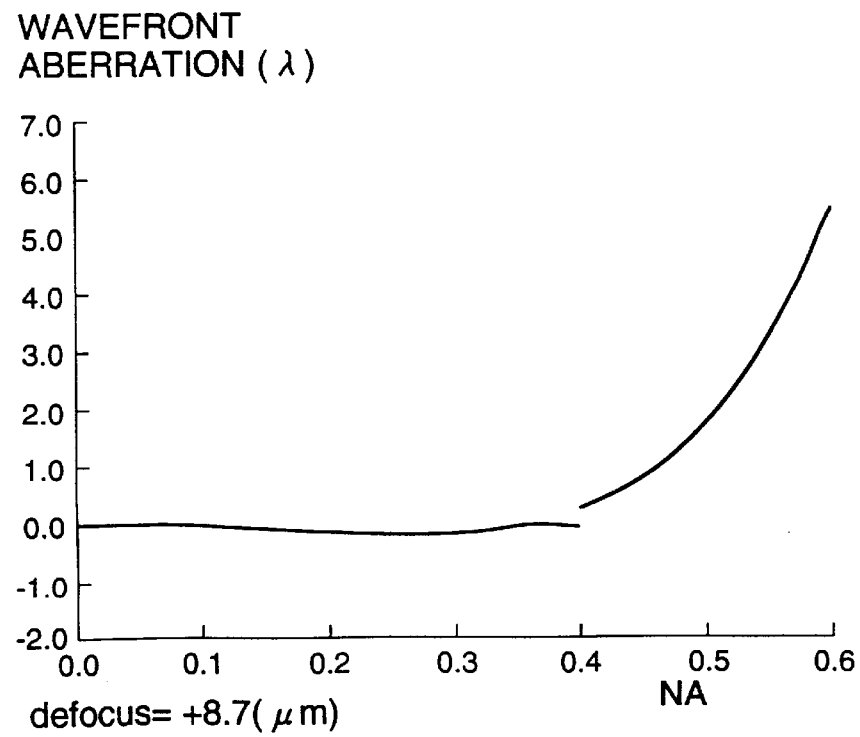

Each of FIGS. 18(a) and 18(b) is a diagram of wavefront aberration obtained by viewing in the state wherein the objective lens in the third example is defocused to the position where the best wavefront aberration is obtained.

Figure 19:
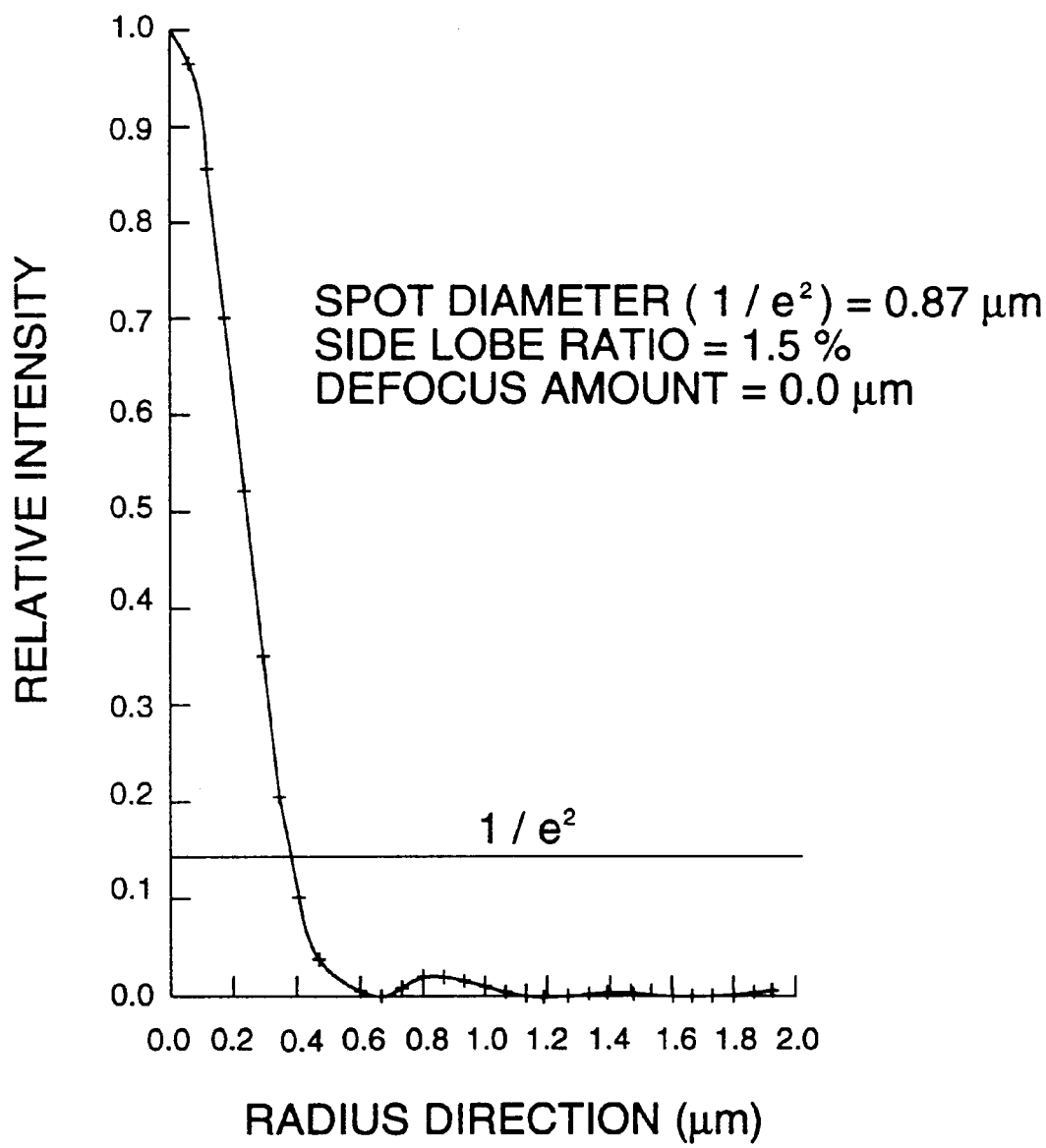

FIG. 19 is a distribution diagram for relative intensity of a light-converged spot having the best spot shape obtained in the course of reproducing a DVD with the objective lens in the third example.

Figure 20:
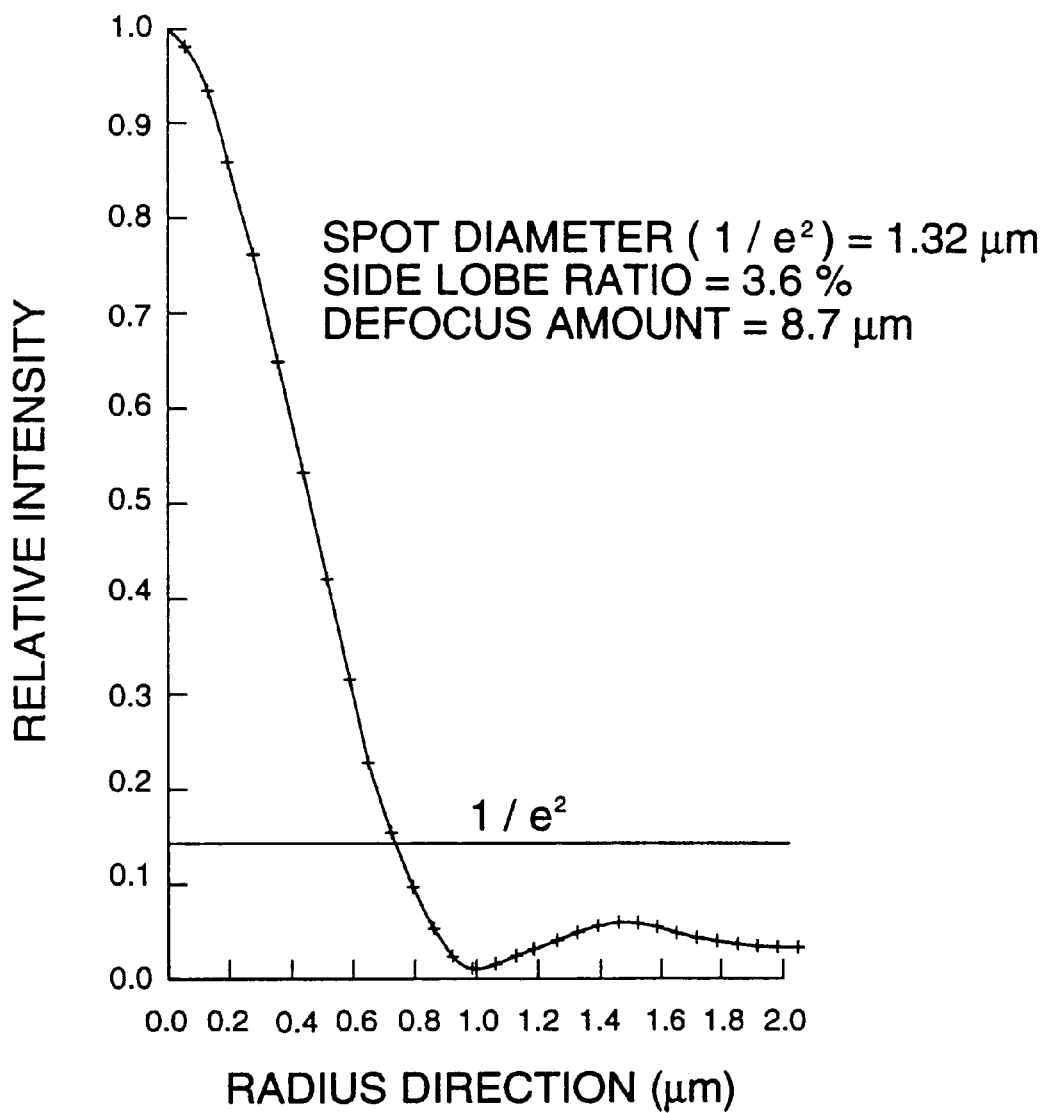

FIG. 20 represents a distribution diagram for relative intensity of a light-converged spot having the best spot shape obtained in the course of reproducing a CD with the objective in the third example.

Each of FIGS. 21(a) and 21(b) is an aberration diagram of an objective lens in the fourth example.

Each of FIGS. 22(a) and 22(b) is a diagram of wavefront aberration obtained by viewing in the state wherein the objective lens in the fourth example is defocused to the position where the best wavefront aberration is obtained.

Figure 23:
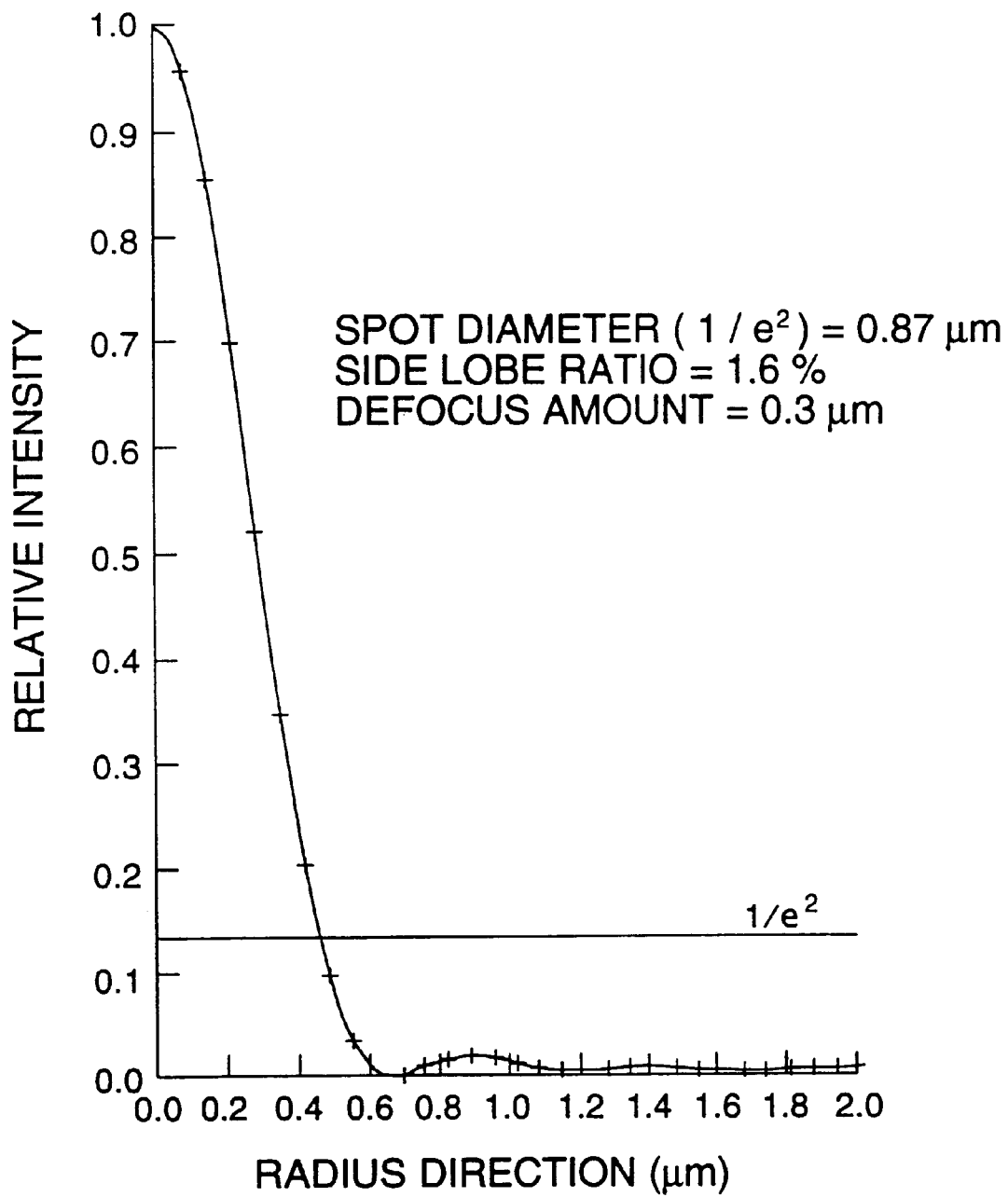

FIG. 23 is a distribution diagram for relative intensity of a light-converged spot having the best spot shape obtained in the course of reproducing a DVD with the objective lens in the fourth example.

Figure 24:
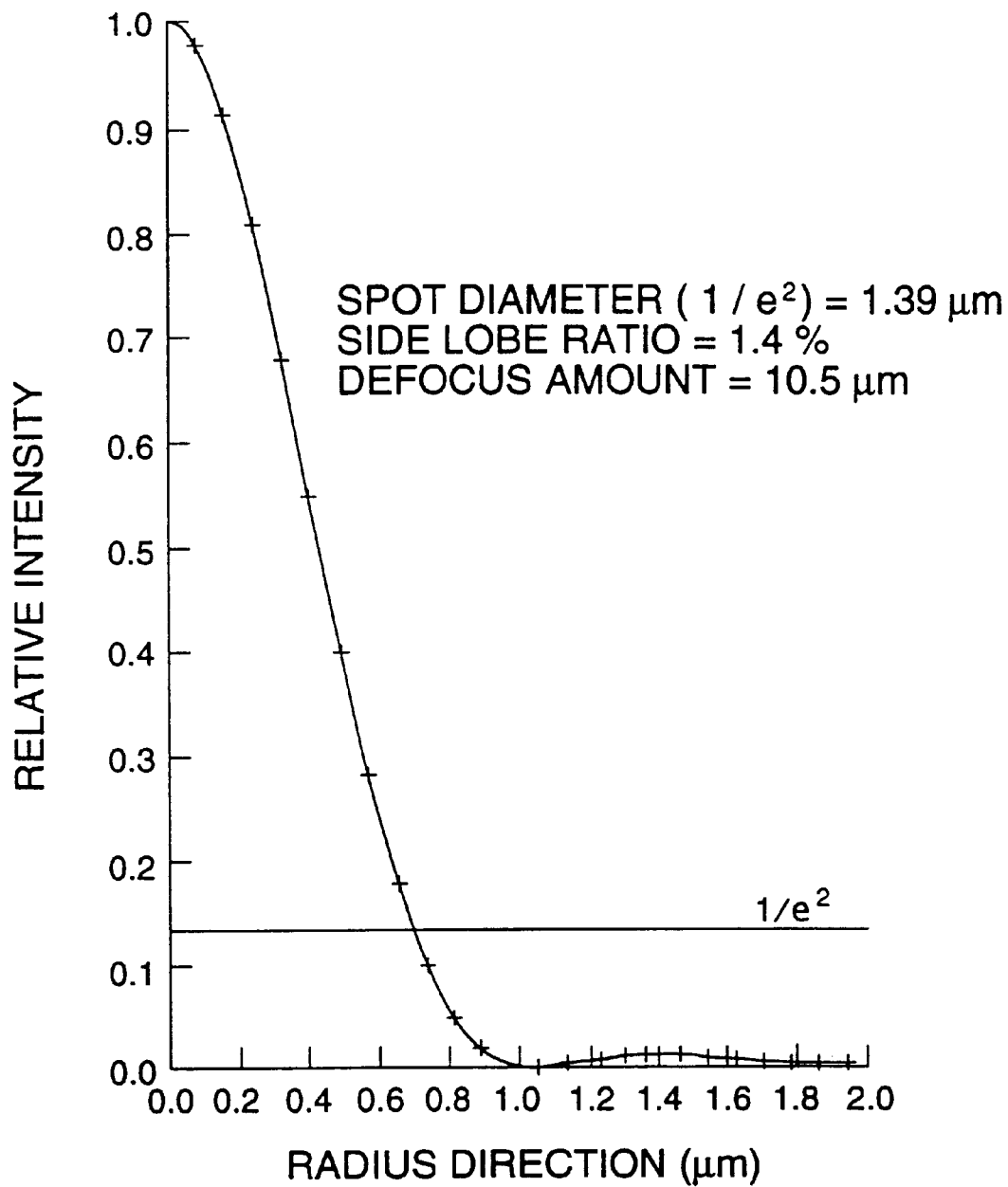

FIG. 24 represents a distribution diagram for relative intensity of a light-converged spot having the best spot shape obtained in the course of reproducing a CD with the objective in the fourth example.

Figure 25:
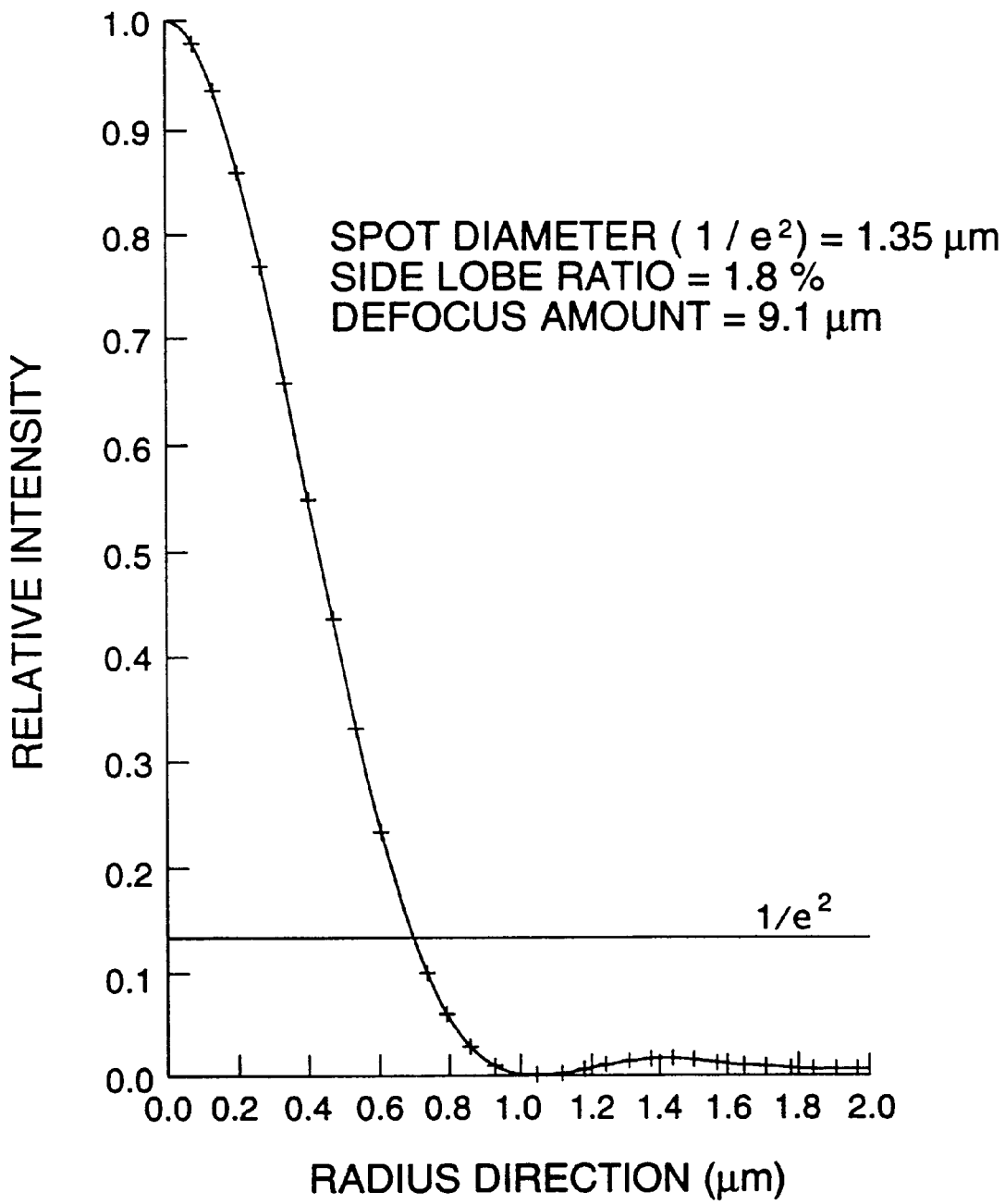

FIG. 25 represents a distribution diagram for relative intensity of a light-converged spot having the best spot shape obtained in the course of reproducing a CD with the objective lens at the wavelength of 635 nm in the fourth example.

Figure 26:
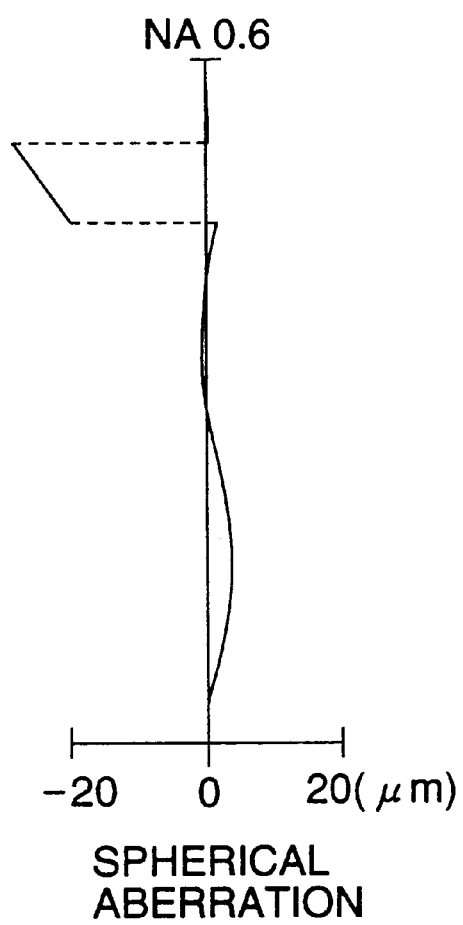
Figure 26:
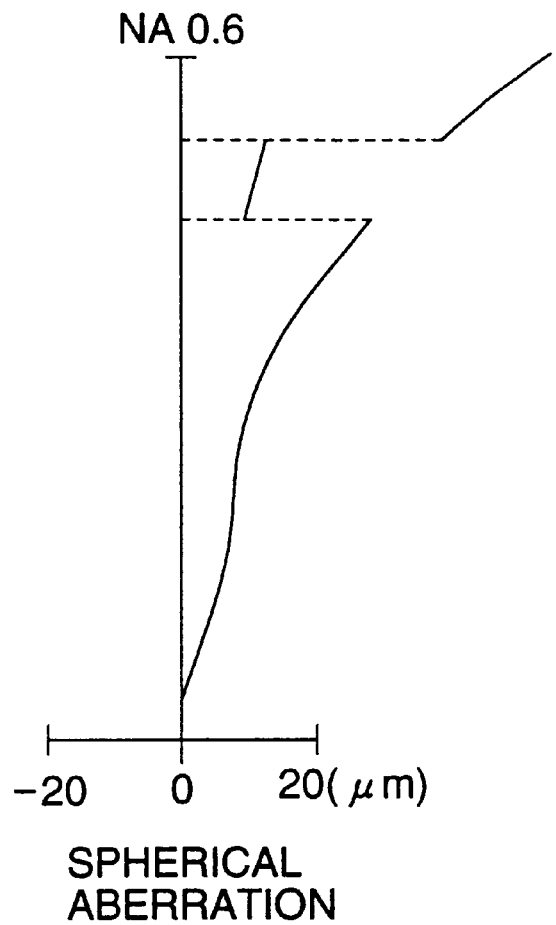

Each of FIGS. 26(a) and 26(b) is an aberration diagram of an objective lens in the fifth example.

Figure 27:
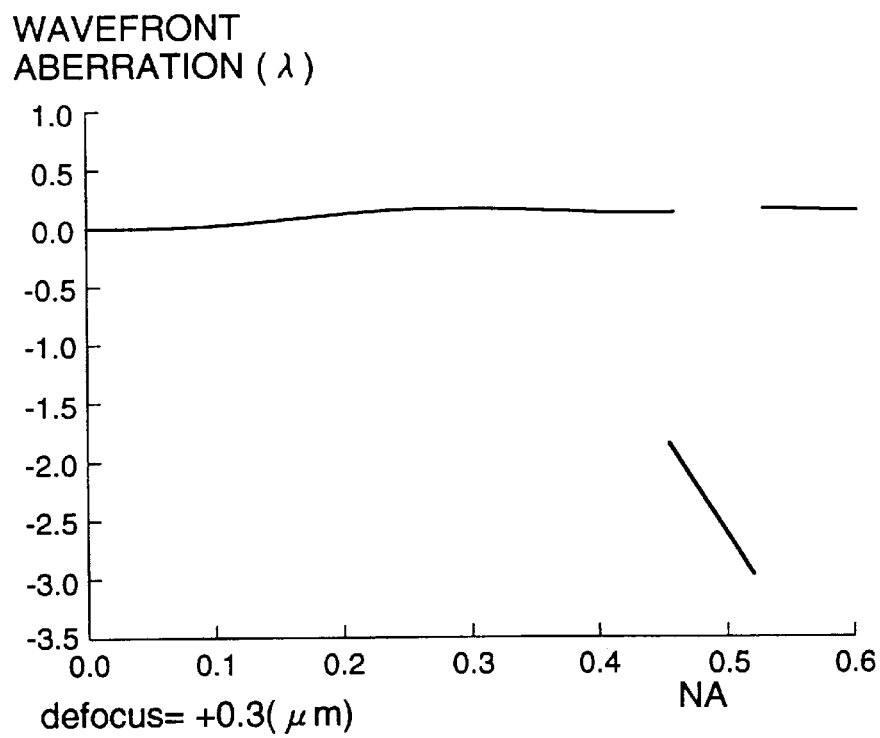
Figure 27:
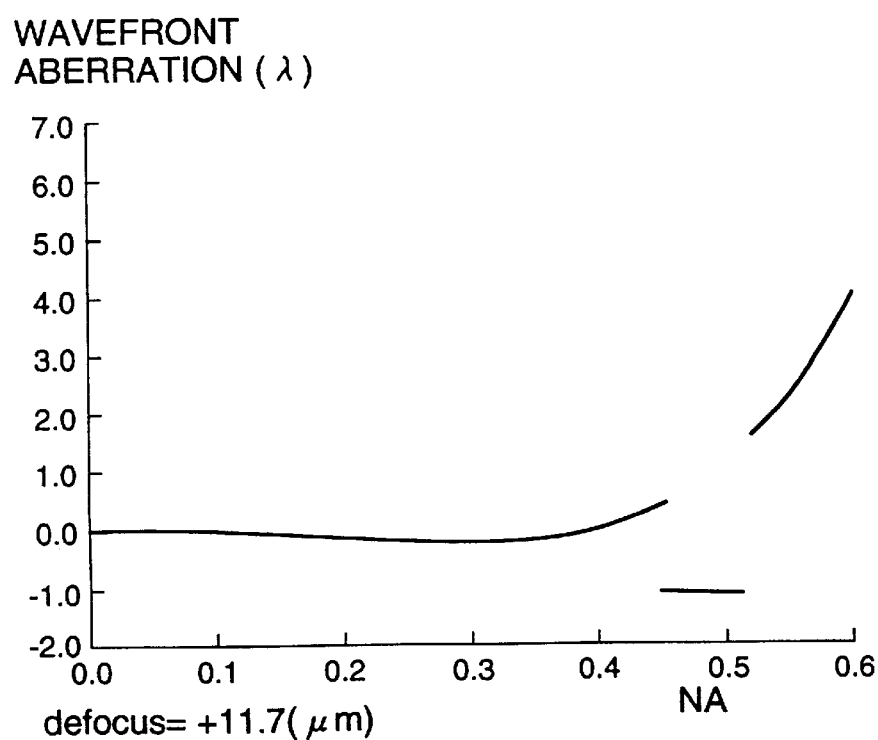

Each of FIGS. 27(a) and 27(b) is a diagram of wavefront aberration obtained by viewing in the state wherein the objective lens in the fifth example is defocused to the position where the best wavefront aberration is obtained.

Figure 28:
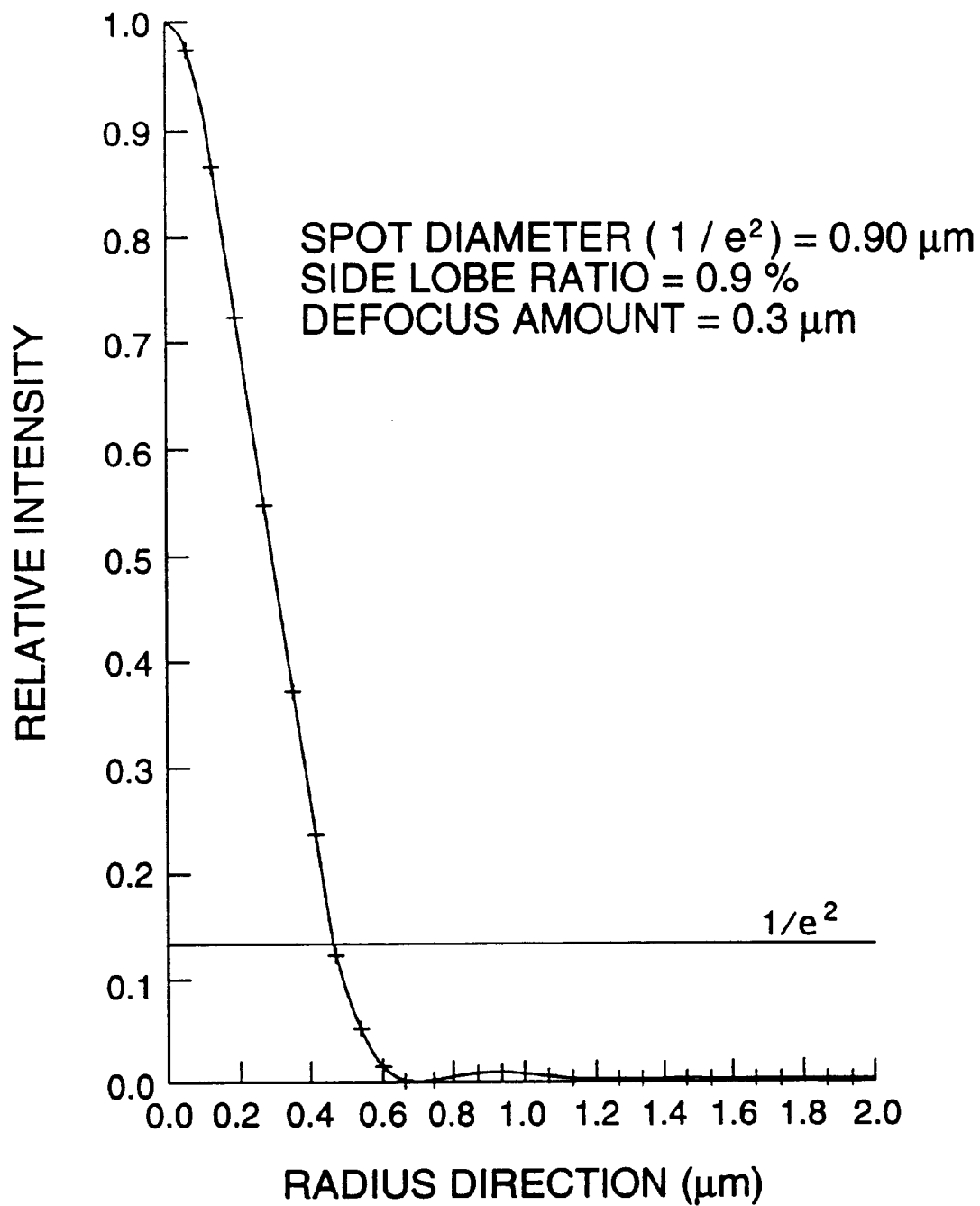

FIG. 28 is a distribution diagram for relative intensity of a light-converged spot having the best spot shape obtained in the course of reproducing a DVD with the objective lens in the fifth example.

Figure 29:
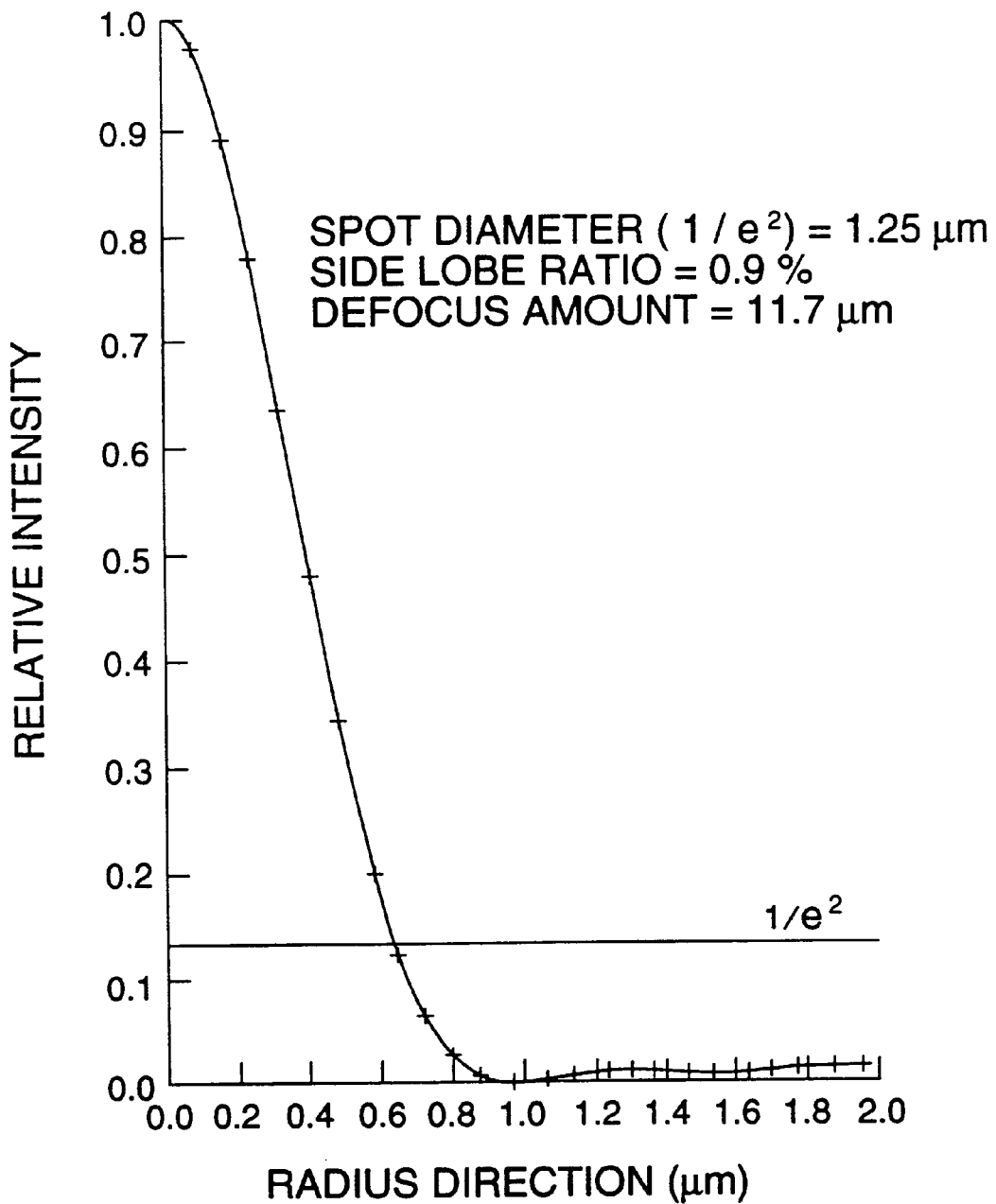

FIG. 29 represents a distribution diagram for relative intensity of a light-converged spot having the best spot shape obtained in the course of reproducing a CD-R with the objective in the fifth example.

Figure 30:
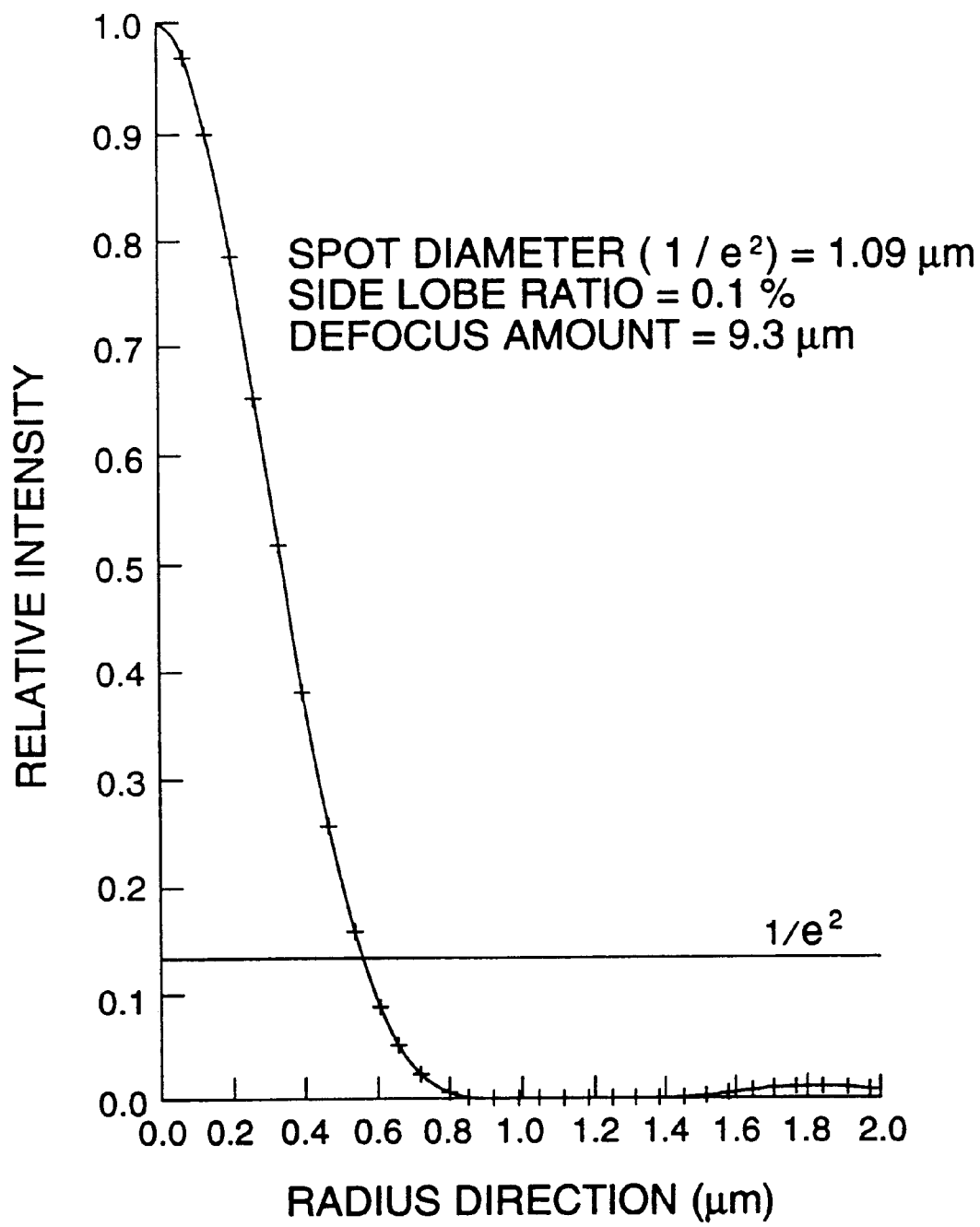

FIG. 30 represents a distribution diagram for relative intensity of a light-converged spot having the best spot shape obtained in the course of reproducing a CD with the objective lens at the wavelength of 635 nm in the fifth example.

Figure 31:
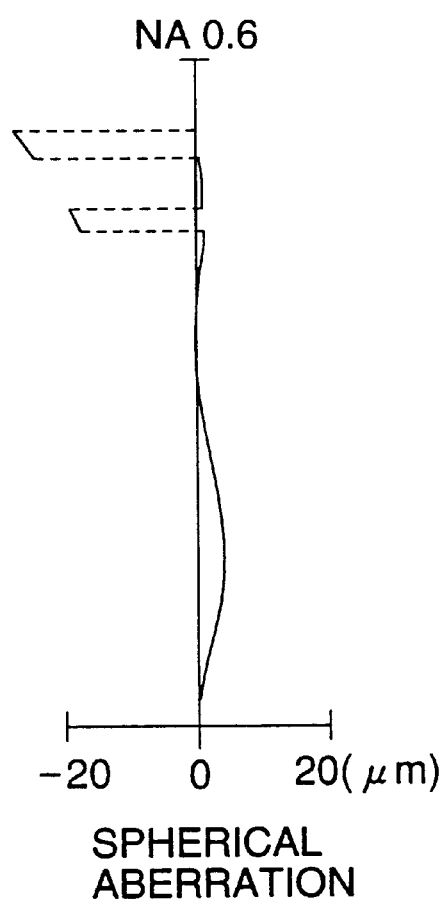
Figure 31:
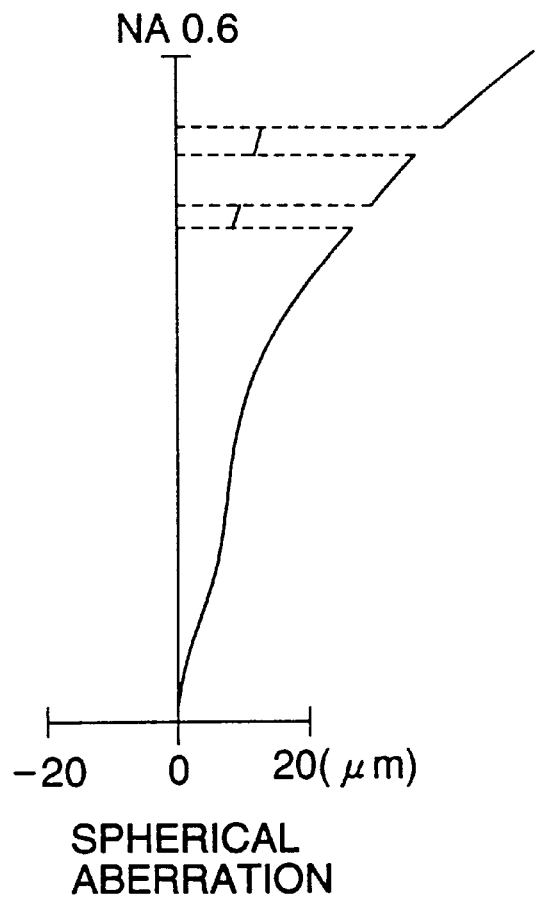

Each of FIGS. 31(a) and 31(b) is an aberration diagram of an objective lens in the sixth example.

Figure 32:
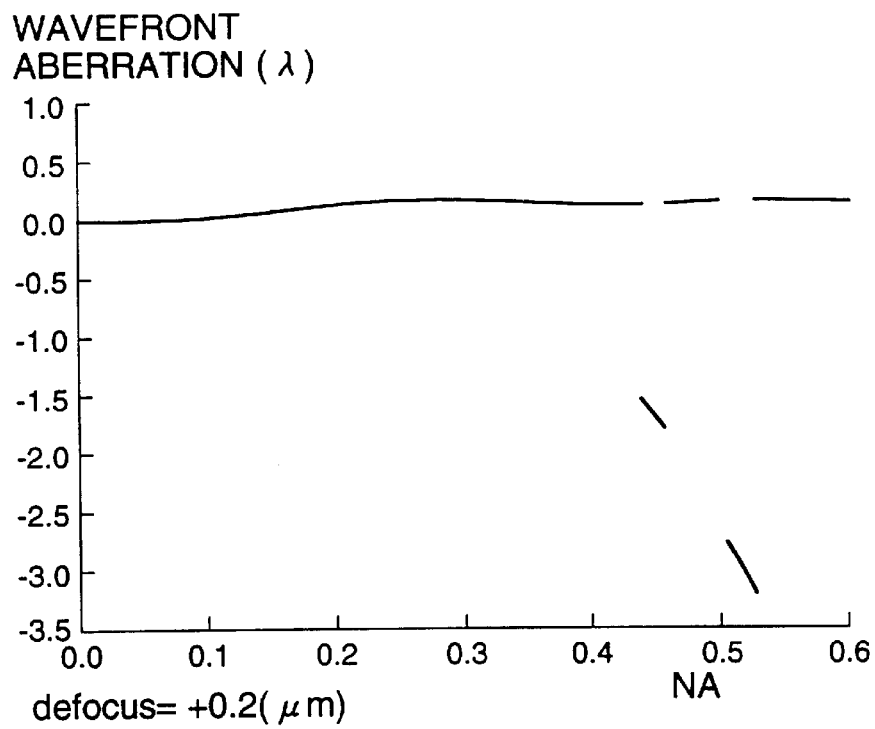
Figure 32:
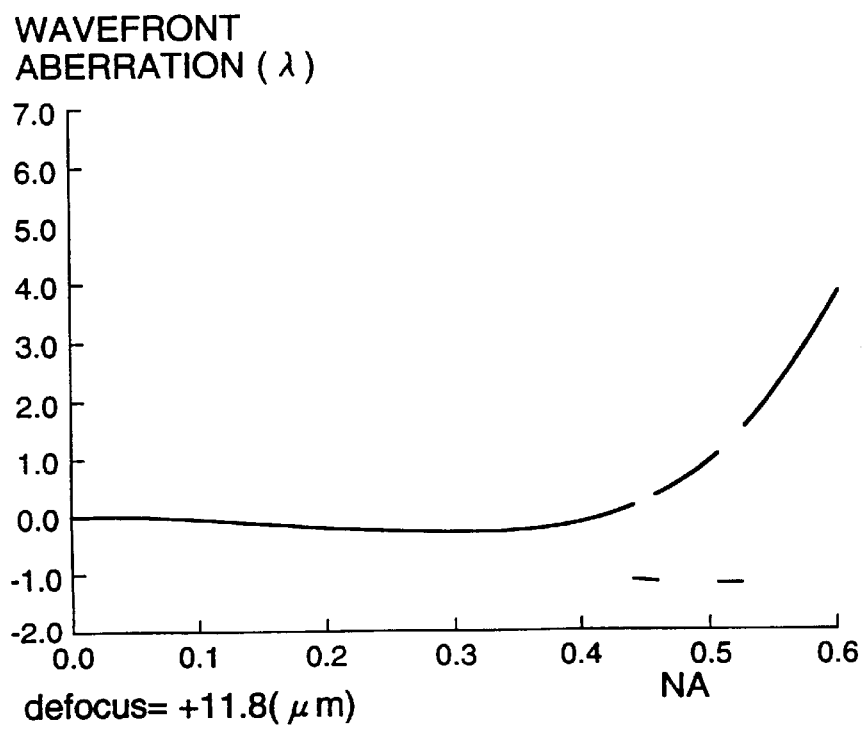

Each of FIGS. 32(a) and 32(b) is a diagram of wavefront aberration obtained by viewing in the state wherein the objective lens in the sixth example is defocused to the position where the best wavefront aberration is obtained.

Figure 33:
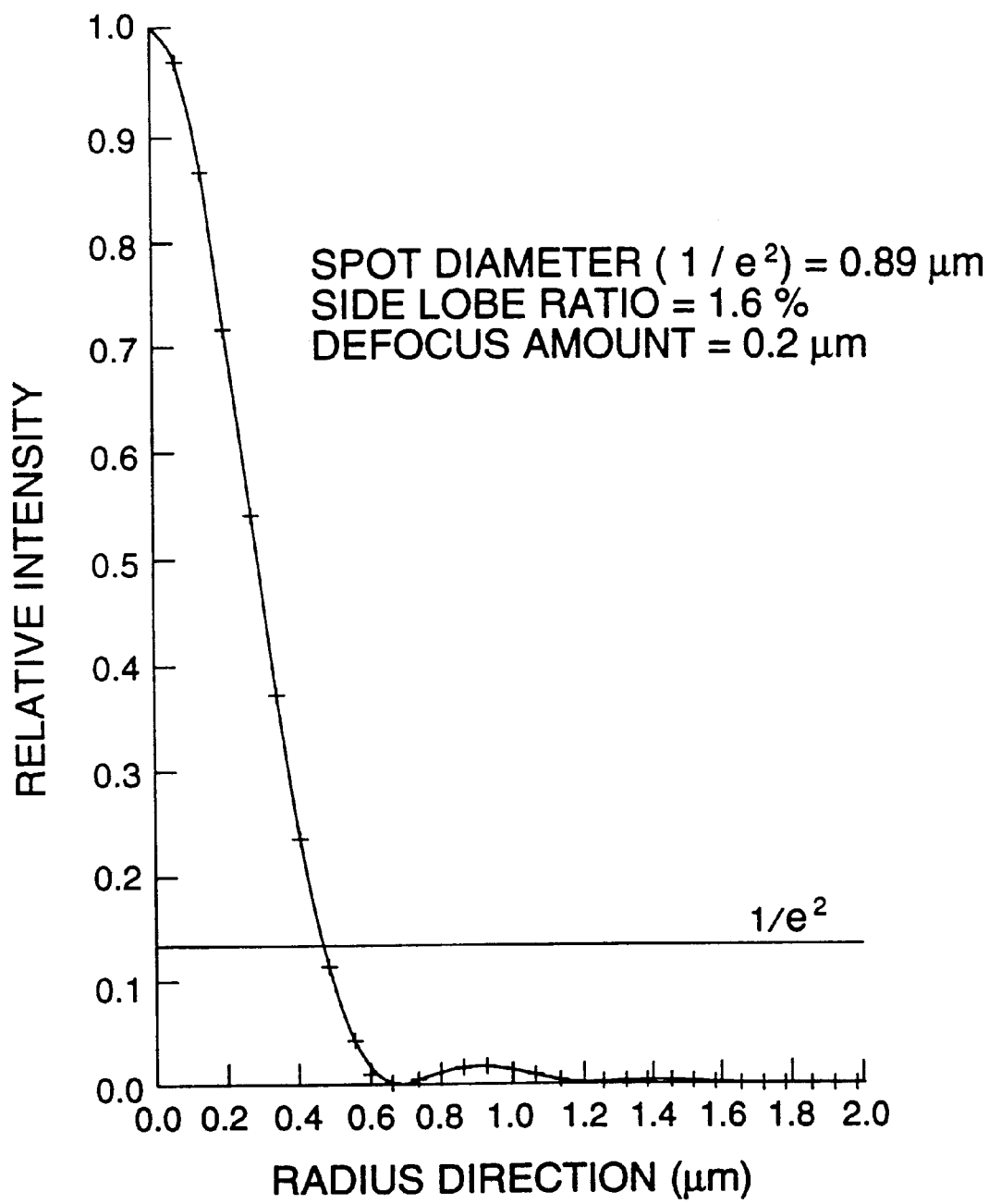

FIG. 33 is a distribution diagram for relative intensity of a light-converged spot having the best spot shape obtained in the course of reproducing a DVD with the objective lens in the sixth example.

Figure 34:
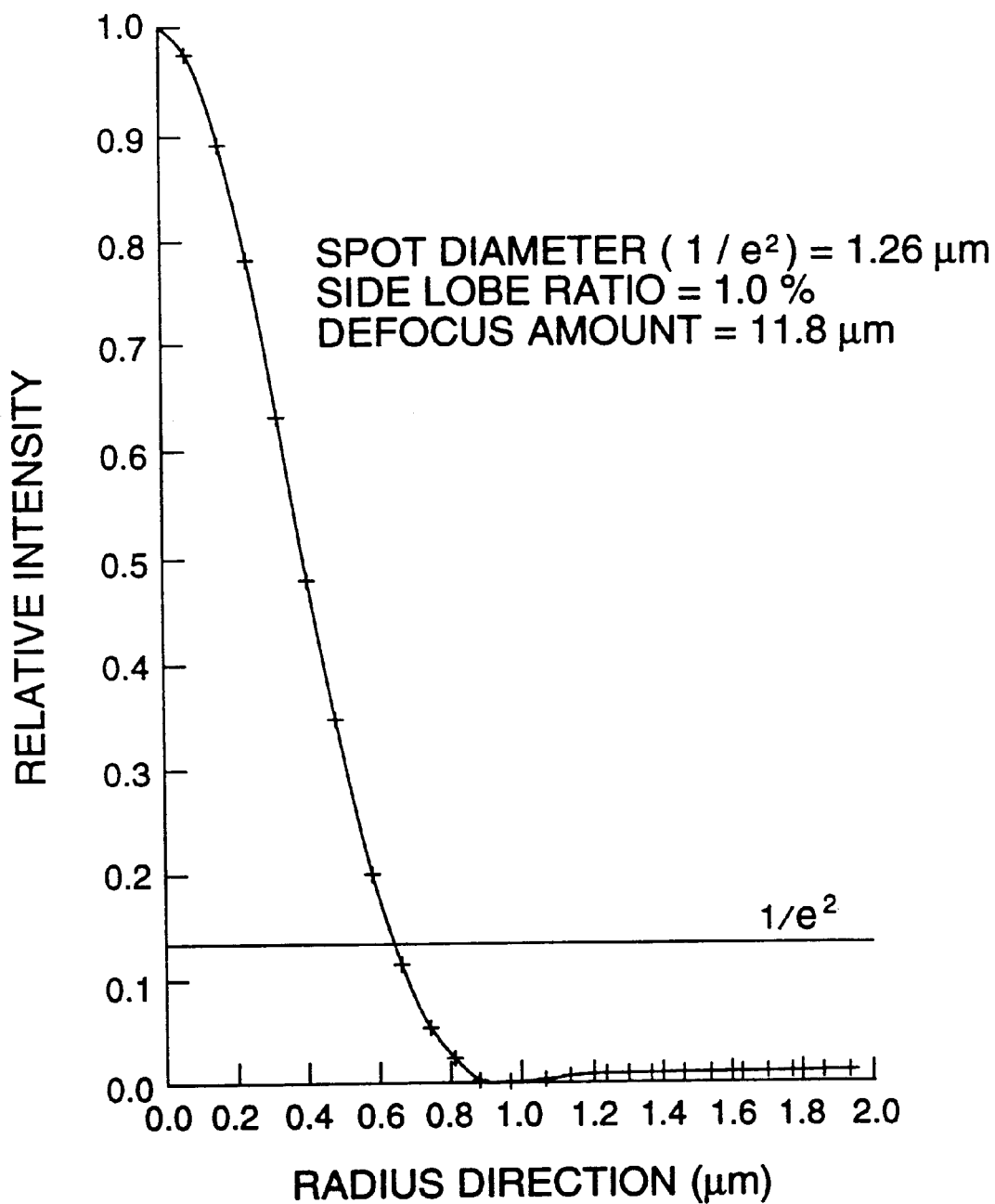

FIG. 34 represents a distribution diagram for relative intensity of a light-converged spot having the best spot shape obtained in the course of reproducing a CD-R with the objective in the sixth example.

Figure 35:
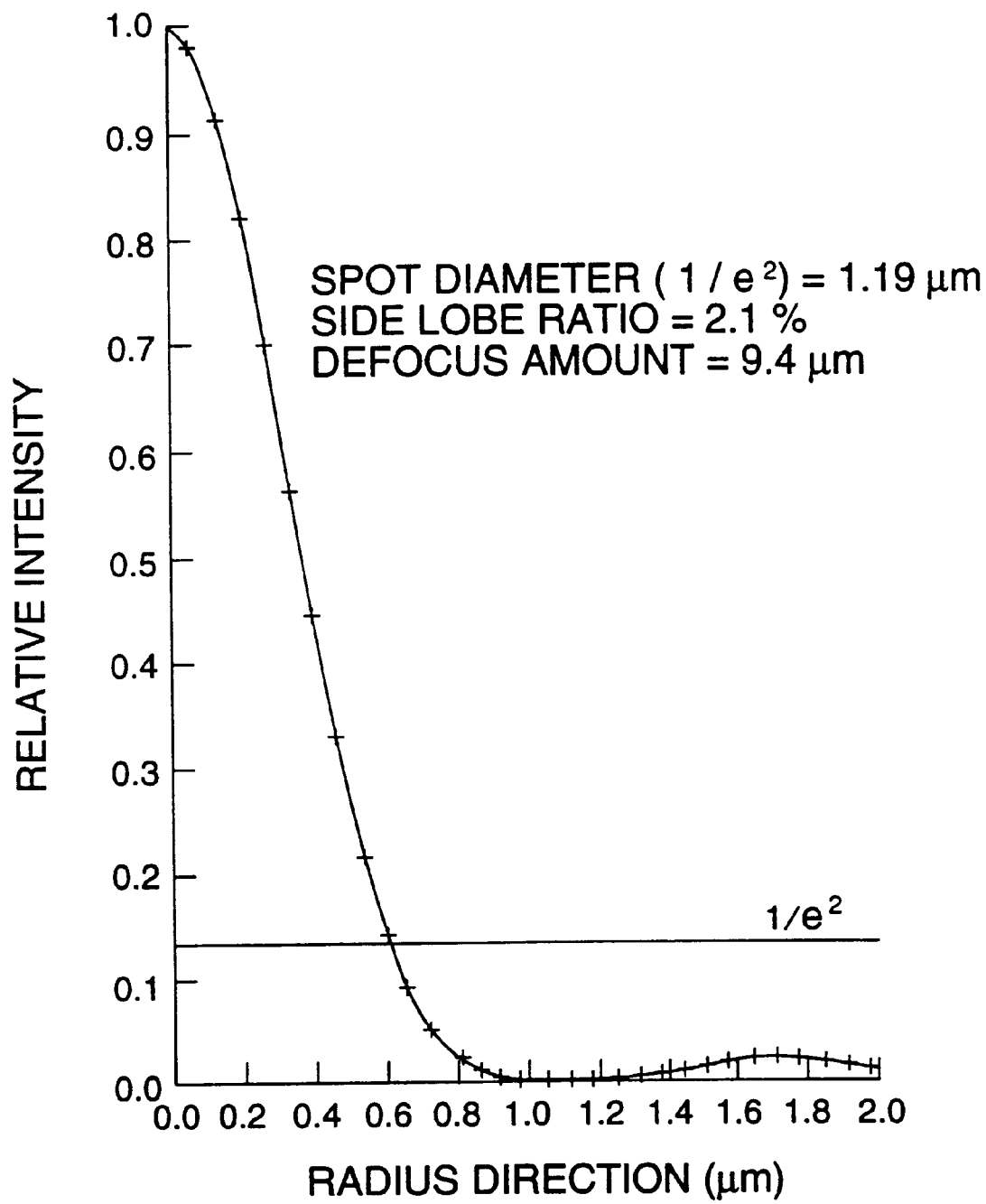

FIG. 35 represents a distribution diagram for relative intensity of a light-converged spot having the best spot shape obtained in the course of reproducing a CD with the objective lens at the wavelength of 635 nm in the sixth example.

Figure 36:
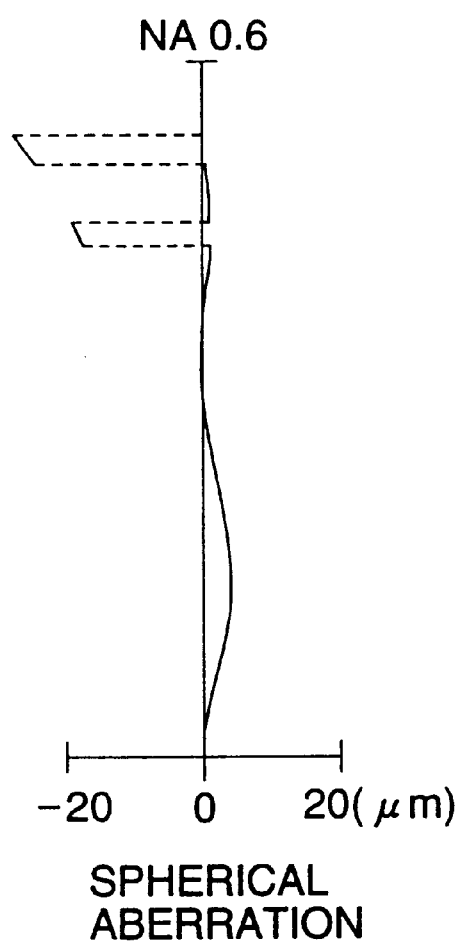
Figure 36:
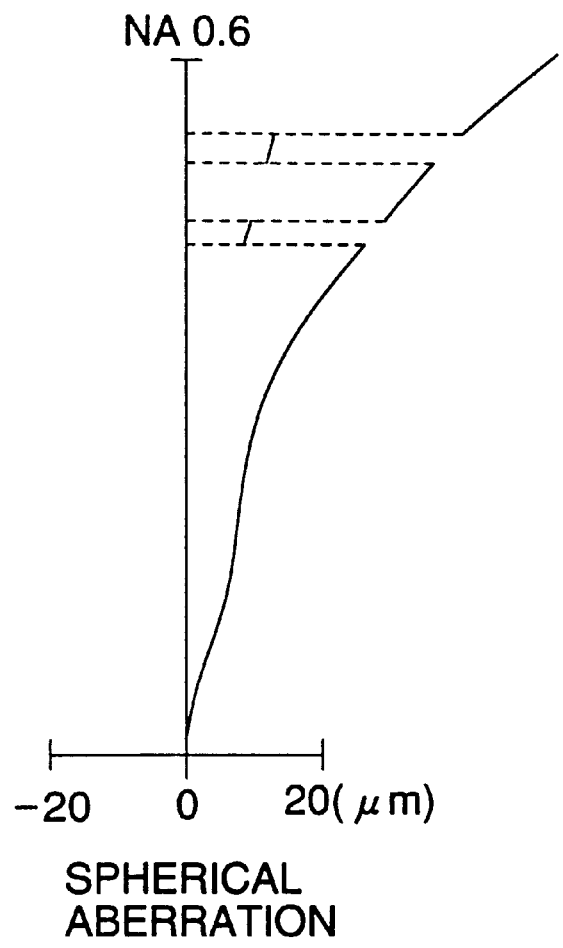

Each of FIGS. 36(a) and 36(b) is an aberration diagram of an objective lens in the seventh example.

Figure 37:
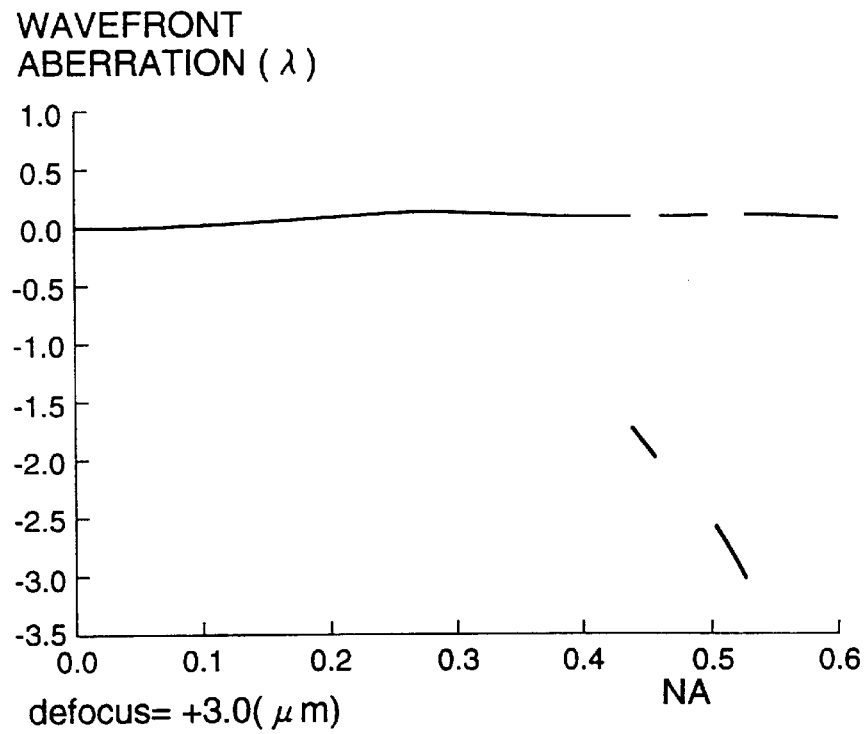
Figure 37:
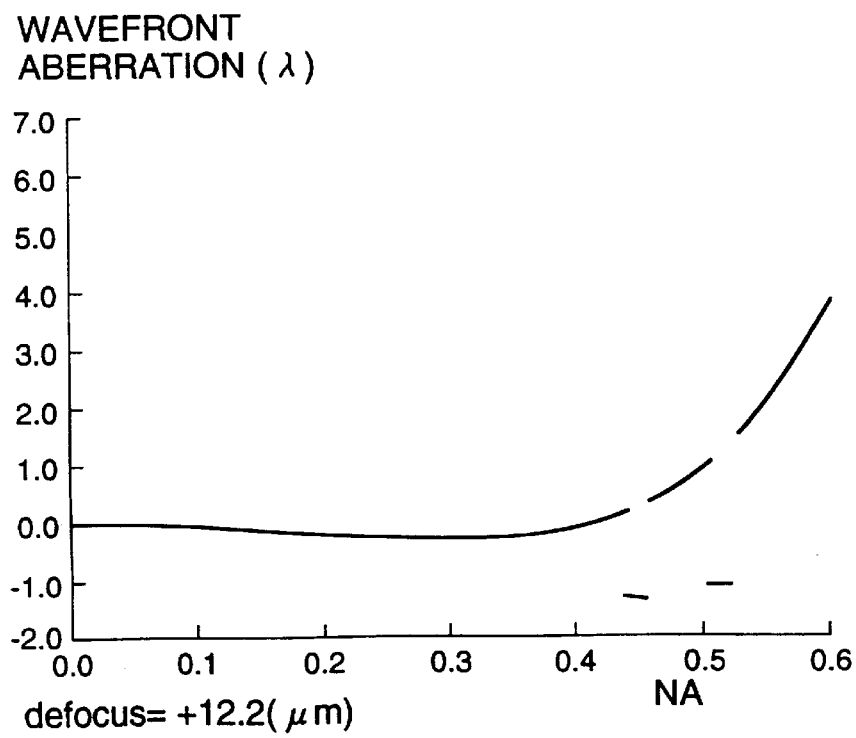

Each of FIGS. 37(a) and 37(b) is a diagram of wavefront aberration obtained by viewing in the state wherein the objective lens in the seventh example is defocused to the position where the best wavefront aberration is obtained.

Figure 38:
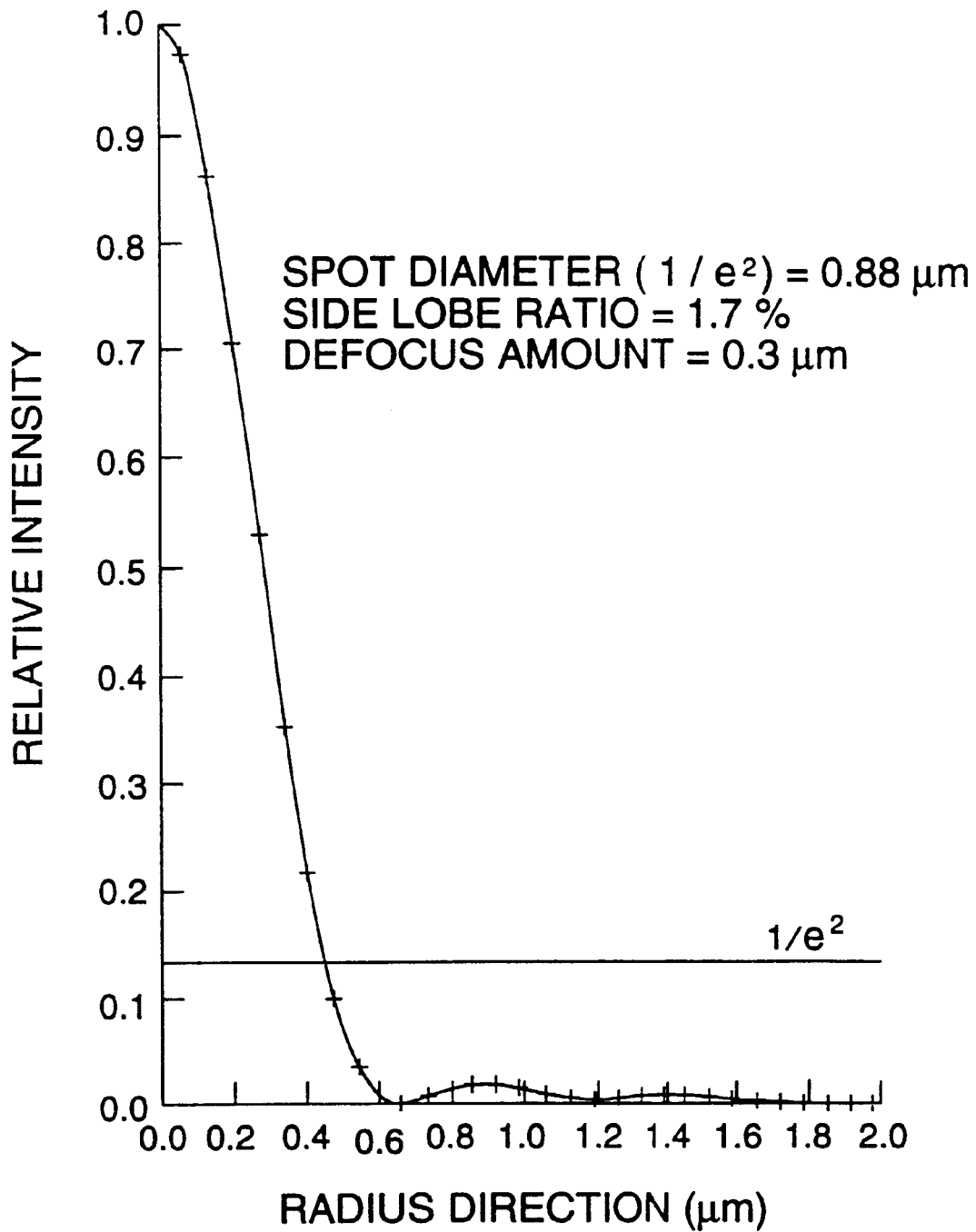

FIG. 38 is a distribution diagram for relative intensity of a light-converged spot having the best spot shape obtained in the course of reproducing a DVD with the objective lens in the seventh example.

Figure 39:
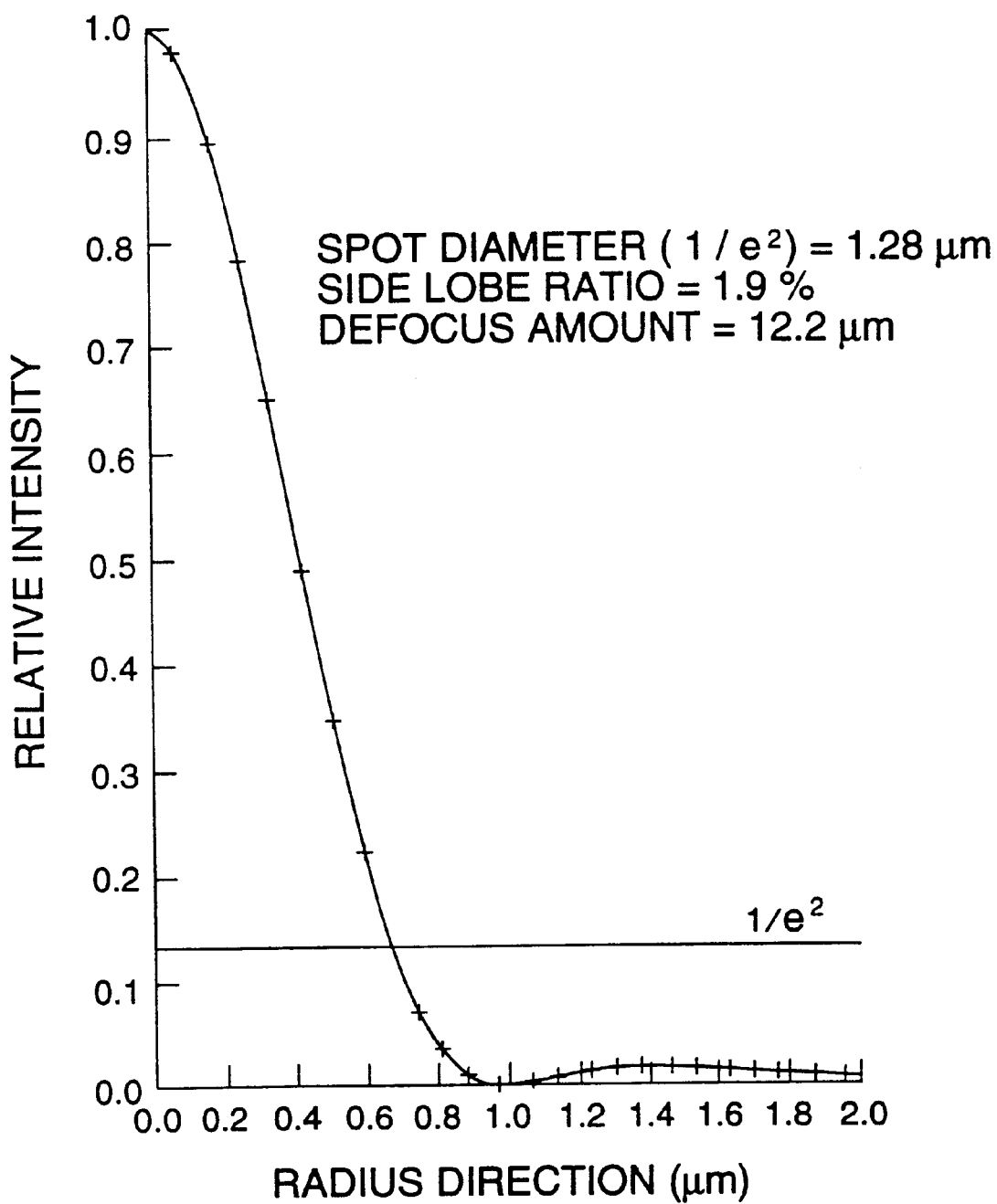

FIG. 39 represents a distribution diagram for relative intensity of a light-converged spot having the best spot shape obtained in the course of reproducing a CD-R with the objective in the seventh example.

Figure 40:
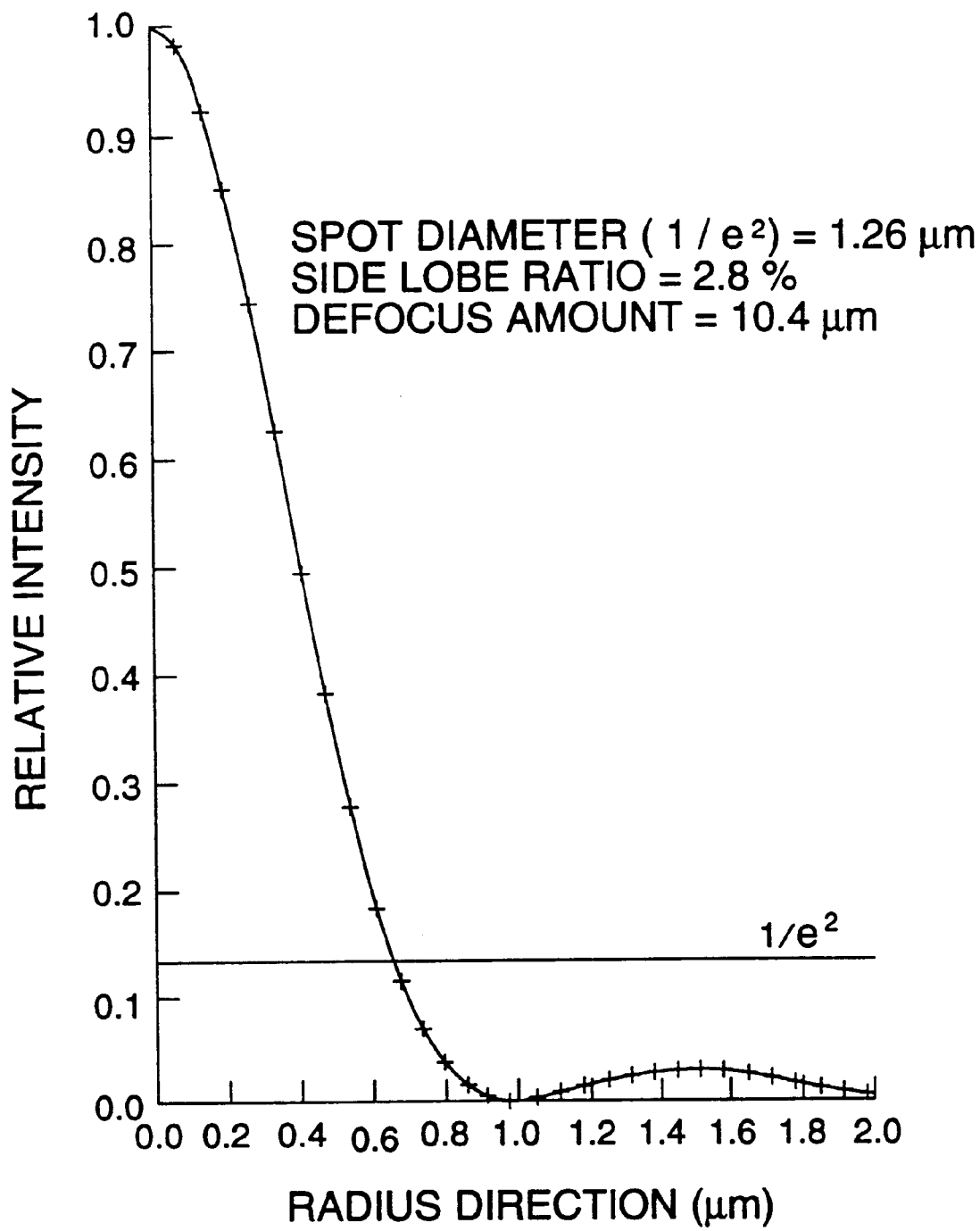

FIG. 40 represents a distribution diagram for relative intensity of a light-converged spot having the best spot shape obtained in the course of reproducing a CD with the objective lens at the wavelength of 635 nm in the seventh example.

Figure 41:
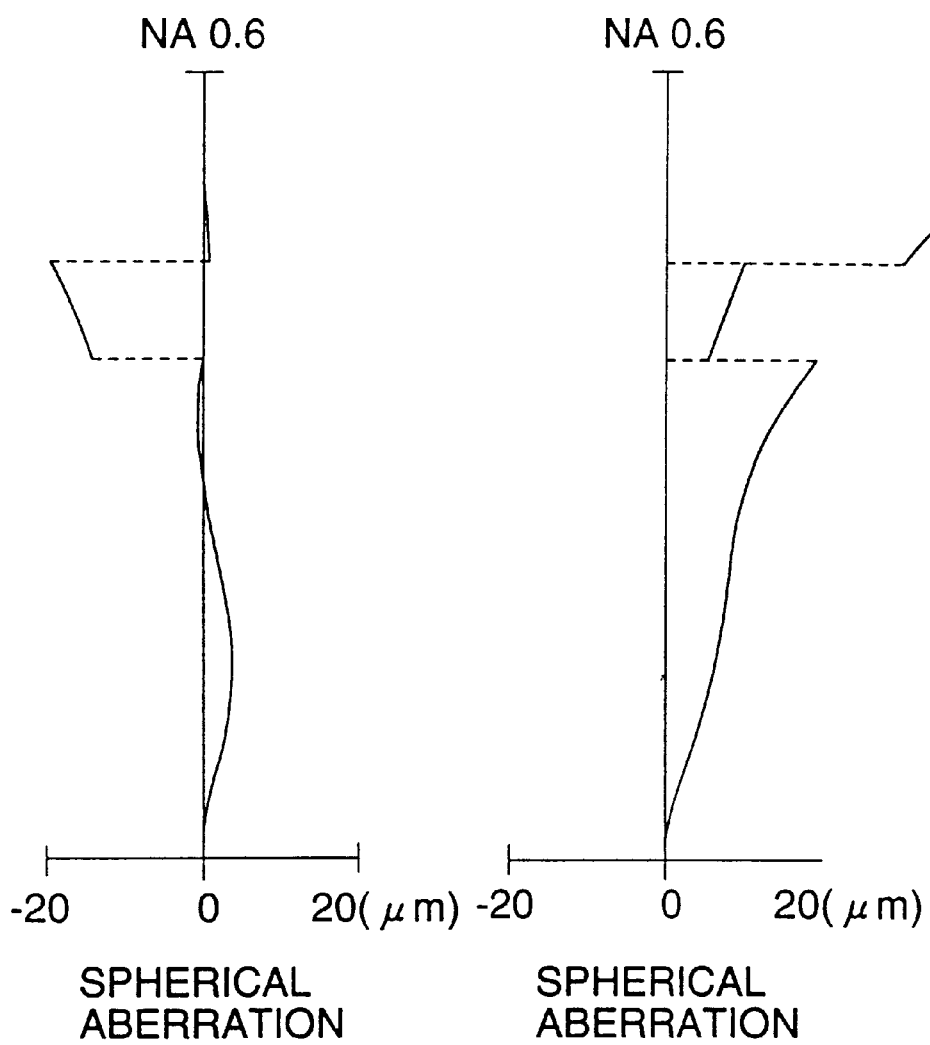

Each of FIGS. 41(a) and 41(b) is an aberration diagram of an objective lens in the eighth example.

Figure 42:
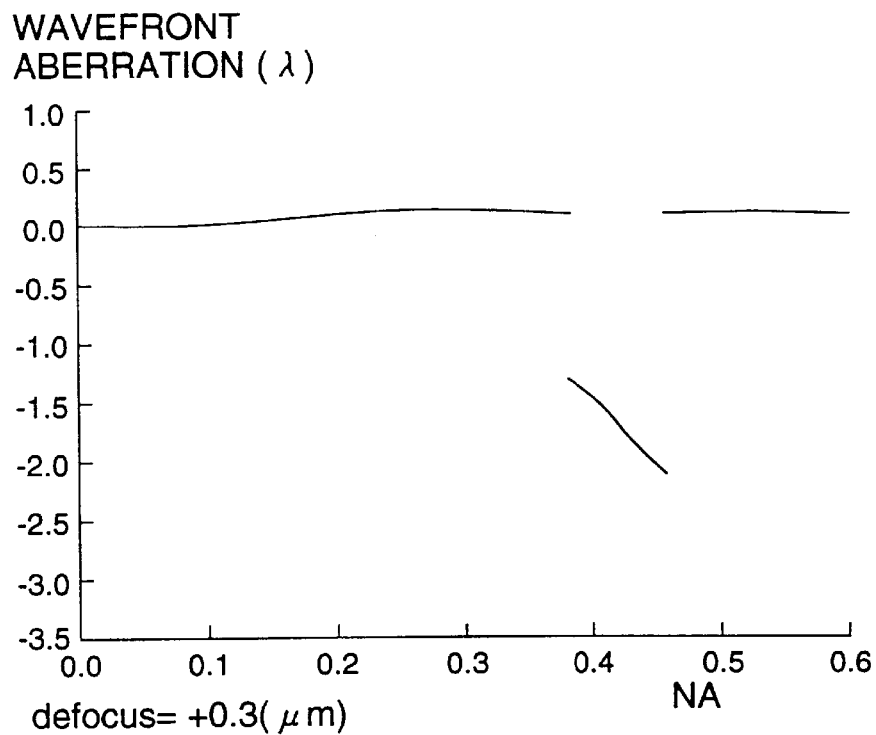
Figure 42:
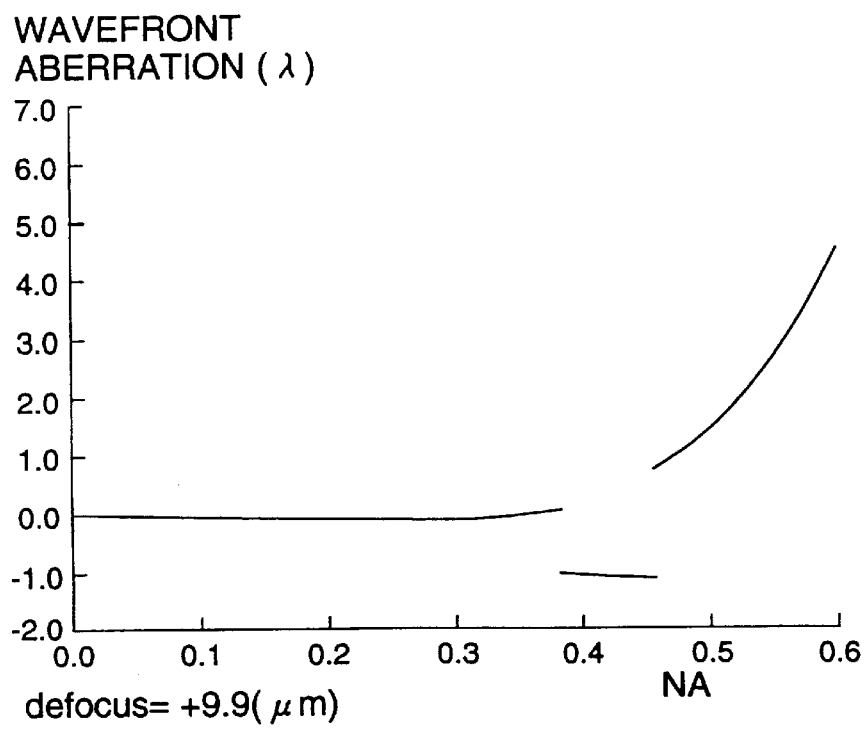

Each of FIGS. 42(a) and 42(b) is a diagram of wavefront aberration obtained by viewing in the state wherein the objective lens in the eighth example is defocused to the position where the best wavefront aberration is obtained.

Figure 43:
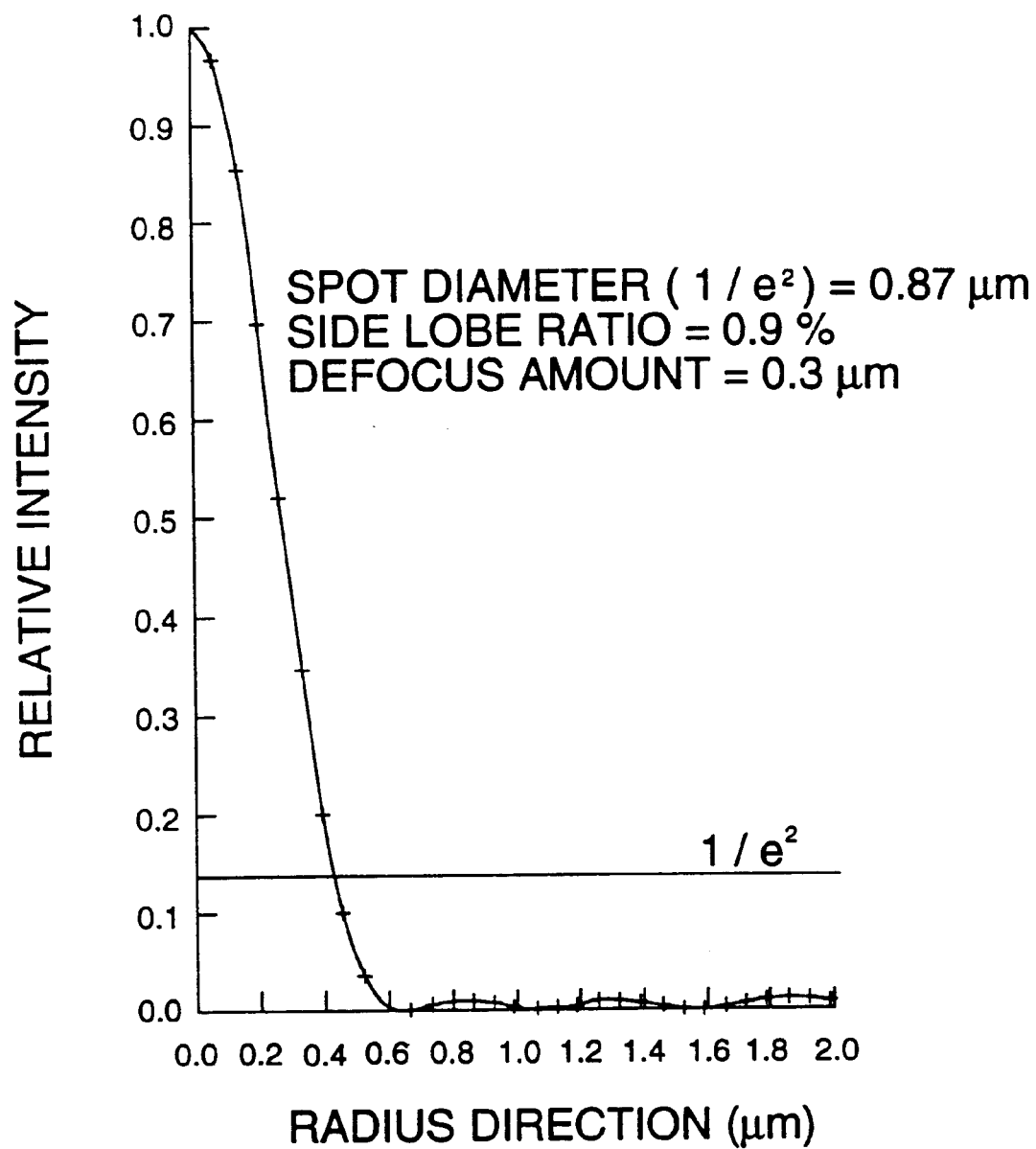

FIG. 43 is a distribution diagram for relative intensity of a light-converged spot having the best spot shape obtained in the course of reproducing a DVD with the objective lens in the eighth example.

Figure 44:
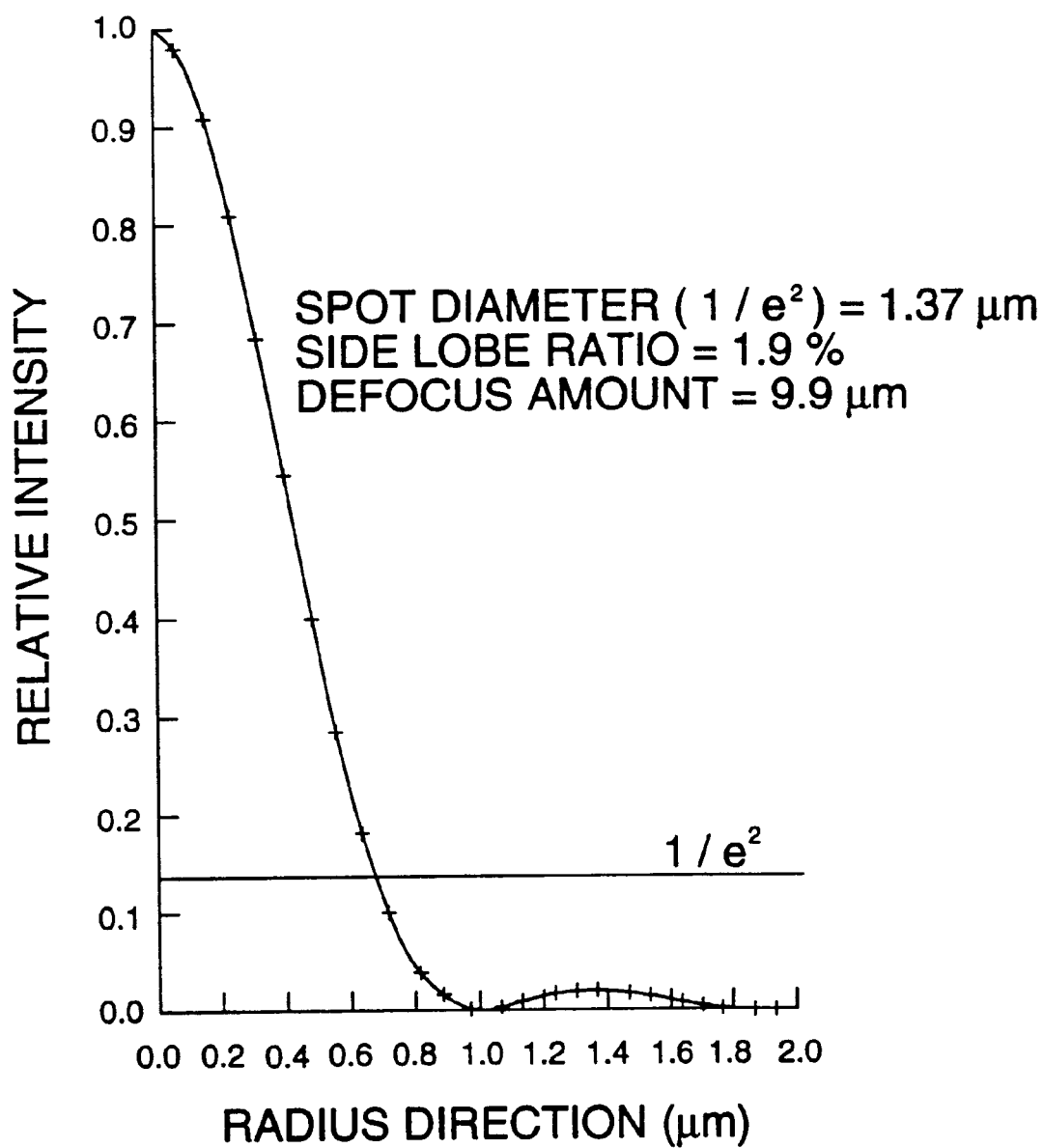

FIG. 44 represents a distribution diagram for relative intensity of a light-converged spot having the best spot shape obtained in the course of reproducing a CD with the objective in the eighth example.

Figure 45:
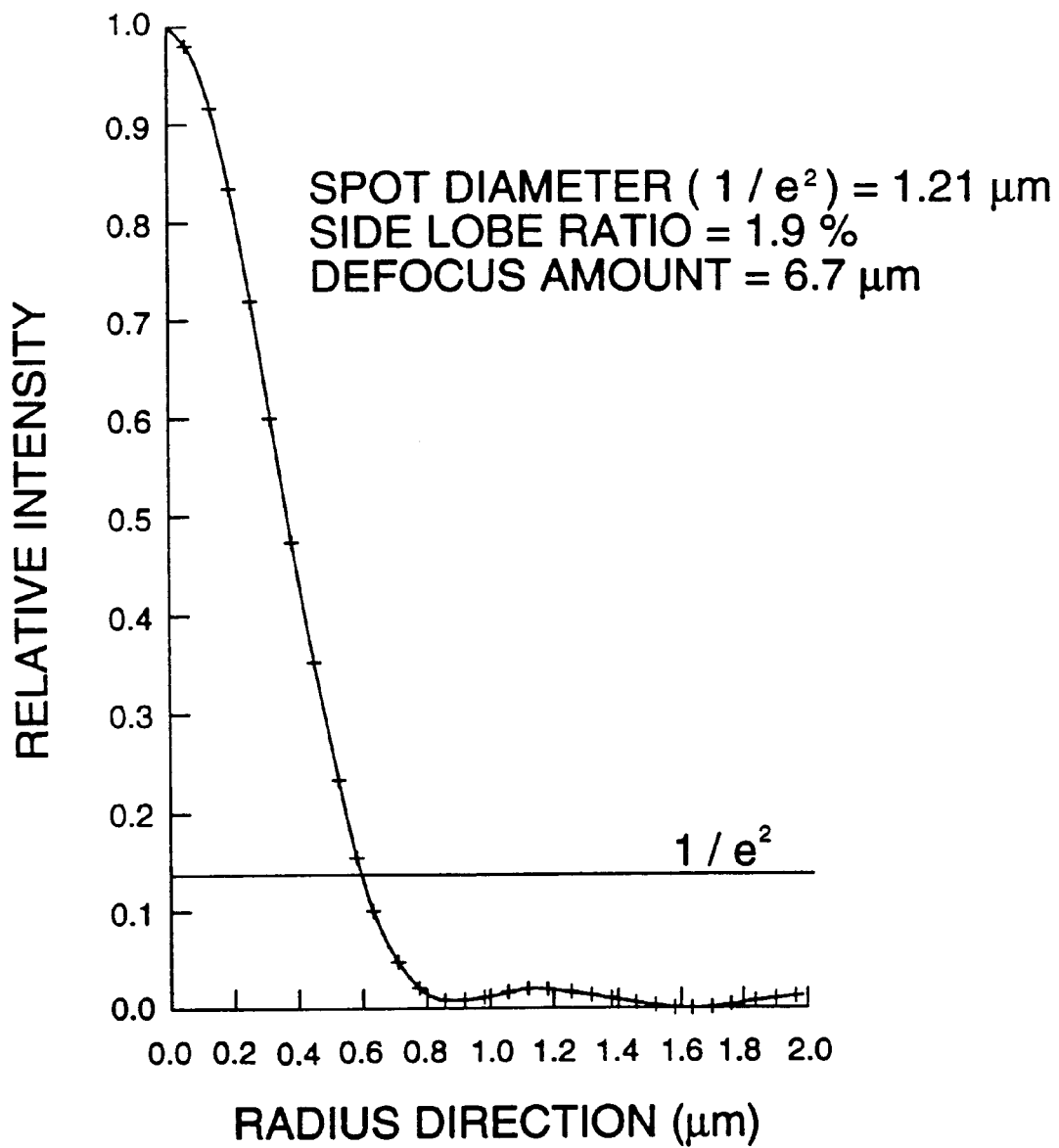

FIG. 45 represents a distribution diagram for relative intensity of a light-converged spot having the best spot shape obtained in the course of reproducing a CD with the objective lens at the wavelength of 635 nm in the eighth example.

Each of FIGS. 46(a) and 46(b) is an aberration diagram of an objective lens in the ninth example.

Each of FIGS. 47(a) and 47(b) is a diagram of wavefront aberration obtained by viewing in the state wherein the objective lens in the ninth example is defocused to the position where the best wavefront aberration is obtained.

Figure 48:
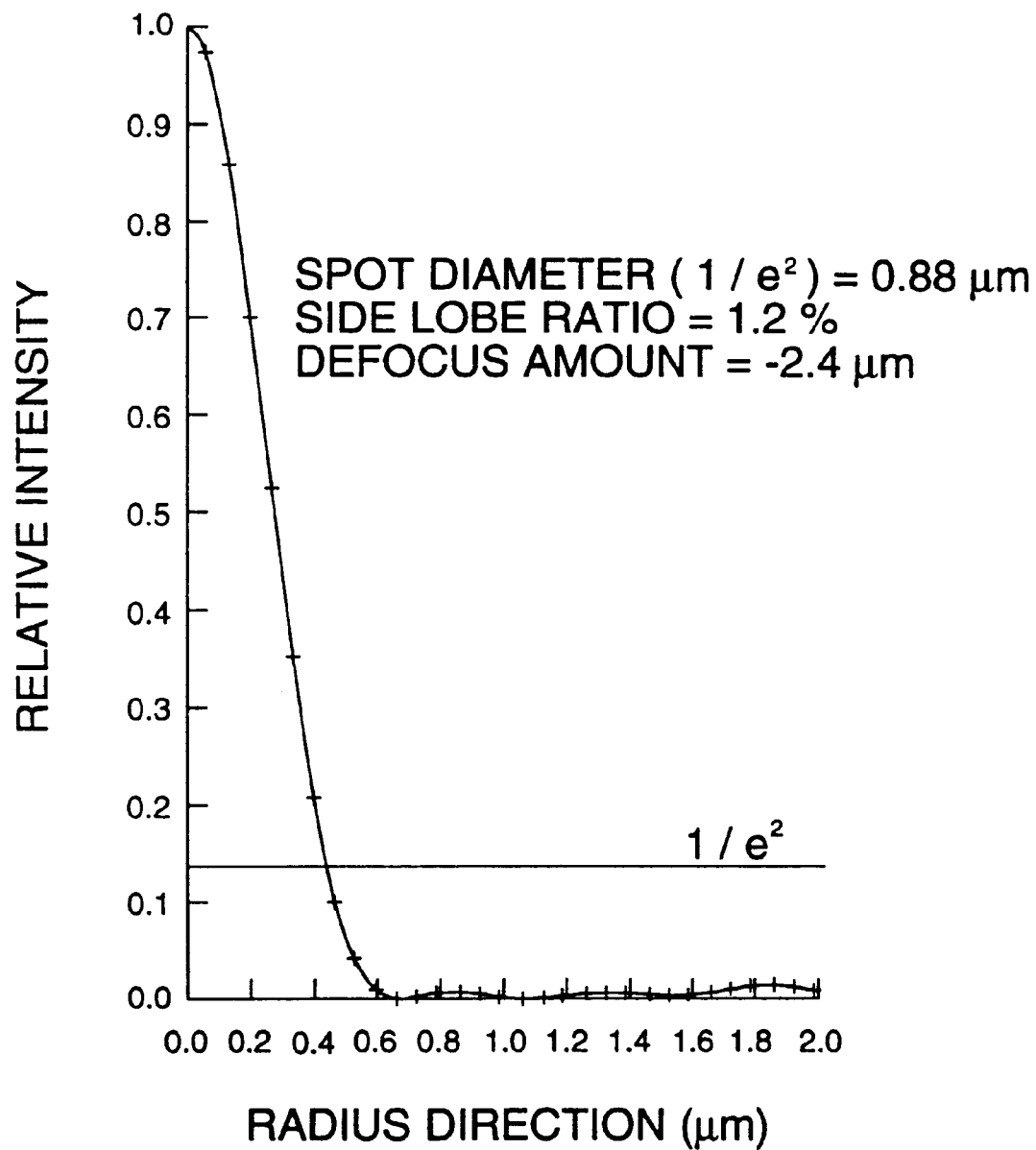

FIG. 48 is a distribution diagram for relative intensity of a light-converged spot having the best spot shape obtained in the course of reproducing a DVD with the objective lens in the ninth example.

Figure 49:
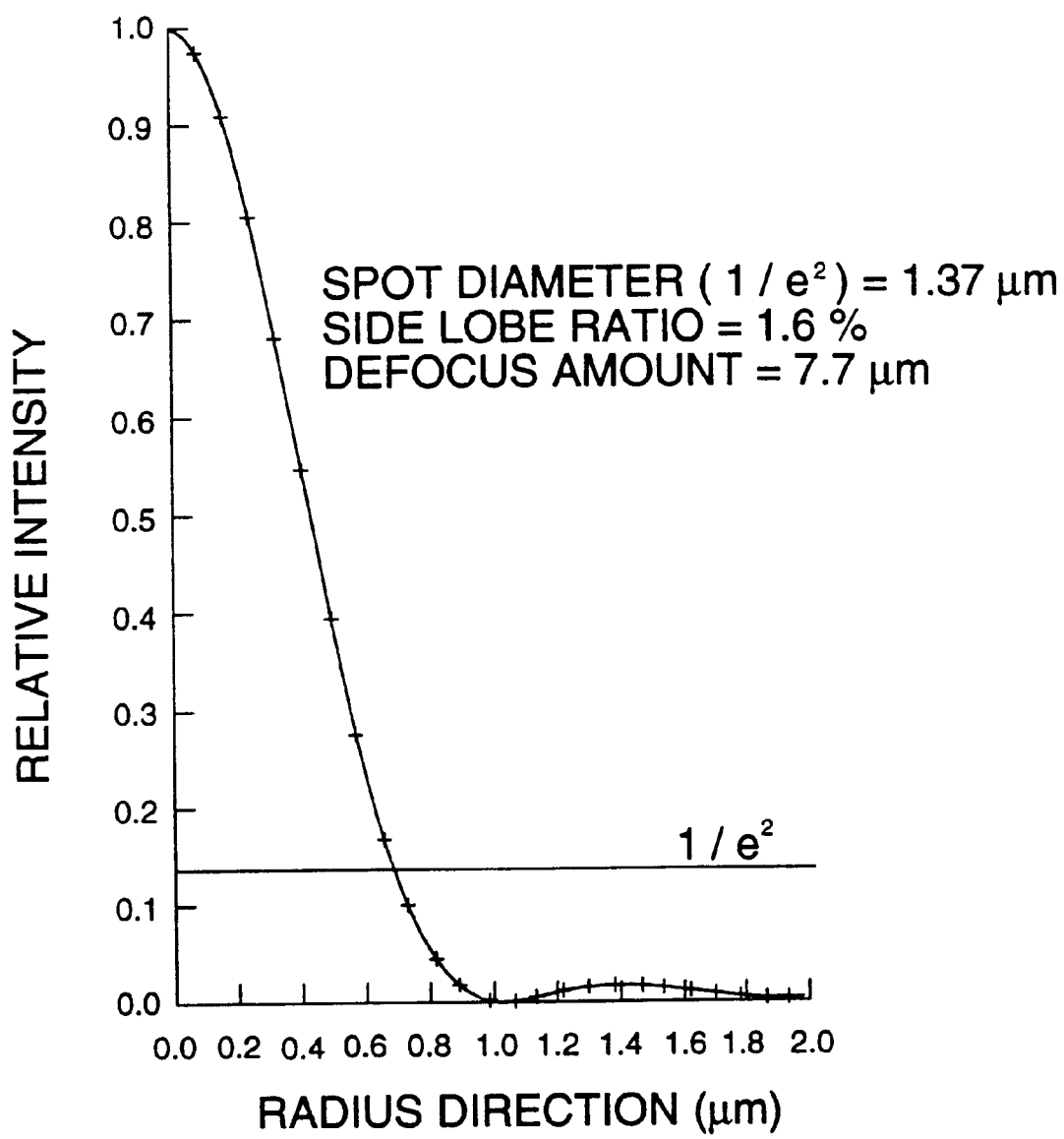

FIG. 49 represents a distribution diagram for relative intensity of a light-converged spot having the best spot shape obtained in the course of reproducing a CD with the objective in the ninth example.

Figure 50:
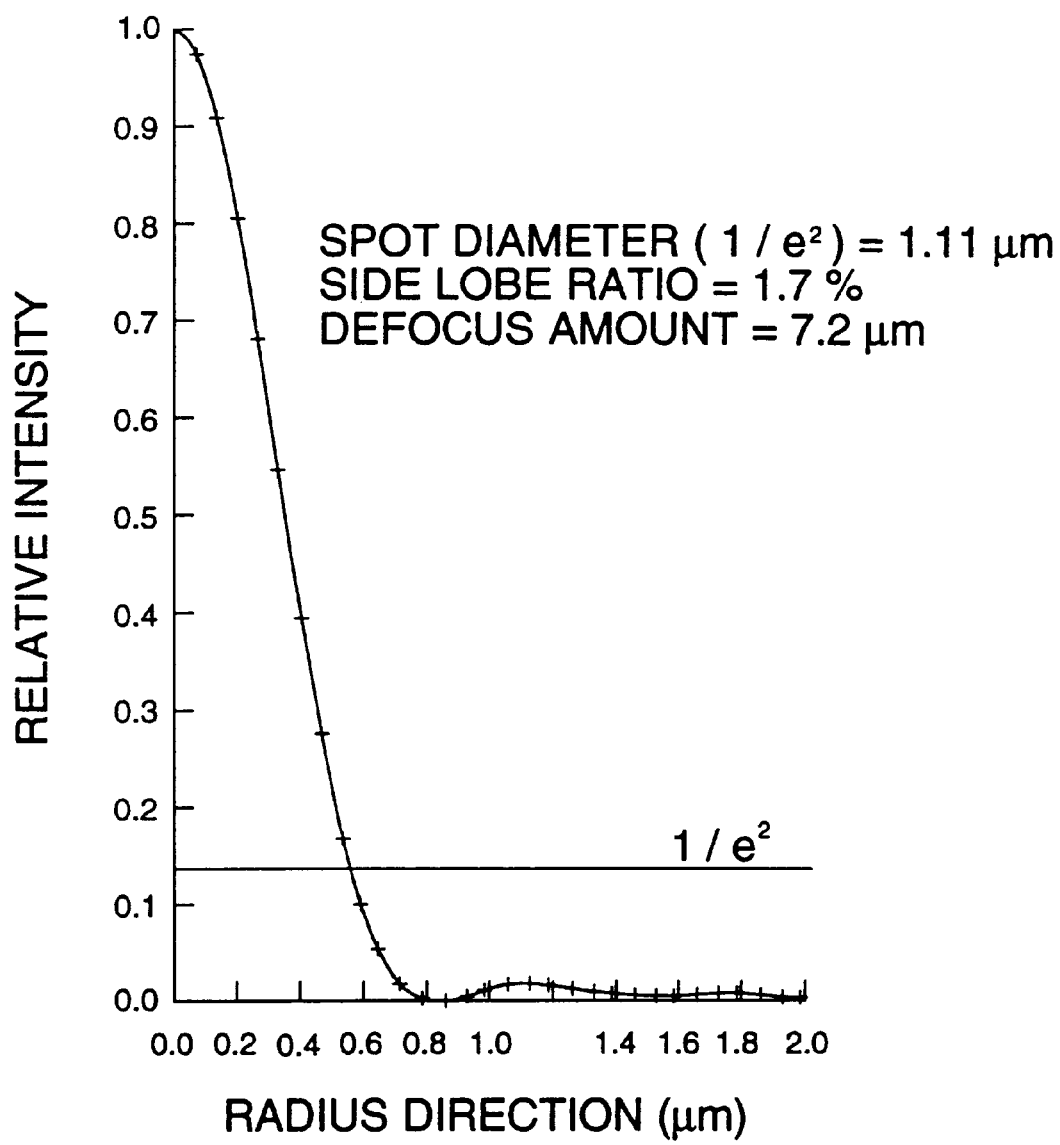

FIG. 50 represents a distribution diagram for relative intensity of a light-converged spot having the best spot shape obtained in the course of reproducing a CD with the objective lens at the wavelength of 635 nm in the ninth example.

Each of FIGS. 51(a) and 51(b) is an aberration diagram of an objective lens in the tenth example.

Figure 52:
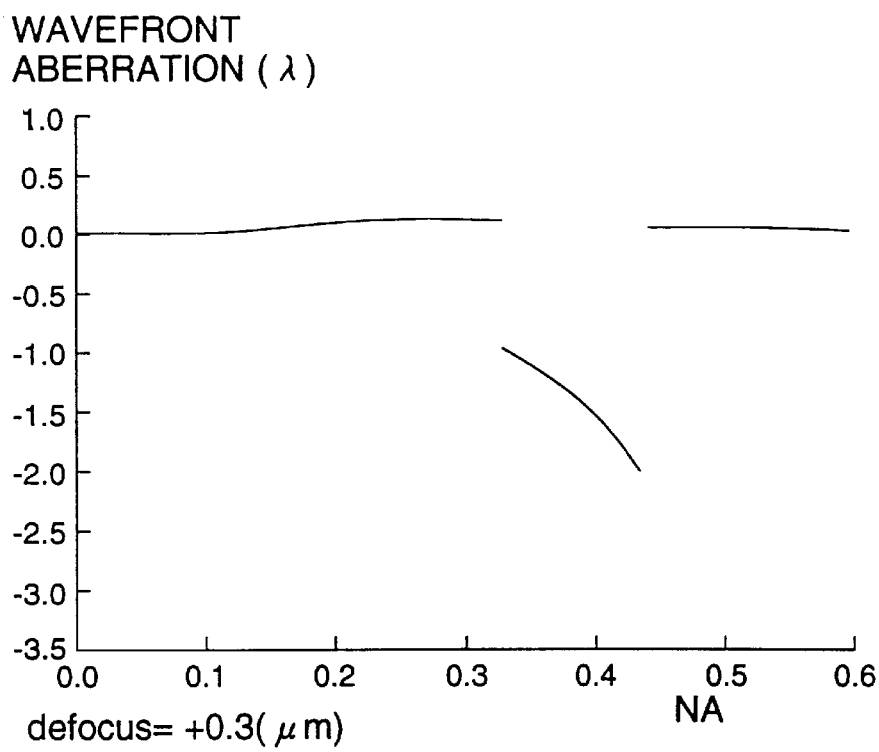
Figure 52:
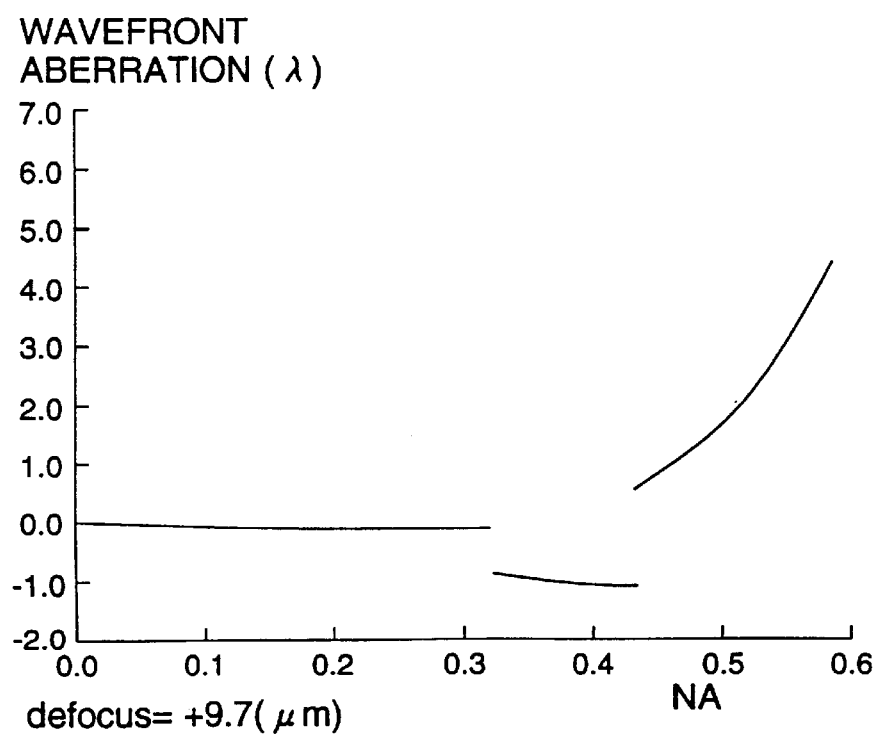

Each of FIGS. 52(a) and 52(b) is a diagram of wavefront aberration obtained by viewing in the state wherein the objective lens in the tenth example is defocused to the position where the best wavefront aberration is obtained.

Figure 53:
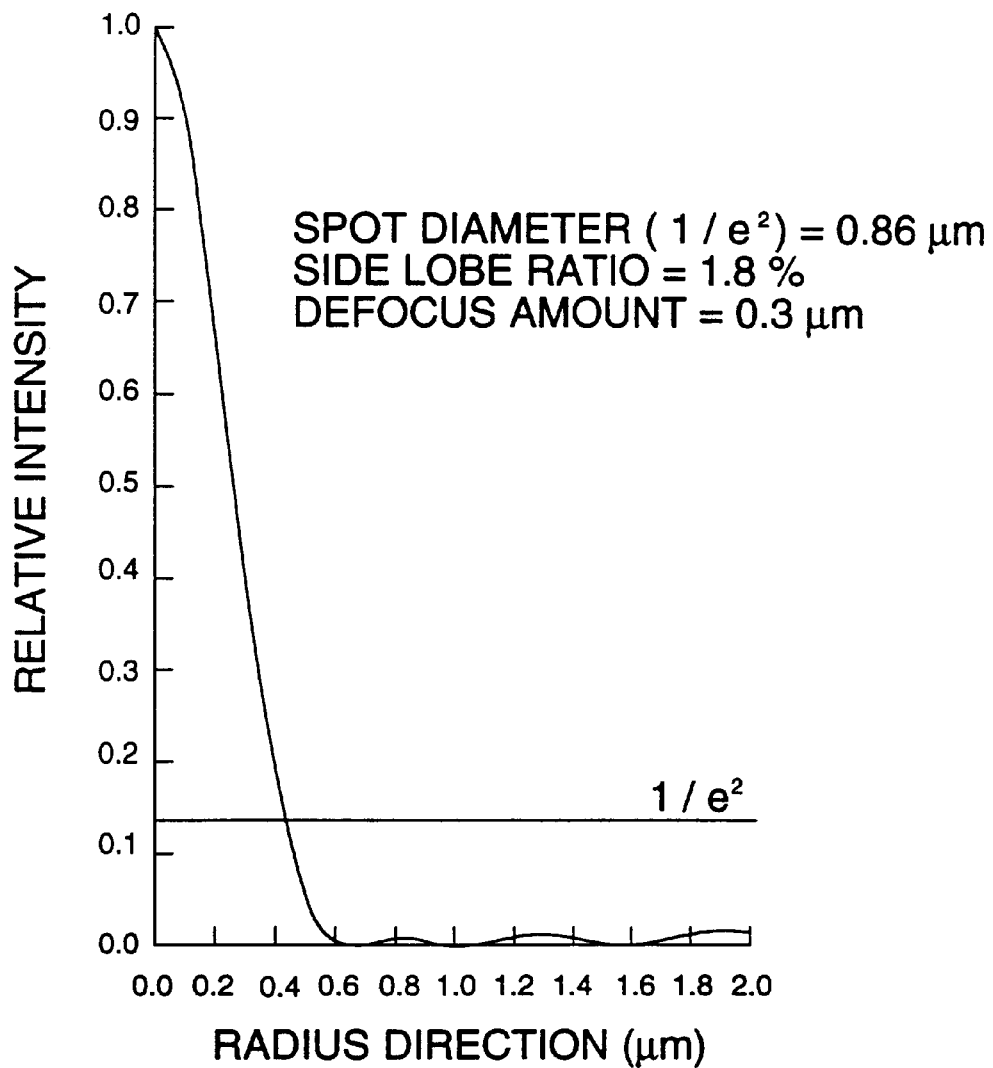

FIG. 53 is a distribution diagram for relative intensity of a light-converged spot having the best spot shape obtained in the course of reproducing a DVD with the objective lens in the tenth example.

Figure 54:
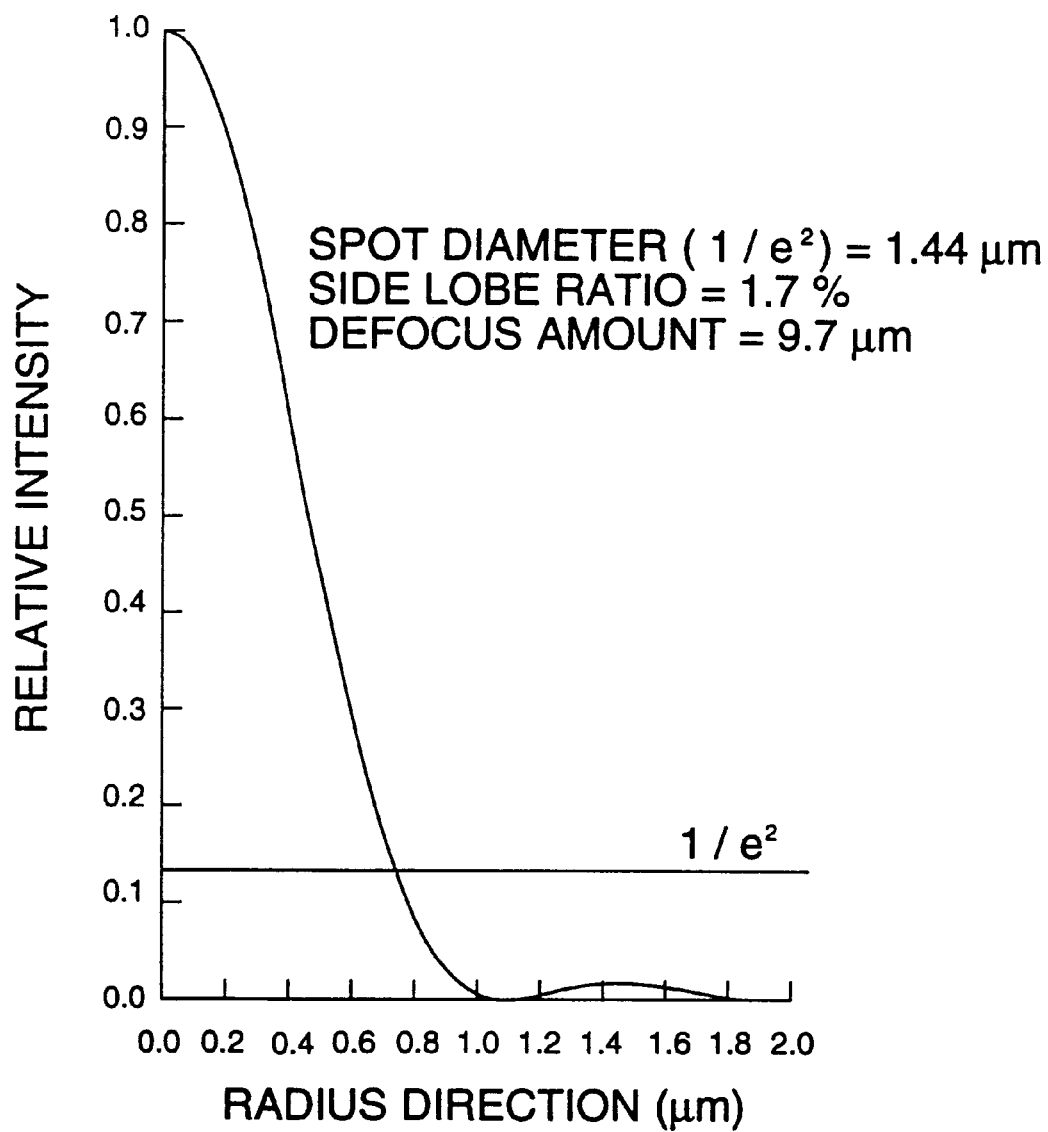

FIG. 54 represents a distribution diagram for relative intensity of a light-converged spot having the best spot shape obtained in the course of reproducing a CD with the objective in the tenth example.

Figure 55:
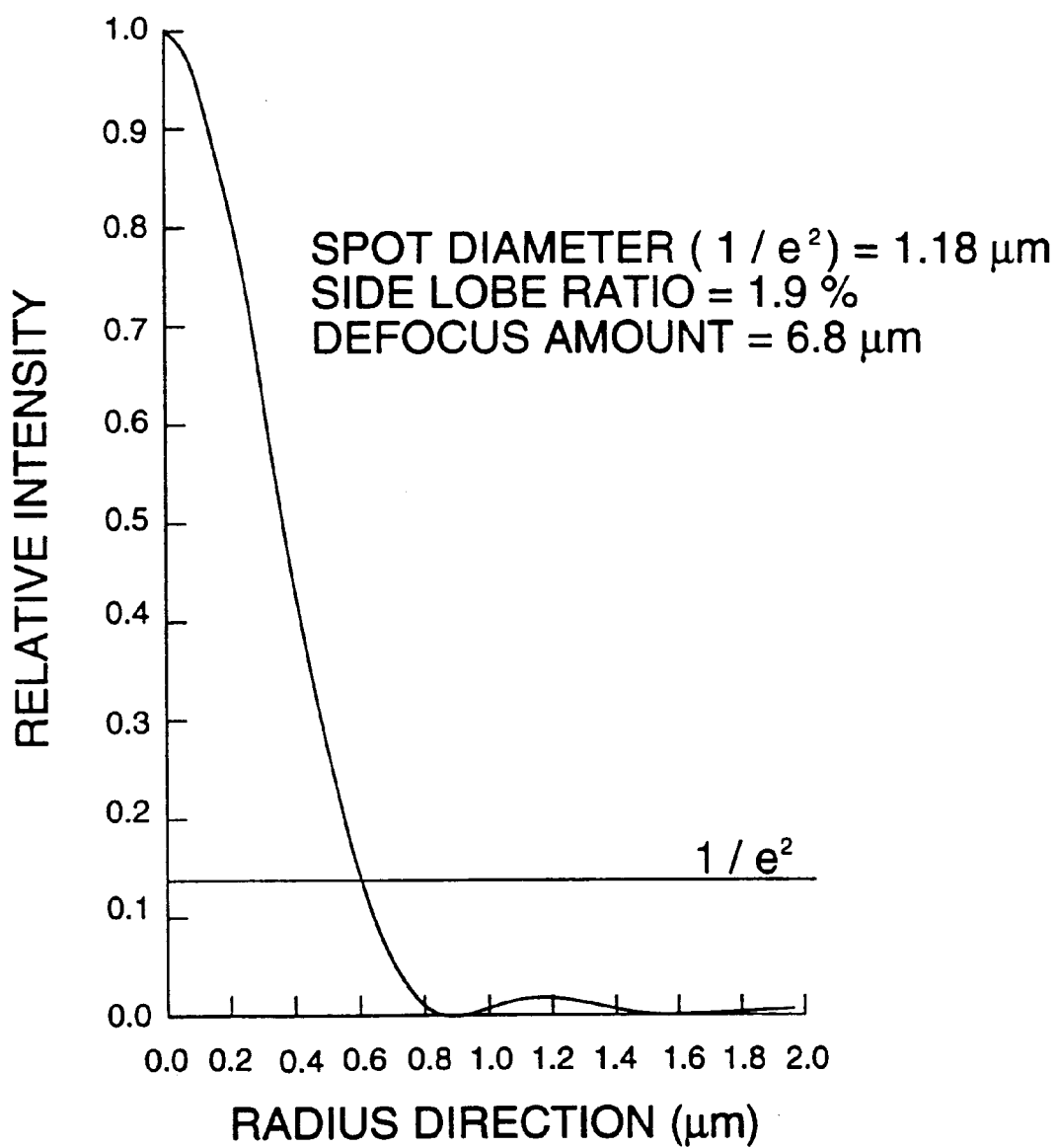

FIG. 55 represents a distribution diagram for relative intensity of a light-converged spot having the best spot shape obtained in the course of reproducing a CD with the objective lens at the wavelength of 635 nm in the tenth example.

DETAILED DESCRIPTION OF THE PREFERRED EMBODIMENT

The basic concept of the invention will be explained as follows.

Figure 1:
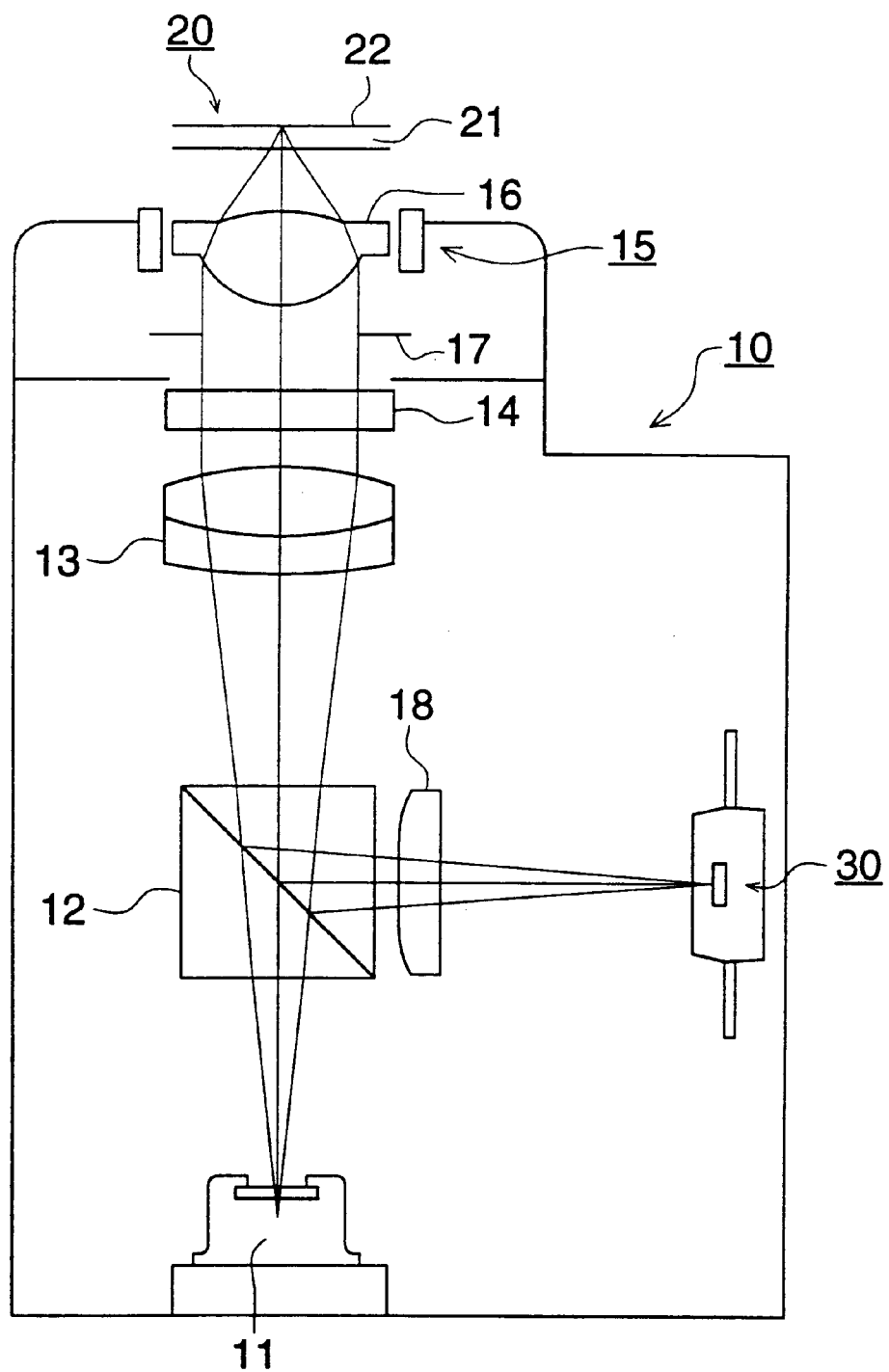
FIG. 1 is a schematic structure diagram of an optical pickup apparatus.

First, an optical pickup apparatus will be explained. FIG. 1 is a schematic structure diagram of an optical pickup apparatus having a single light source.

Optical pickup apparatus 10 is composed of semiconductor laser 11 representing a light source (wavelength $\lambda$=610–670 nm), polarized beam splitter 12, collimator lens 13, quarter wavelength plate 14, aperture-stop 17, objective lens 16, cylindrical lens 18 representing an astigmatism element which generates astigmatism, photo-detector 30, and 2-dimensional actuator 15 used for focus control and tracking control.

A light flux emitted from semiconductor laser 11 passes through polarized beam splitter 12, collimator lens 13, and quarter wavelength plate 14 to become a collimated light flux that is a circularly polarized light. This light flux is diaphragmed by aperture-stop 17 and then is converged by objective lens 16 on information recording plane 22 through transparent substrate 21 of optical disk 20. Then the light flux modulated by an information bit and reflected on the information recording plane 22 passes through again the objective lens 16, the quarter wavelength plate 14 and the collimator lens 13, to enter the polarized beam splitter 12 where the light flux is reflected and is given astigmatism by cylindrical lens 18, and then enters the photo-detector 30 wherein signals outputted from the photo-detector 30 are used to obtain reading (reproducing) signals for information recorded on the optical disk 20. Further, a change in light amount distribution caused by a change of the shape of a spot on the photo-detector 30 is detected for in-focus detection and track detection. Namely, output from the photo-detector 30 is used so that focus error signals and tracking error signals are generated by a processing circuit which is not illustrated here. The objective lens 16 is moved in the direction of the optical axis so that the 2-dimensional actuator (for focus control) 15 may cause light from the semiconductor laser 11 to form an image on the information recording plane 22 based on the focus error signals, and the objective lens 16 is moved in the direction perpendicular to the optical axis so that the 2-dimensional actuator (for tracking control) 15 may cause light from the semiconductor laser 11 to form an image on the prescribed track based on the tracking error signals.

In the optical pickup apparatus 10 mentioned above, when reproducing the first optical disk whose transparent substrate thickness is t1, such as DVD (t1=0.6 mm), for example, the objective lens 16 is driven by 2-dimensional actuator 15 so that a beam spot may form a least circle of confusion (best focus). When reproducing the second optical disk such as, for example, CD (t2=1.2 mm) whose transparent substrate thickness is t2 which is different from t1 (preferably, t2>t1) and whose recording density is lower than that of the first optical disk, by the use of the objective lens 16, it is not possible to read (reproduce) bits (information) in the second optical disk because spherical aberration is caused for the reason that the transparent substrate thickness is different (preferably, to be larger) and that the spot size is larger at the position where the beam spot becomes the least circle of confusion (the position behind a paraxial focal point position). However, at the front side position (front focus) which is closer to the objective lens 16 than the position where the beam spot becomes the least circle of confusion, there is formed a core having on its central portion a quantity of light concentrically and there is formed a flare representing unwanted light around the core, although a size of the total spot is greater than the least circle of confusion. This core is used for reproducing (reading) bits (information) of the second optical disk, and when reproducing the second optical disk, 2-dimensional actuator 15 is driven so that the objective lens 16 may be made to be in its defocused state (front focus).

Figure 2A:
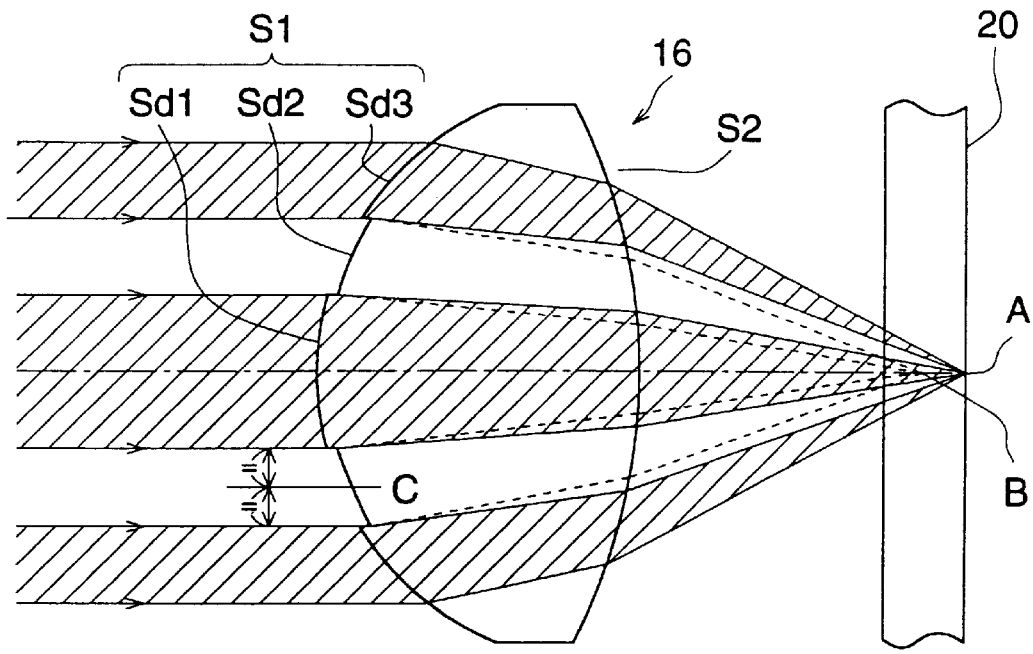
FIGS. 2(a) is a sectional view illustratively showing an objective lens and 2(b) is its front view viewed from the light source side.
Figure 2B:
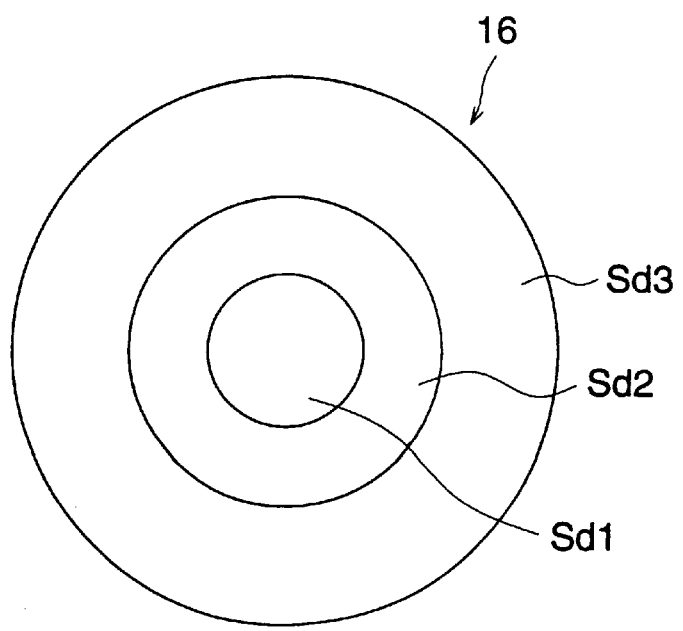

Next, there will be explained a first embodiment wherein the invention is applied to objective lens 16 representing one of a light-converging optical system of optical pickup apparatus 10 to reproduce the first optical disk and the second optical disk both differing each other in terms of transparent substrate thickness as stated above. In FIGS. 2(a) and 2(b), a sectional view showing objective lens 16 conceptually is shown in FIG. 2(a), and a front view thereof viewed from a light source is shown in FIG. 2(b). Incidentally, a one-dot chain line shows an optical axis. In the present embodiment, incidentally, transparent substrate thickness t1 of the first optical disk is smaller than transparent substrate thickness t2 of the second optical disk, and optical information is recorded more densely in the first optical disk than in the second optical disk.

Objective lens 16 is a convex lens having positive refracting power wherein both refracting surface S1 on the light source side and refracting surface S2 on the optical disk 20 side are aspherical in shape. The refracting surface S1 of the objective lens on the light source side is composed of plural (three) divided surfaces Sd1–Sd3 which are concentric with the optical axis. Steps are provided on boundaries between the divided surfaces Sd1–Sd3 to form each of the divided surfaces Sd1–Sd3. In an arrangement in this objective lens 16, a light flux (first light flux) which passes through the first divided surface Sd1 including the optical axis is used to reproduce information recorded in the first optical disk and to reproduce information recorded in the second optical disk, a light flux (second light flux) which passes through the second divided surface Sd2 which surrounds the first divided surface Sd1 is mainly used to reproduce information recorded in the second optical disk, and a light flux (third light flux) which passes through the third divided surface Sd3 which surrounds the second divided surface Sd2 is mainly used to reproduce information recorded in the first optical disk.

Wording "mainly" in this case means, in the case of a light flux passing through the second divided surface Sd2, that a ratio of energy of the core portion at the position where the central intensity of a beam spot is maximum under the condition that a light flux passing through the third divided surface Sd3 is shielded to that of the core portion at the position where the central intensity of a beam spot is maximum under the condition that a light flux passing through the third divided surface Sd3 is not shielded ("light-shielded core energy"/"light-non-shielded core energy") is within a range of 60–100%. Incidentally, a simple method for measuring the energy ratio is to measure the peak intensity Ip at the position where the central intensity of a beam spot is maximum and beam diameter Dp (to set the position where intensity is $e^{-2}$ for the central intensity) in each occasion, and to obtain values of Ip×Dp to compare them, because the shape of a core portion is mostly constant.

By using the light flux emitted from the light source as stated above in the manner that the first light flux in the vicinity of an optical axis of a light-converging optical system is used to reproduce the first and second optical disks, the second light flux that surrounds the first light flux is mainly used to reproduce the second optical disk, and the third light flux surrounding the second light flux is mainly used to reproduce the first optical disk, it is possible to reproduce plural optical disks (two optical disks in the present embodiment) with a single light-converging optical system, while minimizing a loss of a quantity of light from a light source. In addition, when reproducing the second optical disk, the greater part of the third light flux is an unwanted light, and this unwanted light is not utilized to reproduce the second optical disk, therefore, aperture-stop 17 has only to be adjusted, for reproducing, to its numerical aperture that is necessary to reproduce the first optical disk, requiring no means to change the numerical aperture of the aperture-stop 17.

To say more precisely, when reproducing the first optical disk (see FIG. 2(a)), the objective lens 16 causes each of the first light flux and the third light flux (light fluxes shown with hatched lines) passing respectively through the first divided surface Sd1 and the third divided surface Sd3 to form an image on the first image forming position A which mostly agrees in terms of position for both light fluxes, and their wavefront aberrations (wavefront aberrations excluding that for the second light flux) are not more than 0.05 $\lambda$rms.

In this case, the second light flux (light fluxes shown with broken lines) passing through the second divided surface Sd2 forms an image on the second image forming position B which is different in terms of position from the first image forming position A. When assuming that the first image forming position A is nearly 0 (zero) and a distance from it toward the objective lens 16 is negative and a distance toward the opposite side is positive, this second image forming position B is made to be away from the first image forming position A by the distance of $-27$ $\mu$m to $-4$ $\mu$m (the second image forming position B is made to be closer to the objective lens than the first image forming position A). Owing to this, the first optical disk is reproduced mainly by the first light flux and the third light flux. Incidentally, when the lower limit ($-27$ $\mu$m) is exceeded, spherical aberration is corrected excessively, resulting in a poor spot shape for reproduction of the first light flux, while when the upper limit ($-4$ Mm) is exceeded, a spot diameter and a side lobe for reproduction of the second light flux are made larger. Incidentally, in the present embodiment, the second image forming position B is made to be away from the first image forming position A by the distance of $-27$ $\mu$m to $-4$ $\mu$m because of conditions of t1<t2 and NA1>NA2. However, in the case of t1>t2 and NA1>NA2, or t1<t2 and NA1<NA2, the second image forming position B is made to be away from the first image forming position A by the distance of 4 $\mu$m–27 $\mu$m. Namely, the absolute value of the distance between the first image forming position A and the second image forming position B is made to be within a range of 4 $\mu$m–27 $\mu$m.

Figure 3:
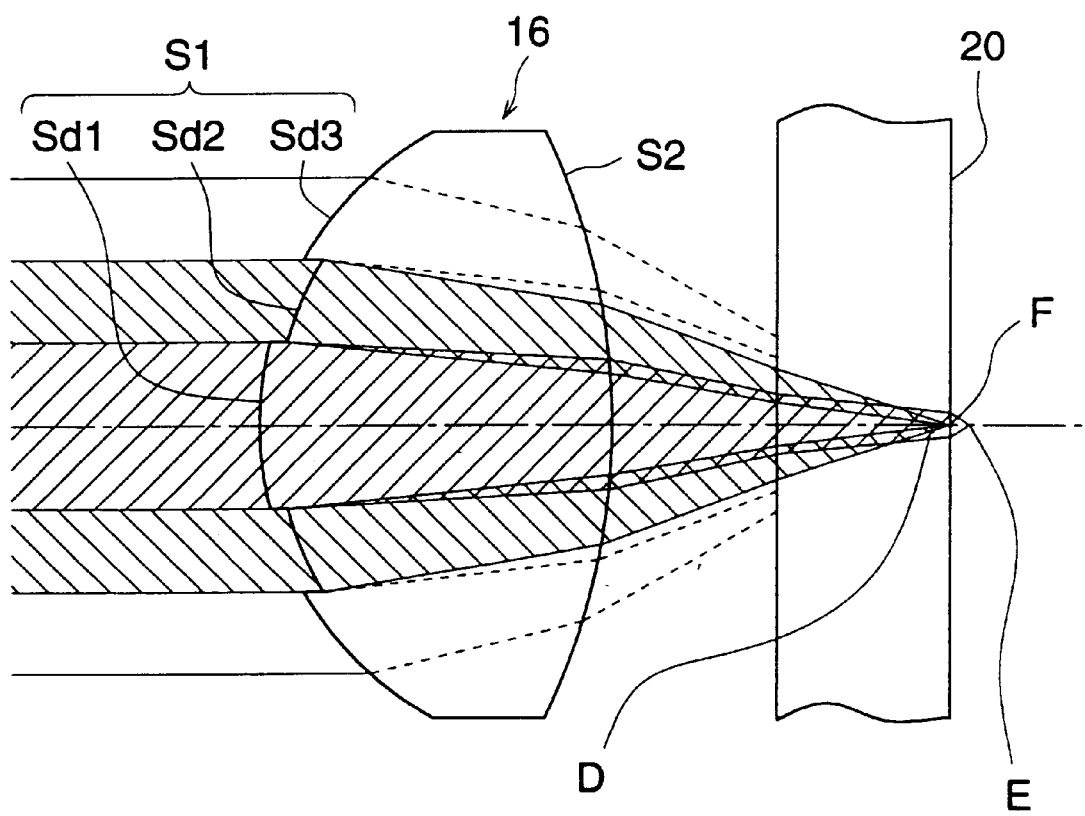
FIG. 3 is a sectional view showing on objective lens illustratively.

When the objective lens 16 mentioned above is used for reproducing the second optical disk provided therein with a transparent substrate having the prescribed thickness (t2=1.2 mm), in the case of the prescribed light flux (collimated light flux) entering the objective lens 16 as shown in FIG. 3, the second light flux (shown with lines hatched downward obliquely from left to right) forms an image on the point F which is located between position D where an image is formed by light passing the optical axis and its vicinity among the first light flux (shown with lines hatched downward obliquely from right to left and position E where an image is formed by a light flux passing through the periphery of the first divided area Sd1 (on the second divided area Sd2 side) in the direction perpendicular to the optical axis. Due to this, the first light flux and the second light flux are converged on the vicinity of an information recording plane of the second optical disk, and the second optical disk is thereby reproduced. In this case, the third light flux (partly shown with broken lines) is generated as flare, but the second optical disk can be reproduced by the core formed by both the first light flux and the second light flux.

In other words, in the invention, the first light flux passing through the optical axis and its vicinity whose numerical aperture is small is used for reproducing all types of optical disks which can be reproduced, and a light flux passing through the outer area of the first divided surface is divided in a way that each of the divided areas may correspond to each optical disk to be reproduced, so that each light flux thus divided may be used for reproducing each optical disk (the first and the second optical disks). In this case, the light flux used for reproducing the optical disk (the first optical disk) having the greater numerical aperture necessary for reproducing optical disk information is caused to be a light flux (the third light flux) which farther from the first light flux among the divided light fluxes.

When the light-converging optical system (objective lens 16) as that stated above is used, plural optical disks each having a transparent substrate having a different thickness can be reproduced by a single light-converging optical system, and numerical aperture NA2 necessary for reproducing the second optical disk can be made larger by setting the plane arbitrarily. Further, by using the light flux near the optical axis (the first light flux) for reproducing a plurality of optical disks, a loss of a quantity of light of the light flux from a light source can be made small. In addition, when reproducing the second optical disk, a side lobe of a beam spot is reduced, a core having strong beam intensity is formed, and accurate information can be obtained. Furthermore, a plurality of optical disks can be reproduced with a single light-converging optical system without requiring a special means for changing a numerical aperture of aperture-stop 17.

Further, when viewed at the central position C (see FIG. 2(*a*)) of the second divided surface Sd2 in the direction perpendicular to the optical axis, an angle formed by a normal line to the second divided surface Sd2 which is a surface of from numerical aperture NAL to that NAH and the optical axis is made to be greater than an angle formed by a normal line to the surface (aspheric surface where fitting is made through a least square method by the use of the expression for aspheric surface stated later) interposed between the first divided surface Sd1 covering from the optical axis to the numerical aperture NAL and the third divided surface Sd3 covering from the numerical aperture NAH to the numerical aperture NA1 and the optical axis. Due to this, both of the first optical disk and the second optical disk can be reproduced satisfactorily. In the present embodiment, an angle formed by a normal line to the second divided surface Sd2 and the optical axis is made to be greater than an angle formed by a normal line to the surface interposed between the first divided surface Sd1 and the third divided surface Sd3 and the optical axis because of the condition of t2>t1. In the case of the condition of t2<t1, an angle formed by a normal line to the second divided surface Sd2 and the optical axis can be made to be smaller than an angle formed by a normal line to the surface interposed between the first divided surface Sd1 and the third divided surface Sd3 and the optical axis.

Further, when viewed at the central position C (see FIG. 2(*a*)) of the second divided surface Sd2 in the direction perpendicular to the optical axis, it is preferable that the first divided surface Sd1—the third divided surface Sd3 are set so that a difference between an angle formed by a normal line to the second divided surface Sd2 and the optical axis and an angle formed by a normal line to the surface (aspheric surface where fitting is made through a least square method by the use of the expression for aspheric surface stated later) interposed between the first divided surface Sd1 and the third divided surface Sd3 and the optical axis may be within a range of 0.02°–1°. When this lower limit is exceeded, a spot shape for reproduction of the second optical disk is worsened and a side lobe and a spot diameter are made larger, while when the upper limit is exceeded, aspherical aberration is corrected excessively and a spot shape for reproduction of the first optical disk is worsened.

In the consideration from a different viewpoint, when assuming that ($\Delta$1L) $\pi$ (rad) represents a phase difference between light passing through the first divided surface Sd1 from the second divided surface Sd2 (emitted from a transparent substrate) and light passing through the second divided surface Sd2 from the position C (see FIG. 2(*a*)) that is mostly the center of the second divided surface Sd2 in the direction perpendicular to the optical axis (emitted from the transparent substrate), and ($\Delta$1H) $\pi$ (rad) represents a phase difference between light passing through the third divided surface Sd3 opposite to the optical axis side from the second divided surface Sd2 (emitted from the transparent substrate) and light passing through the second divided surface Sd2 opposite to the optical axis side from the aforesaid central position (emitted from a transparent substrate), in the objective lens 16 having, on at least one side thereof, plural divided surfaces (three divided surfaces) divided into plural portions coaxially with an optical axis, the relation of ($\Delta$1H)>($\Delta$1L) is satisfied. In this case, with regard to a sign of the phase difference, a positive sign is for the direction of light advancement (direction toward an optical disk), and a phase difference between light passing through the first divided surface Sd1 or the third divided surface Sd3 (emitted from the transparent substrate) and light passing through the second divided surface Sd2 (emitted from the transparent substrate) is compared. Though ($\Delta$1H) is made to be larger than ($\Delta$1L) because of the conditions of t1<t2 and NA1>NA2, ($\Delta$1H) is made to be smaller than ($\Delta$1L) in the case of the conditions of t1>t2 and NA1>NA2 or of t1<t2 and NA1<NA2. Namely, ($\Delta$1H) is made not to be equal to ($\Delta$1L).

In other words, a step depth measured in the direction from the third divided surface Sd3 on the boundary between the third divided surface Sd3 and the second divided surface Sd2 is greater than a step depth from the first divided surface sdl on the boundary between the first divided surface Sd1 and the second divided surface Sd2 (a sign for the step depth is positive in the direction where a surface having smaller refractive index is changed to a surface having larger refractive index on the border of the divided surface). Even in this case, as in the foregoing, when t1 is greater than t2 and NA1 is greater than NA2, or when t1 is smaller than t2 and NA1 is smaller than NA2, the relation mentioned above is opposite, namely, a step depth of the second divided surface Sd2 from the third divided surface Sd3 is smaller than that of the second divided surface Sd2 from the first divided surface Sd1. Further, it is preferable that a distance from a position on the surface interpolated between the first divided surface Sd1 and the third divided surface Sd3 to a position on the second divided surface Sd2 is asymmetrical about the position that is mostly the center of the second divided surface Sd2, at the point that is away from the optical axis by a prescribed length. In this case, it is preferable that the farther the distance from the optical axis is, the greater the difference is.

It has been explained as a standard that divided surfaces Sd1–Sd3 are provided on refracting surface S1 closer to a light source of objective lens 16, they may also be provided on a refracting surface closer to optical disk 20, or this function may also be provided on one of optical elements (for example, collimator lens 13) of another light-converging optical system, or an optical element having this function may also be provided newly on an optical path. In addition, a function of each of divided surfaces Sd1–Sd3 may be provided on a different optical element.

It has been explained as a standard that the objective lens 16 of an infinite system type employing collimator lens 13 is used, it is also possible to apply to an objective lens employing no collimator lens 13 where a divergent light from a light source enters directly or a divergent light transmitted through a lens which lowers an extent of divergence enters, or to an objective lens employing a coupling lens which changes a light flux from a light source to a converged light that enters the objective lens.

Though there are provided steps on boundaries of the first divided surface Sd1—the third divided surface Sd3 in the present embodiment, it is also possible to form divided surfaces continuously without providing a step on at least one boundary. With regard to a boundary between divided surfaces, both divided surfaces may also be connected by prescribed R, without bending the boundary. This R may be either one provided intentionally or one which is not provided intentionally (an example of one which is not provided intentionally is an R on a boundary formed in tooling a mold which is needed when objective lens 16 is made of plastic).

It has been explained as a standard that refracting surface S1 is composed of three divided surfaces Sd1–Sd3 in the present embodiment, the invention is not limited to this, and the refracting surface S1 can also be composed of at least three or more divided surfaces. In this case, it is preferable that the first divided surface used to reproduce the first optical disk and the second optical disk is provided in the vicinity of the optical axis, and a divided surface to be used mainly to reproduce the second optical disk and a divided surface to be used mainly to reproduce the first optical disk are provided alternately on a divided surface outside (in the direction to recede from the optical axis) the first divided surface. In this case, it is preferable to provide a divided surface used mainly to reproduce the second optical disk between numerical aperture NA3 and numerical aperture NA4 on the optical disk side on objective lens 16 that satisfies conditions of 0.60 (NA2)<NA3<1.3 (NA2) and 0.01<NA4–NA3<0.12. Due to this, it is possible to reproduce an optical disk having a greater necessary numerical aperture serving as the second optical disk, without reducing intensity of a light spot to be converged on the first optical disk. It is further preferable from the viewpoint of practical use that the upper limit of NA3 satisfies NA3<1.1 (NA2), the lower limit of NA3 satisfies 0.80 (NA2)<NA3, more preferably 0.85 (NA2)<NA3, and the upper limit of NA4–NA3 satisfies NA4–NA3<0.1.

Though a single light source is used for reproducing a plurality of optical disks, plural light sources may also be used for each optical disk to be reproduced.

Though second divided surface Sd2 is provided to be in a shape of a ring representing a circle concentric with an optical axis when objective lens 16 is viewed from the light source side, the invention is not limited to this, and the second divided surface Sd2 may also be provided to be in a discontinuous ring. The second divided surface Sd2 may further be composed of a hologram or a Fresnel lens. When the second divided surface Sd2 is composed of holograms, one of the light flux that is divided into zero-th order diffracted light and first order diffracted light is used to reproduce the first optical disk, and the other is used to reproduce the second optical disk. In this case, it is preferable that a quantity of light of the light flux used for reproduction of the second optical disk is larger than that of light of the light flux used for reproduction of the first optical disk.

It is possible to improve reproduction signals of the second optical disk, when the best-fit wavefront aberration of a light flux passing through the first divided surface Sd1 and the third divided surface Sd3 satisfies 0.05 $\lambda$rms ($\lambda$(nm) is a wavelength of light from a light source used for reproducing the first optical disk) when reproducing the first optical disk (namely, in the case of passage through a t1-thick transparent substrate), and the best-fit wavefront aberration of a light flux passing through the first divided surface Sd1 satisfies 0.07 $\lambda$rms representing the diffraction limit ($\lambda$(nm) is a wavelength of light from a light source used for reproducing the second optical disk) when reproducing the second optical disk (namely, in the case of passage through a t2-thick transparent substrate).

Figure 4:
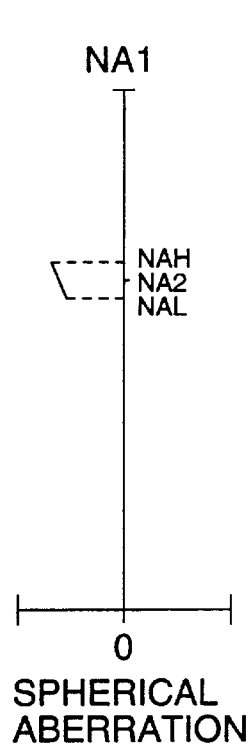
Figure 4:
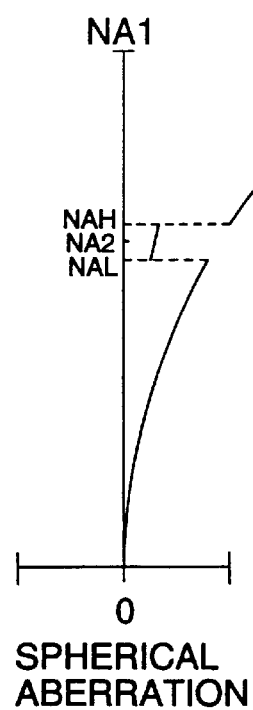
Figure 4:
Figure 4:
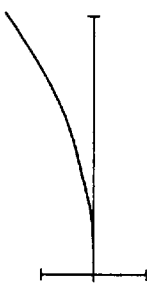
Figure 4:
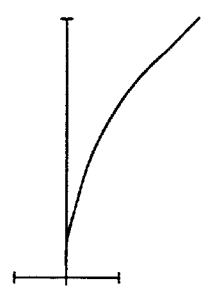
Figure 4:
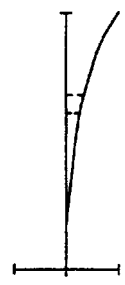

Next, FIGS. 2(a) and 2(b) in the case where a single light source is used will be explained, referring to FIGS. 4(a)–4(f) each representing a diagram wherein spherical aberration of objective lens 16 is shown typically. In FIGS. 4(a)–4(f), FIG. 4(a) is a diagram of a spherical aberration in the case of reproduction of the first optical disk, namely, in the case of passage through a t1-thick transparent substrate, while, FIG. 4(b) is a diagram of a spherical aberration in the case of reproduction of the second optical disk, namely, in the case of passage through a t2-thick (t2>t1) transparent substrate. Let it be assumed here that NA1 represents the necessary numerical aperture closer to an optical disk on a light-converging optical system necessary for reproducing information on the first optical disk, NA2 represents the necessary numerical aperture closer to the optical disk on a light-converging optical system necessary for reproducing information on the second optical disk (NA2>NA1), NAL represents a numerical aperture closer to the optical disk on a light flux passing through the boundary between divided surface Sd1 and divided surface Sd2 both of the objective lens 16, and NAH represents a numerical aperture closer to the optical disk on a light flux passing through the boundary between divided surface Sd2 and divided surface sd3 both of the objective lens 16.

The viewpoint which will be explained below shows an viewpoint in which the objective lens 16 in FIGS. 2(a) and 2(b) is viewed from another viewpoint (spherical aberration, shape and wavefront aberration), and items which are not described below are the same as those in the basic concept explained above.

With regard to objective lens 16 in FIGS. 2(a) and 2(b), the first aspheric surface of its first refracting surface S1 and its second refracting surface S2 (common refracting surface) are first designed so that the best-fit wavefront aberration of the light flux converged on the first optical disk having a t1-thick transparent substrate may be 0.05 λrms or less. FIG. 4(c) shows a diagram of a spherical aberration of the lens obtained through the design mentioned above. Then, the second aspherical surface of the first refracting surface is designed, leaving the second refracting surface S2 (common refracting surface) to be unchanged so that a spherical aberration may be less in quantity than the spherical aberration (FIG. 4(e), t2>t1 in this case) caused when light is converged on the second optical disk having a t2-thick (t2≠t1) transparent substrate through a lens having the first aspheric surface. In this case, it is preferable, for reproducing satisfactorily the second optical disk under the state of defocusing, that a paraxial radius of curvature of the second aspheric surface and that of the first aspheric surface are made to be the same. A diagram of a spherical aberration caused when light is converged on the second optical disk by the lens obtained through this design is shown in FIG. 4(f), and a diagram of an aberration caused when light is converged on the first optical disk by this lens is shown in FIG. 4(d). The second aspheric surface is composed in the vicinity of necessary numerical aperture NA2 of the second optical disk of the first aspheric surface. The vicinity of necessary numerical aperture NA2 in this case is preferably located between numerical aperture NA3 and numerical aperture NA4 both being on the optical disk side on the objective lens 16 satisfying the condition of 0.60 (NA2) <NA3<1.3 (NA2) (this lower limit 0.60 (NA2) is preferably 0.80 (NA2), more preferably 0.85 (NA2) in practical use and this upper limit 1.3 (NA2) is preferably 1.1 (NA2) in practical use) and satisfying the condition of 0.01<NA4−NA3<0.12 (preferably 0.1). Let it be assumed that numerical aperture NAL represents the second aspheric surface (second divided surface) thus composed which is closer to the optical axis and numerical aperture NAH (namely, NAL<NAH) represents that closer to the optical axis.

Therefore, with regard to the surface shape on refracting surface S1 of the objective lens 16, the first divided surface Sd1 including the optical axis and the third divided surface Sd3 surrounding the first divided surface Sd1 are of the same shape of aspheric surface (the first aspheric surface), and the second divided surface Sd2 located between the first divided surface Sd1 and the third divided surface Sd3 (in the vicinity of numerical aperture NA2 necessary to reproduce the second optical disk, namely NAL–NAH) turns out to be of a shape of the aspheric surface (the second aspheric surface) which is different from that of the first divided surface Sd1 and the third divided surface Sd3. A diagram of spherical aberration caused when light is converged on the first optical disk through the objective lens 16 is shown in FIG. 4(a), and a diagram of spherical aberration caused when light is converged on the second optical disk through the objective lens 16 is shown in FIG. 4(b).

When composing the first aspherical surface and the second aspheric surface, it is possible to increase a quantity of converged light in reproduction of the first optical disk by shifting the second divided surface Sd2 toward the optical axis for composition of the second divided surface Sd2, and thereby utilizing a phase difference.

An expression for an aspheric surface is assumed to be based on the following expression;

$$X = (H^2/r) / \left[ 1 + \sqrt{1 - (1+K)(H/r)^2} \right] + \sum_j A_j H^{P_j}$$

wherein, X represents an axis in the direction of an optical axis, H represents an axis that is perpendicular to an optical axis, the direction of a forward movement of light takes a positive sign, r represents a paraxial radius of curvature, K represents a circular cone coefficient, Aj represents an aspheric surface coefficient, and Pj represents a value of the power of an aspheric surface (on condition of Pj≧3). Expressions for an aspheric surface other than the above-mentioned expression may also be used in the invention. When finding an expression for an aspheric surface from the shape of the aspheric surface, the aforesaid expression is used, Pj is made to be natural numbers satisfying 3≦Pj≦10, and K is made to be 0 for finding the expression.

As stated above, objective lens 16 obtained in the present embodiment is constituted in a way that a spherical aberration changes discontinuously so that plural optical disks each having a transparent substrate in different thickness may be reproduced by a single light-converging optical system at least two aperture positions (NAL and NAH) in the vicinity of numerical aperture NA2. Due to such arrangement wherein a spherical aberration changes discontinuously as stated above, it is possible to arrange freely light fluxes passing through various numerical apertures (the first divided surface covering an optical axis to NAL, the second divided surface covering from NAL to NAH and the third divided surface covering from NAH to NA1), and thereby it is possible to use the first light flux for reproduction of all of the plural optical disks to be reproduced and to use the second light flux and the third light flux for reproduction of prescribed optical disks among plural optical disks. Thus, a plurality of optical disks can be reproduced by a single light-converging optical system (objective lens 16) which can be realized not to be complicated at the low cost, and can cope with optical disks with high NA. In addition, aperture-stop 17 has only to be provided to cope with NA1 that is of high NA, and even when a numerical aperture (NA1 or NA2) that is necessary for reproducing an optical disk is changed, it is not necessary to provide a means to change the aperture-stop 17. Incidentally, the expression "a spherical aberration changes discontinuously" in the invention means that a sharp change of spherical aberration is observed in a diagram of spherical aberration.

With regard to the direction in which spherical aberration changes discontinuously, the spherical aberration is in the negative direction at numerical aperture NAL and the spherical aberration is in the positive direction at numerical aperture NAH, when viewed in the direction from the smaller numerical aperture to the larger numerical aperture. Due to this, reproduction of an optical disk having a thin transparent substrate in thickness t1 is made to be better and reproduction of an optical disk having a thick transparent substrate in thickness t2 is also made to be better. Because of NA1>NA2 and t2>t1, a spherical aberration changes discontinuously in the negative direction at numerical aperture NAL and in the positive direction at numerical aperture NAH. In the case of t2<t1 and NA1>NA2, or t2>t1 and NA1<NA2, however, a spherical aberration changes discontinuously in the positive direction at numerical aperture NAL and in the negative direction at numerical aperture NAH.

When reproducing the second optical disk having a t2-thick transparent substrate, S-shaped characteristics focus error signal of optical pickup apparatus 10 are improved when the spherical aberration (spherical aberration by a light flux passing through the second divided surface Sd2) within a range from numerical aperture NAL to numerical aperture NAH is made to be positive. Though the spherical aberration within a range from numerical aperture NAL to numerical aperture NAH is made to be positive because of t2>t1 and NA1>NA2, it can be made to be negative in the case of t2<t1 and NA1<NA2.

When wavefront aberration in the case of a light flux excluding a light flux passing through the range from NAL to NAH among numerical aperture NA1, namely in the case of a light flux passing through the range from an optical axis to NAL and the range from NAH to NA1 is made to be 0.05 $\lambda$rms or less (wherein $\lambda$ represents a wavelength of a light source) when a t1-thick transparent substrate exists (see FIG. 4(a)), the reproduction of the first optical disk having a t1-thick transparent substrate is made to be better.

Under the conditions of t1=0.6 mm, t2=1.2 mm, 610 nm<$\lambda$<670 nm and 0.32<NA2<0.41, it is preferable to satisfy the condition of 0.60 (NA2)<NAL<1.3 (NA2) (its lower limit 0.60 (NA2) is preferably 0.80 (NA2), more preferably 0.85 (NA2) in practical use and its upper limit 1.3 (NA2) is preferably 1.1 (NA2) in practical use). When the lower limit is exceeded, the side lobe turns out to be larger to make accurate reproduction of information impossible, while when its upper limit is exceeded, a spot diameter is made smaller than a diffraction limited spot diameter assumed at wavelength $\lambda$ and NA2. NAL mentioned here means NAL on the second divided surface Sd2.

It is further preferable to satisfy the condition of 0.01<NAH–NAL<0.12 (the upper limit is preferably 0.1 in practical use). When this lower limit is exceeded, a spot shape in the course of reproduction of the second optical disk is worsened and a side lobe spot diameter is made larger, while when the upper limit is exceeded, a spot shape in the course of reproduction of the first optical disk is distributed and a fall of a quantity of light is caused. NAL and NAH mentioned here means NAL and NAH on the second divided surface Sd2.

To say from another viewpoint (though this is restatement), NAL and NAH mentioned above are provided (namely, a divided surface mainly used for reproduction of the second optical disk is provided) between numerical aperture NA3 and numerical aperture NA4 closer to an optical disk on the objective lens 16 satisfying the condition of 0.60 (NA2)<NA3<1.3 (NA2) (its lower limit is preferably 0.85 (NA2), more preferably 0.85 (NA2) in practical use, and its upper limit 1.3 (NA2) is preferably 1.1 (NA2) in practical use) and the condition of 0.01<NA4–NA3<0.12 (preferably 0.1) Due to this, it is possible to reproduce an optical disk having a larger necessary numerical aperture as the second optical disk, without lowering intensity of a spot of light converged on the first optical disk very much.

When reproducing the second optical disk (when a t2-thick transparent substrate exists), it is preferable to satisfy the condition that the spherical aberration between numerical aperture NAL and numerical aperture NAH is not less than $-2\lambda/(NA2)^2$ and is not more than $5\lambda/(NA2)^2$. In the case of reproduction, the condition of not more than $3\lambda/(NA2)^2$ is preferable, or, when recording is considered (reproduction is naturally possible), the spherical aberration greater than 0 (zero) is preferable. When this lower limit is exceeded, the spherical aberration is corrected excessively and a spot shape in the course of reproducing the first optical disk is worsened and a side lobe spot diameter turns out to be larger. In particular, this condition is preferable when it satisfies an range of $0-2\lambda/(NA2)^2$, and focus error signals are obtained satisfactorily in this case.

On the other hand, an angle formed between a normal line to the second divided surface Sd2 and an optical axis is made to be greater than that formed between a normal line to a surface interpolated between the first divided surface Sd1 and the third divided surface Sd3, when viewed at the central position of the second divided surface Sd2 in the direction perpendicular to the optical axis. Due to this, both of the first and second optical disks can be reproduced satisfactorily. Though an angle formed between a normal line to the second divided surface Sd2 and an optical axis is made to be greater than that formed between a normal line to a surface interpolated between the first divided surface Sd1 and the third divided surface Sd3 and an optical axis, because of t2>t1, when t2<t1 and NA1>NA2 or t2>t1 and NA1<NA2, an angle formed between a normal line to the second divided surface Sd2 and an optical axis can be made smaller than that formed between a normal line to a surface interpolated between the first divided surface Sd1 and the third divided surface Sd3, Further, in the objective lens 16, it is preferable that a difference between an angle formed between a normal line to the surface (the second divided surface) from numerical aperture NAL to numerical aperture NAH and an optical axis and an angle formed between a normal line to the surface interpolated between the surface (the first divided surface) from the optical axis to numerical aperture NAL and the surface (the third divided surface) from numerical aperture NAH to numerical aperture NA1 and the optical axis is in a range from 0.02° to 1°. When the lower limit is exceeded, a spot shape in the course of reproducing the second optical disk is worsened and a side lobe spot is made larger, while, when the upper limit is exceeded, the spherical aberration is corrected excessively and a spot shape in the course of reproducing the first optical disk is worsened.

In particular, when viewing in the direction from an optical axis to the circumference of a circle under the condition of t2>t1 and NA1>NA2, a point at which a normal line to the refracting surface and the optical axis intersect changes discontinuously in the direction to approach the refracting surface that is closer to the light source, at numerical aperture NAL, and a point at which a normal line to the refracting surface and the optical axis intersect changes discontinuously in the direction to recede from the refracting surface that is closer to the light source, at numerical aperture NAH. Due to this, the reproduction of an optical disk having a t1-thick thin transparent substrate is made to be better, and the reproduction of an optical disk having a t2-thick thick transparent substrate is made to be better.

Wavefront aberrations of the objective lens 16 in the present embodiment are shown in FIGS. 5(a) and 5(b). Each of FIGS. 5(a) and 5(b) is a diagram of a wavefront aberration curve wherein the axis of ordinates represents wavefront aberration ($\lambda$) and the axis of abscissas represents a numerical aperture. In FIG. 5(a), a curve of wavefront aberration caused through a transparent substrate (thickness of t1) of the first optical disk is shown with solid lines, wile, in FIG. 5(b), a curve of wavefront aberration caused through a transparent substrate (thickness of t2) of the second optical disk is shown with solid lines. The wavefront aberration curve is obtained by measuring wavefront aberrations by the use of an interferometer under the condition that the best wavefront aberration is caused through each transparent substrate.

As is apparent from each figure, the wavefront aberration related to the objective lens 16 is discontinuous at two locations (NAL and NAH to be concrete) in the vicinity of numerical aperture NA2, when viewed on the wavefront aberration curve. Inclination of the wavefront aberration on the discontinuous portion (between NAL and NAH) is different from that of the curve (shown with broken lines in FIG. 5(a)) obtained by connecting end portions (an end closest to NAL and that closest to NAH) of the curves at both sides of the discontinued portion.

Next, an optical pickup apparatus having two light sources will be explained as follows, referring to FIG. 6 which is a schematic structure diagram of the optical pickup apparatus. Here, the two light sources 111 and 112 are used in optical pickup apparatus 100.

Here, a first semiconductor laser 111 (wavelength λ1=610–670 nm) representing the first light source is provided for reproducing the first optical disk, and a second semiconductor laser 112 (wavelength λ2=740–870 nm) representing the second light source is provided for reproducing the second optical disk. Composition means 119 is a means capable of composing a light flux emitted from the first semiconductor laser 111 and a light flux emitted from the second semiconductor laser 112, and it is a means to make both light fluxes to be in the same optical path so that both light fluxes may be converged on optical disk 20 through a single light-converging system.

When reproducing the first optical disk, a beam is emitted from the first semiconductor laser 111, and the beam thus emitted passes through composition means 119, polarized beam splitter 212, collimator lens 113, and quarter wavelength plate 114 to become a circularly polarized light flux. This light flux is narrowed by aperture-stop 117 and converged by objective lens 116 on information recording plane 22 through transparent substrate 21 of the first optical disk 20. Then, the light flux modulated by information bit and reflected on the information recording plane 22 passes again through objective lens 116, quarter wavelength plATE 114 and collimator lens 113 to enter polarized beam splitter 212 where the light flux is reflected and given astigmatism by cylindrical lens 118 to enter optical detector 130 where signals to read (to reproduce) information recorded on the first optical disk 20 are obtained by the use of signals outputted from the optical detector 130. Further, a change in distribution of quantity of light caused by a change in spot shape on the optical detector 130 is detected for the detection of being in focus and detection of track. The objective lens 116 is moved so that 2-dimensional actuator 115 may cause light from semiconductor laser 111 to form an image on information recording plane 22 of the first optical disk 20, and the objective lens 116 is moved so that light from semiconductor laser 11 may be caused to form an image on a prescribed track, based on the detection mentioned above.

On the other hand, when reproducing the second optical disk, a beam is emitted from the second semiconductor laser 112, then the light flux thus emitted is changed in terms of its optical path by composition means 119, and passes through polarized beam splitter 212, collimator lens 113, quarter wavelength plate 114, aperture-stop 117 and objective lens 116 to be converged on the second optical disk 20. Then, the light flux modulated by information bit and reflected on the information recording plane 22 passes again through objective lens 116, quarter wavelength plate 114, collimator lens 113, polarized beam splitter 212 and cylindrical lens 118 to enter optical detector 130 where signals to read (to reproduce) information recorded on the second optical disk 20 are obtained by the use of signals outputted from the optical detector 130. Further, a change in distribution of quantity of light caused by a change in spot shape on the optical detector 130 is detected for the detection of being in focus and detection of track. The objective lens 116 is moved so that 2-dimensional actuator 115 may cause light from semiconductor laser 111 to form an image on information recording plane 22 of the second optical disk 20 under the defocus state, and the objective lens 116 is moved so that light from semiconductor laser 11 may be caused to form an image on a prescribed track, based on the detection mentioned above.

As objective lens 116 that is one of light-converging optical systems of the optical pickup apparatus 100, the objective lens 16 as described above is used. Namely, the objective lens 116 is a convex lens having positive refracting power whose refracting surface S1 on the light source side and refracting surface S2 on the optical disk 20 side are of an aspheric shape, and the refracting surface S1 is composed of plural (three in the present embodiment) divided surfaces of the first divided surface Sd1—the third divided surface Sd3 arranged on a coaxial basis with an optical axis, and a step is given to each boundary between divided surfaces Sd1–Sd3. The first divided surface Sd1 and the third divided surface Sd3 are formed by the first aspheric surface which makes the best-fit wavefront aberration of a light flux emitted from the first light source 111 and converged on the first optical disk to be 0.05 λrms or less, and the second divided surface is formed by the second aspheric surface which causes spherical aberration that is less in terms of amount of generation than that caused when a light flux emitted from the second light source 112 is converged on the second optical disk having a t2-thick (t2≠t1) transparent substrate through a lens having the first aspheric surface. In the objective lens, the second aspheric surface is composed with the first aspheric surface at the location of its NAL--NAH that is close to necessary numerical aperture NA2 of the second optical disk.

The objective lens 116 thus obtained is to have the same constitution and effect as the objective lens 16 mentioned above except the following points, and further has the greater degree of freedom for reproducing plural optical disks because of two light sources used therefor.

Since two light sources 111 and 112 are used, the following preferable range is different from that in the case of employing the single light source.

Namely, it is preferable to satisfy the condition of 0.60 (NA2)<NAL<1.1 (NA2) (this lower limit 0.60 (NA2) is preferably 0.80 (NA2) and more preferably 0.85 (NA2) in practical use) under the conditions of t1=0.6 mm, t2=1.2 mm, 610 nm<λ1<670 nm, 740 nm<λ2<870 nm and 0.40<NA2<0.51. When this lower limit is exceeded, a side lobe is made larger to make accurate reproduction of information impossible, while, when the upper limit is exceeded, a spot diameter is made smaller than the diffraction limited spot diameter assumed at wavelength λ2 and NA2. Incidentally, NAL mentioned here means NAL on the second divided surface Sd2 in the case of employment of the second light source 112.

It is further preferable to satisfy the condition of 0.01<NAH–NAL<0.12 (this upper limit 0.12 is preferably 0.1 in practical use). When this lower limit is exceeded, a spot shape in the course of reproducing the second optical disk is worsened and a side lobe is made larger, while, when the upper limit is exceeded a spot shape in the course of reproducing the first optical disk is disturbed and a fall of quantity of light is caused. Incidentally, NAL and NAH mentioned here mean NAL and NAH on the second divided surface Sd2 in the case of employment of the second light source 112.

It is further preferable to satisfy the condition that the spherical aberration between numerical aperture NAL and numerical aperture NAH is within a range of $-2\,(\lambda 2)/(NA2)^2-(5(\lambda 2))/(NA2)^2$, when reproducing the second optical disk (through a t2-thick transparent substrate). This condition is preferably not more than $3\,(\lambda 2)/(NA2)^2$ in the case of reproduction, or it is preferably greater than 0 (zero) when recording is also considered (reproduction is naturally possible). When the lower limit is exceeded, the spherical aberration is corrected excessively and a spot shape in the course of reproducing the first optical disk is worsened, while, when the upper limit is exceeded, a spot shape in the course of reproducing the second optical disk is worsened and a side lobe spot diameter is made larger. It is especially preferable that this condition satisfies a range of $0-2\,(\lambda 2)/(NA2)^2$, and in this case, focus error signals are obtained satisfactorily.

To say from another viewpoint, NAL and NAH mentioned above are provided (namely, a divided surface mainly used for reproduction of the second optical disk is provided) between numerical aperture NA3 and numerical aperture NA4 closer to an optical disk on the objective lens 16 satisfying the condition of 0.60 (NA2)<NA3<1.1 (NA2) (its lower limit is preferably 0.80 (NA2) and more preferably 0.85 (NA2) in practical use) and the condition of 0.01<NA4–NA3<0.12 (preferably 0.1) Due to this, it is possible to reproduce an optical disk having a larger necessary numerical aperture as the second optical disk, without lowering intensity of a spot of light converged on the first optical disk.

On the other hand, an angle formed between a normal line to the second divided surface Sd2 and an optical axis is made to be greater than that formed between a normal line to a surface interpolated between the first divided surface Sd1 and the third divided surface Sd3, when viewed at the central position of the second divided surface Sd2 in the direction perpendicular to the optical axis. Due to this, both of the first and second optical disks can be reproduced satisfactorily. Though an angle formed between a normal line to the second divided surface Sd2 and an optical axis is made to be greater than that formed between a normal line to a surface interpolated between the first divided surface Sd1 and the third divided surface Sd3 and an optical axis, because of t2>t1 and NA1>NA2. However, when t2<t1 and NA1>NA2 or t2>t1 and NA1<NA2, an angle formed between a normal line to the second divided surface Sd2 and an optical axis can be made smaller than that formed between a normal line to a surface interpolated between the first divided surface Sd1 and the third divided surface Sd3, Further, in the objective lens 116 in the present embodiment, it is preferable that an angle formed between a normal line to the refracting surface and an optical axis is changed to be not less than 0.05° and to be less than 0.50° at a circular position of the refracting surface S1 of the objective lens 116 corresponding to at least two aperture positions (NAL and NAH) in the vicinity of numerical aperture NA2. When the lower limit is exceeded, a spot shape in the course of reproducing the second optical disk is worsened and a side lobe spot is made larger, while, when the upper limit is exceeded, the spherical aberration is corrected excessively and a spot shape in the course of reproducing the first optical disk is worsened.

In particular, when viewing in the direction from an optical axis to the circumference of a circle under the condition of t2>t1 and NA1>NA2, a point at which a normal line to the refracting surface and the optical axis intersect changes discontinuously in the direction to approach the refracting surface that is closer to the light source, at numerical aperture NAL, and a point at which a normal line to the refracting surface and the optical axis intersect changes discontinuously in the direction to recede from the refracting surface that is closer to the light source, at numerical aperture NAH. Due to this, the reproduction of an optical disk having a t1-thick thin transparent substrate is made to be better, and the reproduction of an optical disk having a t2-thick thick transparent substrate is made to be better.

In consideration from another viewpoint as in the case employing the objective lens 116 stated above, when assuming that ($\Delta 1L$) $\pi$ (rad) represents a phase difference between light passing through the first divided surface Sd1 (emitted from a transparent substrate) and light passing through the portion on the second divided surface Sd2 covering from its central position to the position closest to the optical axis (emitted from the transparent substrate), and ($\Delta 1H$) $\pi$ (rad) represents a phase difference between light passing through the third divided surface Sd3 (emitted from the transparent substrate) and light passing through the portion on the second divided surface Sd2 covering from its central position to the position farthest from the optical axis (emitted from the transparent substrate), in objective lens 116 having on at least one surface thereof a plurality of divided surfaces (three divided surfaces) which are divided to be plural on a coaxial basis with the optical axis, the condition of ($\Delta 1H$) >($\Delta 1L$) is satisfied. Even in this case, as in the foregoing, the condition of ($\Delta 1H$)<($\Delta 1L$) is taken in the case of t1>t2 and NA1>NA2, or of t1<t2 and NA1<NA2, which results in ($\Delta 1H$)≠($\Delta 1L$) accordingly.

To say from another viewpoint, a step depth of the second divided surface Sd2 from the third divided surface Sd3 is greater than that of the second divided surface Sd2 from the first divided surface Sd1. Even in this case, a step depth from the third divided surface Sd3 on a boundary between the third divided surface Sd3 and the second divided surface Sd2 is smaller than that from the first divided surface Sd1 on a boundary between the first divided surface Sd1 and the second divided surface Sd2 in the case of t1>t2 and NA1>NA2 or t1<t2 and NA1<NA2, as in the foregoing. It is preferable that a distance between the position of the surface interpolated between the first divided surface Sd1 and the third divided surface Sd3 and the position of the second divided surface Sd2 is asymmetrical about the position which is mostly the center of the second divided surface Sd2, at the position being away from the optical axis by a prescribed distance. It is further preferable in that case that the distance grows greater as it recedes from the optical axis.

In the same way as in the aforesaid explanation in the case employing the objective lens 16, the invention is not limited to what is described here, such as that divided surfaces Sd1–Sd3 are provided on the refracting surface S1 of the objective lens 116, an objective lens of an infinite type is used, steps are provided on boundaries of divided surfaces, and such as the number of divided surfaces and a surface shape of the second divided surface.

Though the first light source 111 and the second light source 112 are composed by composing means 119, the invention is not limited to this, and light source 11 can be made to be of a type wherein it is switched to the first light source 111 and to the second light source 112.

It is possible to improve reproduction signals of the second optical disk, by making the best-fit wavefront aberration of a light flux passing through the first divided surface Sd1 and the third divided surface Sd3 to satisfy 0.05 $\lambda$rms ($\lambda$(nm) is a wavelength of light from a light source used for reproducing the first optical disk) when reproducing the first optical disk (namely when a t1-thick transparent substrate is passed), and by making the best-fit wavefront aberration of a light flux passing through the first divided surface Sd1 to satisfy 0.07 λrms representing the diffraction limit (λ(nm) is a wavelength of light from a light source used for reproducing the second optical disk) when reproducing the second optical disk (namely when a t2-thick transparent substrate is passed).

With regard to the objective lens 116 in the present embodiment, when the inventors of the invention used it by mistake for the optical pickup apparatus in the first embodiment (or the second embodiment), it was not only possible to reproduce a DVD as the first optical disk naturally, but also possible to reproduce a CD as the second optical disk with a light source having the same wavelength to their surprise. Namely, the objective lens 116 can converge light on an information recording plane of each of the first optical information recording medium having a t1-thick transparent substrate and the second optical information recording medium having a t2-thick transparent substrate (t2≠t1), using a light source having a wavelength of λ1, and it also can converge light on an information recording plane of the second optical information recording medium even when a light source having a wavelength of λ2 is used (λ2≠λ1). Due to this, an objective lens used for an optical pickup apparatus to reproduce both DVD and CD-R by the use of two light sources each having a different wavelength (light source with wavelength of 610–670 nm for DVD, and light source with wavelength of 780 nm necessary for CD-R) and an objective lens used for an optical pickup apparatus to reproduce both DVD and CD by the use of a single light source can be made common to each other, whereby cost reduction based on mass production can be realized. In such common objective lens, it is still necessary to satisfy the conditions of NAL and NAH described in the first and second embodiments even when the wavelength of the light source is changed from λ2 to λ1.

Incidentally, since both the first light source 111 and the second light source 112 are used on the same magnification here, only a single light detector can be used, resulting in a simple structure. Further, two light detectors corresponding to respective different light sources or light sources having magnification different from each other may be used.

Figure 7:
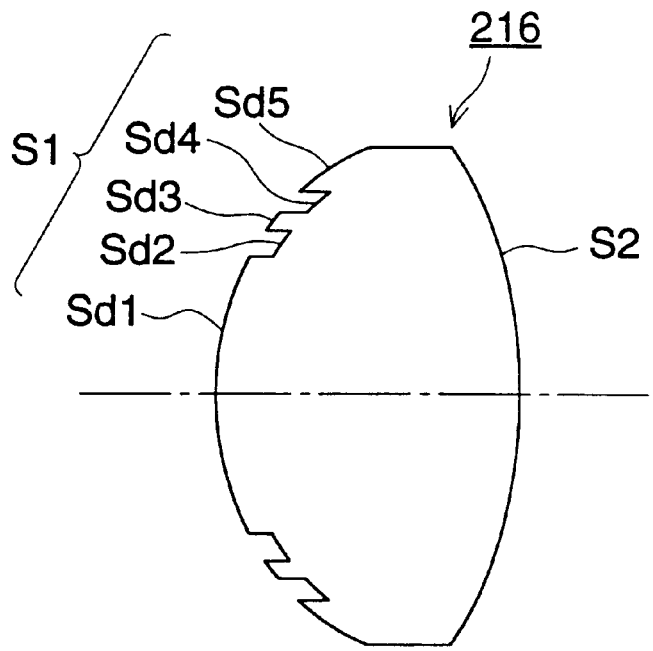
Figure 7:
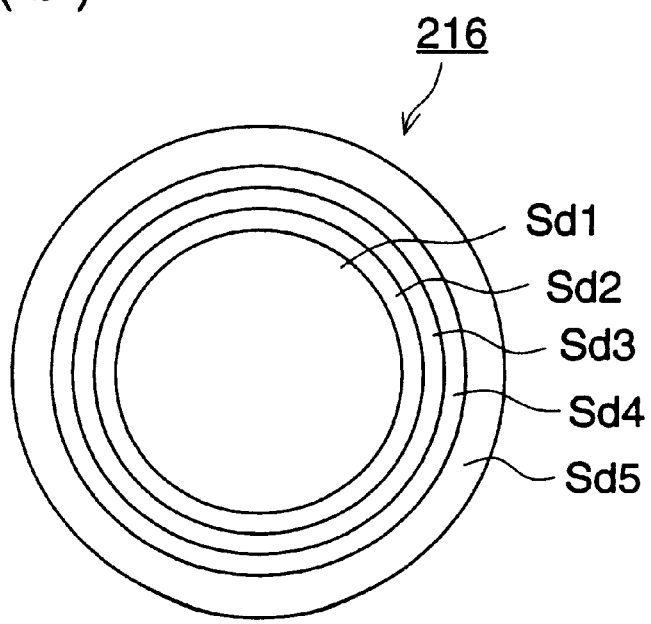

Next, an optical pickup apparatus will be explained, referring FIGS. 7(*a*) and 7(*b*). FIG. 7(*a*) is a sectional view of objective lens 216, and FIG. 7(*b*) is a front view viewed from a light source. The objective lens 216 is a variation of objective lens 16 or 116 used in the optical pickup apparatus described above. The objective lens 216 is one wherein the surface thereof closer to the light source is composed of five divided refracting surfaces, which is different from the objective lens 16 whose surface closer to the light source is composed of three divided refracting surfaces described above. Incidentally, the present embodiment employs one divided into five refracting surfaces, and others are the same as those in the objective lens 16 or 116, and therefore, the explanation may sometimes be omitted.

In the present embodiment, objective lens 216 is a convex lens having positive refracting power wherein refracting surface S1 closer to the light source and refracting surface S2 closer to the optical disk 20 are of a shape of an aspheric surface. The refracting surface S1 of the objective lens 216 closer to the light source is composed of five divided surfaces of the first divided surface Sd1—fifth divided surface Sd5 which are coaxial with the optical axis, namely of the first divided surface (Sd1) including the optical axis (near the optical axis), the second divided surface Sd2 . . . the (2n+1)th (n is a natural number which is 2 in the present embodiment) divided surface Sds2n+1. Boundaries of the divided surfaces Sd1–Sd5 are given steps to form each of the divided surfaces Sd1–Sd5. In this objective lens 216, a light flux (the first light flux) passing through the first divided surface Sd1 including the optical axis is used for reproduction of information recorded in the first and second optical disks, a light flux passing through the (2n)th divided surface Sd2n (the second divided surface Sd2 and the fourth divided surface Sd4 in the present embodiment) is mainly used for reproduction of information recorded in the second optical disk, and a light flux passing through the (2n+1)th divided surface Sd2n+1 (the third divided surface Sd3 and the fifth divided surface Sd5 in the present embodiment) is mainly used for reproduction of information recorded in the first optical disk, As stated above, it is possible to arrange the (2n)th divided surface to the high NA side by increasing the number of divided surfaces. Therefore, it is possible to conduct not only reproduction of the first optical disk which requires high NA but also reproduction of the second optical disk having higher NA compared with the first–third embodiments mentioned above. In addition, a fall of quantity of light in the course of reproducing the first optical disk caused by the (2n)th divided surface arranged to the high NA side can be compensated by the (2n−1)th divided surface (the first divided surface has nothing to do with this), thus, it is possible to reproduce not only the first optical disk but also the second optical disk.

To be concrete, the first aspheric surface of the first refracting surface S1 and the second refracting surface S2 (common refracting surface) of the objective lens 216 are designed first so that the best-fit wavefront aberration of a light flux converged on the first optical disk having a t1-thick transparent substrate may be 0.05 λrms or less. Then, the second aspheric surface of the first refracting surface is designed with the second refracting surface S2 (common refracting surface) being left as it is, so that the spherical aberration relating to the second aspheric surface may be less in terms of quantity of generation than that generated through convergence on the second optical disk having a t2-thick (t2≠t1) transparent substrate through a lens having the first aspheric surface mentioned above. In this case, it is preferable, for reproducing the second optical disk under the state of defocus, to make a paraxial radius of curvature of the second aspheric surface and that of the first aspheric surface to be the same each other. The second aspheric surface is composed at two locations of NAL–NAH in the vicinity of the necessary numerical aperture NA2 of the second optical disk of the first aspheric surface. The lens thus obtained is the objective lens 16 in the present embodiment.

In the case of composition, it is possible to achieve an increase in quantity of converged light in the course of reproducing the first optical disk by shifting the second divided surface Sd2 and the fourth divided surface Sd4 toward an optical axis for composition and, thereby, by utilizing a phase difference. Though the second divided surface Sd2 and the fourth divided surface Sd4 are made to be of the same second aspheric surface, these divided surfaces may also be of a different aspheric surface and they may further be shifted differently in terms of quantity toward an optical axis.

With regard to the vicinity of NA2 for composition of the second aspheric surface in this case, the condition of 0.60 (NA2)<NA3<1.3 (NA2) (its lower limit 0.60 (NA2) is preferably 0.80 (NA2) and more preferably 0.85 (NA2) in practical use) is preferable, and it is preferable that the upper limit 1.3 (NA2) is 1.1 (NA2) in practical use. It is further preferable, when a wavelength of a light source for recording or reproducing the second optical disk information recording medium is 740–870 nm, that the upper limit 1.3 (NA2) is located between numerical aperture NA3 and numerical aperture NA4 on the optical disk side of the objective lens 16 satisfying 1.1 (NA2) and the condition of 0.01<NA4–NA3<0.12 (this upper limit is preferably 0.1 in practical use).

In the case of employing the objective lens 16, when reproducing a DVD having a transparent substrate whose thickness t1 is 0.6 mm which is the first optical disk, as mentioned above, light fluxes passing respectively through the first divided surface Sd1, the third divided surface Sd3 and the fifth divided surface Sd5 form images on the first image forming positions which are almost the same position, and their wavefront aberrations (wavefront aberrations excluding light fluxes passing through the second divided surface Sd2 and the fourth divided surface Sd4) are 0.05 λrms or less. The symbol λ in this case represents a wavelength of a light source.

In this case, light fluxes passing respectively through the second divided surface Sd2 and the fourth divided surface Sd4 form images on the second image forming position that is different from the first image forming position. The second image forming position is made to be away from the first image forming position by the distance ranging from $-27$ $\mu$m to $-4$ $\mu$m when assuming that 0 (zero) represents the first image forming position, and the direction from that toward the objective lens 16 is negative, and the direction opposite thereto is positive. In the present embodiment, the second image forming position is made to be away from the first image forming position by the distance ranging from $-27$ $\mu$m to $-4$ $\mu$m because of the conditions of t1<t2 and NA1>NA2. However, in the case of t1>t2 and NA1>NA2 or t1<t2 and NA1<NA2, the second image forming position is made to be away from the first image forming position by the distance ranging from 4 $\mu$m to 27 $\mu$m. Namely, an absolute value of the distance between the first image forming position and the second image forming position is made to be within a range of 4–27 $\mu$m.

When the objective lens 216 is considered from the viewpoint of spherical aberration, it is constituted in a manner that the spherical aberration changes discontinuously at four aperture positions in the vicinity of numerical aperture NA2 so that a plurality of optical disks each having a transparent substrate having a different thickness may be reproduced by a single light-converging optical system. The spherical aberration changes discontinuously as stated above (the direction of the change is the same as that in the first–third embodiments mentioned above), and when it is viewed from the viewpoint of wavefront aberration, the wavefront aberration is discontinuous at four positions in the vicinity of numerical aperture NA2, and an inclination of the wavefront aberration at each point in the discontinuous change is different from that of the curve obtained by connecting both end portions of the separated curves at both sides.

In the objective lens 216 in the present embodiment, it is preferable to satisfy the condition that spherical aberration between numerical apertures NAL to NAH is within a range from $-2\lambda/(NA)^2$ to $5\lambda/(NA)^2$ when reproducing the second optical disk (through a t2-thick transparent substrate) (wherein, λ represents a wavelength of a light source used for reproducing the second optical disk). Further, this condition is preferably $3\lambda/(NA)^2$ or less in the case of reproduction, and it is preferably greater than 0 (zero) when recording is considered (reproduction is naturally possible).

On the other hand, when viewed at a central position of the (2n)th divided surface (the second divided surface Sd2 or the fourth divided surface) in the direction perpendicular to an optical axis, an angle formed between a normal line to the (2n)th divided surface and the optical axis is made to be greater than that formed between a normal line to the surface interpolated between the (2n−1)th divided surface (the first divided surface Sd1 or the third divided surface Sd3) and the (2n+1)th divided surface (the third divided surface Sd3 or the fifth divided surface Sd5) and the optical axis. Due to this, both the first optical disk and the second optical disk can be reproduced satisfactorily. Though an angle formed between a normal line to the (2n)th divided surface and an optical axis is made to be greater than that formed between a normal line to a surface interpolated between the (2n−1)th divided surface and the (2n+1)th divided surface and an optical axis, because of t2>t1. However, when t2<t1 and NA1>NA2 or t2>t1 and NA1<NA2, an angle formed between a normal line to the (2n)th divided surface and an optical axis is made to be smaller than that formed between a normal line to a surface interpolated between the (2n−1)th divided surface and the (2n+1)th divided surface and an optical axis.

Further, when viewed at the position mostly the center of the (2n)th divided surface (n is a natural number) representing the second divided surface Sd2 or the fourth divided surface Sd4 in the direction perpendicular to an optical axis, it is preferable to establish the first divided surface Sd1—the (2n+1)th divided surface so that a difference between an angle formed between a normal line to the (2n)th divided surface and an optical axis and angle formed between a normal line to a surface interpolated between the (2n−1)th divided surface and the (2n+1)th divided surface and an optical axis is within a range from 0.02° to 1°.

When considering from another viewpoint as in the case of employing the objective lens 16, in the objective lens 16 wherein at least one surface has thereon a plurality of divided surfaces divided to be on a coaxial basis with an optical axis of the objective lens, when (ΔnL) π (for example, (Δ1L) π or Δ2L) π) (rad) is assumed to represent a phase difference between light passing through the (2n−1)th divided surface (for example, the first divided surface Sd1 or the third divided surface Sd3) (emitted from a transparent substrate) and light passing through the inner portion closer to the optical axis from the center of the (2n)th divided surface (for example, the second divided surface Sd2 or the fourth divided surface Sd4) (emitted from the transparent substrate), and (ΔnH) π (for example, (Δ1H) π or Δ2H) π) (rad) is assumed to represent a phase difference between light passing through the (2n+1)th divided surface (for example, the third divided surface Sd3 or the fifth divided surface Sd5) (emitted from the transparent substrate) and light passing through the portion opposite to the aforesaid inner portion closer to the optical axis from the aforesaid center of the (2n)th divided surface (for example, the second divided surface Sd2 or the fourth divided surface Sd4) (emitted from the transparent substrate), the relation of (ΔnH)>(ΔnL) is satisfied. Even in this case, (ΔnH) is made to be greater than (ΔnL) in the case of t1>t2 and NA1>NA2 or t1<t2 and NA1<NA2 as in the foregoing, which means the relation of (ΔnH)≠(ΔnL) accordingly.

To say this from another viewpoint, a depth of a step from the (2n+1)th divided surface (for example, the third divided surface Sd3 or the fifth divided surface Sd5) of the (2n)th divided surface (for example, the second divided surface Sd2 or the fourth divided surface Sd4) is greater than a depth of a step from the (2n−1)th divided surface (for example, the first divided surface Sd1 or the third divided surface Sd3) of the (2n)th divided surface (for example, the second divided surface Sd2 or the fourth divided surface Sd4). Even in this case, a depth of a step from the (2n+1)th divided surface of the (2n)th divided surface is smaller than a depth of a step from the (2n−1)th divided surface of the (2n)th divided surface in the case of t1>t2 and NA1>NA2 or t1<t2 and NA1<NA2 as in the foregoing. Further, at the position that is away from an optical axis by a prescribed distance, it is preferable that a difference between a position of the surface interpolated between the (2n−1)th divided surface and the (2n+1)th divided surface (for example, the first divided surface Sd1 and the third divided surface Sd3, or the third divided surface Sd3 and the fifth divided surface Sd5) and a position of the (2n)th divided surface (for example, the second divided surface Sd2 or the fourth divided surface Sd4) is asymmetric about the position that is mostly the center of the second divided surface (for example, the second divided surface Sd2 or the fourth divided surface Sd4). Further, in this case, it is preferable that the difference is made larger as the distance from the optical axis grows greater.

Though the refracting surface S1 closer to a light source on the objective lens 216 is divided into five surfaces, the invention is not limited to this, and the refracting surfaces may also be provided on an optical element (for example, a collimator lens) of another light-converging optical system, or an optical element may be provided separately.

Though there are provided steps on boundaries of the first divided surface Sd1—the fifth divided surface Sd5, it is also possible to form divided surfaces continuously without providing a step on at least one boundary. With regard to a boundary between divided surfaces, both divided surfaces may also be connected by prescribed R, without bending the boundary. This R may be either one provided intentionally or one which is not provided intentionally (an example of one which is not provided intentionally is an R on a boundary formed in processing a metal mold which is needed when objective lens 16 is made of plastic).

Though second divided surface Sd2 and the fourth divided surface Sd4 are provided to be in a shape of a ring representing a circle concentric with an optical axis when objective lens 216 is viewed from the light source side, the invention is not limited to this, and they may also be provided to be in a discontinuous ring. The second divided surface Sd2 and/or the fourth divided surface Sd4 may further be composed of a hologram or a Fresnel lens. When the second divided surface Sd2 is composed of holograms, one of the light flux that is divided into zero-order light and primary light is used to reproduce the first optical disk, and the other is used to reproduce the second optical disk. In this case, it is preferable that a quantity of light of the light flux used for reproduction of the second optical disk is larger than that of light of the light flux used for reproduction of the first optical disk.

It is possible to improve reproduction signals of the second optical disk, by making the best-fit wavefront aberration of a light flux passing through the first divided surface Sd1 and the third divided surface Sd3 to satisfy 0.05 λrms or less (λ(nm) is a wavelength of light from a light source used for reproducing the first optical disk) when reproducing the first optical disk (namely when a t1-thick transparent substrate is passed), and by making the best-fit wavefront aberration of a light flux passing through the first divided surface Sd1 to satisfy 0.07 λrms (λ(nm) is a wavelength of light from a light source used for reproducing the second optical disk) representing the diffraction limit when reproducing the second optical disk (namely when a t2-thick transparent substrate is passed).

In the case of employing the objective lenses 16 and 116 stated in detail above, the first divided surface is made to be the surface including an optical axis. However, the surface covering an extremely narrow area around the optical axis which has no influence on the light convergence may also be flat, convex or concave because such surface covering an extremely narrow area around the optical axis hardly affects the light convergence. In short, a divided surface used for reproducing the second optical disk has only to be provided in the vicinity of NA2 and the first divided surface has only to be inside the divided surface used for reproducing the second optical disk toward the optical axis.

In the above-mentioned statement, the explanation is only for reproduction of information recorded on an optical disk, which, however, is the same even in the case of recording information on the optical disk on the ground that a light spot obtained by converging light by a light-converging optical system (objective lens) is important, thus can naturally be used effectively also for recording.

In addition, in the case of employing the objective lenses 16, 116 and 216 stated above, there is an effect that S-shaped characteristics of focus error signals are improved.

In the following examples, let it be assumed that a DVD (transparent substrate thickness t1=0.6 mm, necessary numerical aperture NA1=0.60 (λ=635 nm)) is used as a first optical disk, and a CD (transparent substrate thickness t2=1.2 mm, necessary numerical aperture NA2=0.45 (λ=780 nm)) or a CD-R (transparent substrate thickness t2=1.2 mm, necessary numerical aperture NA2=0.50 (λ=780 nm) (however, NA2=0.45 (λ=780 nm) in the case of only reproduction)) is used as a second optical disk. In the following examples of the objective lens 16, there is shown an arrangement relating to entry and thereafter of a light flux, on the assumption that collimator lens 13 capable of collimating into a collimated light flux that is mostly free from aberration is used, because the collimator lens 13, when its design is optimum, can cause a collimated light flux being almost free from aberration to enter the objective lens 16. With an aperture-stop arranged on the light source side on the objective lens 16 serving as the first plane, a radius of curvature on the lens plane that is i-th from the first plane is represented by ri, a distance between the i-th plane and the (i+1)th plane in the case of reproducing a DVD is represented by di (in the case of reproducing a CD, when a numerical value is described on di', that value is used, and when no numerical value is described, the value is the same as di), and a refractive index for the distance at a wavelength of a light flux of a laser light source is represented by ni. When an aspheric surface is used for the optical plane, the expression of the aspheric surface mentioned above serves as the base.

Descriptions in Tables 4, 7, 8, 11, 14, 15, 18, 19, 22, 23, 26, 27, 30, 31, 34, 35, 38 and 39 are conducted as follows. A numeral in parentheses following NAL or NAH represents the number of order in divided surfaces (for example, NAL (2) shows a value of NAL on the second divided surface).

H2n mid represents a height from an optical axis to the central position of the second divided surface in the direction perpendicular to the optical axis.

(Q2n−1, 2n+1, mid) represents an angle formed between a normal line to the surface interpolated between the (2n−1)th divided surface and the (2n+1)th divided surface at height H2n mid and an optical axis.

(Q2n, mid) represents an angle formed between a normal line to the second divided surface at height H2n mid and an optical axis.

The symbol (ΔQ2n, mid) shows a difference between (Q2n, mid) and (Q2n−1, 2n+1, mid). In this case, n represents a natural number.

An angle formed between a normal line to the surface interpolated between the (2n−1)th divided surface and the (2n+1)th divided surface at its central position and an optical axis is an average angle of an angle formed between a normal line to the imagined surface where the (2n−1)th divided surface is extended toward the second divided surface at height H2n mid from the optical axis and the optical axis and an angle formed between a normal line to the imagined surface where the (2n+1)th divided surface is extended toward the second divided surface at height H2n mid from the optical axis and the optical axis.

In this case, when imagining the surface concretely, Expression 1 of an aspherical surface may be referred to.

"Defocus" described on the lower portion of each of FIGS. 9(a), 9(b), 13(a), 13(b), 18(a), 18(b), 22(a), 22(b), 27(a), 27(b), 32(a), 32(b), 37(a), 37(b), 42(a), 42(b), 47(a), 47(b) and 52(a), 52(b) represents an amount by which the objective lens 16 is moved in the direction of an optical axis for obtaining the best-fit wavefront aberration under the condition that the advancing direction of a light flux from a light source is positive, from the position of the objective lens 16 agreeing with a geometric focus position on an information recording plane of an optical disk (through a transparent substrate having a prescribed thickness and refractive index).

EXAMPLE 1

Example 1 represents an example wherein the invention is applied to objective lens 16 which is to be mounted on optical pickup apparatus 10 stated above and is provided with steps on boundaries of the first divided surface Sd1— the third divided surface Sd3 of the objective lens.

Optical data of the objective lens are shown in Tables 2 and 3.

TABLE 2

| Wavelength λ | | | 635 nm | |
|---|---|---|---|---|
| Focal length | | | 3.36 mm | |
| Aperture-stop diameter | | | φ4.04 mm | |
| Lateral magnification of objective lens | | | 0 | |
| i | ri | di | di' | ni |
| 1 | ∞ | 0.000 | | 1.0 |
| 2 | 2.114 | 2.200 | | 1.5383 |
| 3 | −7.96 | 1.757 | 1.377 | 1.0 |
| 4 | ∞ | 0.600 | 1.200 | 1.58 |

TABLE 3

Aspheric surface data

| Second surface (refracting surface) | First aspheric surface | 0 < H < 1.212 (First divided surface) 1.347 ≦ H (Third divided surface) κ = −0.88658 A1 = 0.51091 × 10⁻²    P1 = 4.0 A2 = 0.27414 × 10⁻³    P2 = 6.0 A3 = 0.11020 × 10⁻⁴    P3 = 8.0 A4 = −0.72311 × 10⁻⁵    P4 = 10.0 |
|---|---|---|

TABLE 3-continued

Aspheric surface data

| Second aspheric surface | 1.212 ≦ H < 1.347 (Second divided surface) κ = −0.94120 A1 = 0.61109 × 10⁻²    P1 = 4.0 A2 = 0.30854 × 10⁻³    P2 = 6.0 A3 = 0.20160 × 10⁻⁴    P3 = 8.0 A4 = −0.81949 × 10⁻⁵    P4 = 10.0 |
|---|---|
| Third surface (refracting surface) | κ = −0.24879 × 10⁻² A1 = 0.94269 × 10⁻²    P1 = 4.0 A2 = −0.32152 × 10⁻²    P2 = 6.0 A3 = 0.53282 × 10⁻³    P3 = 8.0 A4 = −0.37853 × 10⁻⁴    P4 = 10.0 |

In the objective lens of the present example, a position where the first aspheric surface intersects with an optical axis is the same as that where the second aspheric surface intersects with an optical axis.

FIG. 8(a) shows a diagram of spherical aberration in the case of transmission through a t1-thick transparent substrate (hereinafter referred to as in the case of reproduction of a DVD), while, FIG. 8(b) shows a diagram of spherical aberration in the case of transmission through a t2-thick (=1.2 mm) transparent substrate (hereinafter referred to as in the case of reproduction of a CD). FIG. 9(a) shows a diagram of wavefront aberration viewed under the state of defocusing at the position where the best-fit wavefront aberration is obtained in the case of reproduction of a DVD, while, FIG. 9(b) shows a diagram of wavefront aberration viewed under the state of defocusing at the position where the best-fit wavefront aberration is obtained in the case of reproduction of a CD. Table 4 shows numerical apertures for NAL and NAH, quantities of spherical aberration caused, angles each being formed between a normal line and an optical axis, normal lines and each condition.

TABLE 4

| | | Spherical aberration (mm) | |
|---|---|---|---|
| Height H | Numerical aperture | In DVD reproduction | In CD reproduction |
| 1.212 | NAL(1) = 0.3606 | −0.15363 × 10⁻⁴ | 0.15933 × 10⁻¹ |
| | NAL(2) = 0.3617 | −0.10720 × 10⁻¹ | 0.53341 × 10⁻² |
| 1.374 | NAH(2) = 0.4024 | −0.13510 × 10⁻¹ | 0.67388 × 10⁻² |
| | NAH(3) = 0.4008 | −0.16412 × 10⁻⁴ | 0.20059 × 10⁻¹ |

0.60NA2 = 0.60 × 0.366 = 0.220
1.3NA2 = 1.3 × 0.366 = 0.476
NAH-NAL = 0.4024 − 0.3617 = 0.0407
−2κ/(NA2)² = −2 × 635 nm/(0.366)² = −9.48 μm
5κ/(NA2)² = 5 × 635 nm/(0.366)² = 23.7 μm
H2mid = (1.212 + 1.374)/2 = 1.280
θ1, 3, mid = 33.69622°
θ2, mid = 33.81796°
Δθ2 mid = 33.81796 − 33.69622 = 0.12174°

FIG. 10 shows a diagram of relative intensity distribution of a light-converged spot in the case where the best spot shape is obtained in reproduction of a DVD, while, FIG. 11 shows a diagram of relative intensity distribution of a light-converged spot in the case where the best spot shape is obtained in reproduction of a CD.

EXAMPLE 2

Example 2 represents an example wherein the invention is applied to objective lens 116 which is to be mounted on optical pickup apparatus 100 (wavelength λ1 of the first light source=635 nm, and wavelength $\lambda 2$ of the second light source=780 nm) and is provided with steps on boundaries of the first divided surface Sd1—the third divided surface Sd3 of the objective lens.

Optical data of the objective lens are shown in Tables 5 and 6.

TABLE 5

| Wavelength $\lambda$ | 635 nm | | 780 nm | |
|---|---|---|---|---|
| Focal length | 3.36 mm | | 3.39 mm | |
| Aperture-stop diameter | | $\phi$4.04 mm | | |
| Lateral magnification of objective lens | | | 0 | |
| i | ri | di | di' | ni | ni' |
| 1 | $\infty$ | 0.000 | | 1.0 | 1.0 |
| 2 | 2.114 | 2.200 | | 1.5383 | 1.5337 |
| 3 | −7.963 | 1.757 | 1.401 | 1.0 | 1.0 |
| 4 | $\infty$ | 0.600 | 1.200 | 1.58 | 1.58 |

TABLE 6

Aspheric surface data

| Second surface (refracting surface) | First aspheric surface | $0 < H < 1.414$ (First divided surface) $1.549 \leq H$ (Third divided surface) $\kappa = -0.9770$ | |
| | | $A1 = 0.63761 \times 10^{-3}$ | $P1 = 3.0$ |
| | | $A2 = 0.36688 \times 10^{-3}$ | $P2 = 4.0$ |
| | | $A3 = 0.83511 \times 10^{-2}$ | $P3 = 5.0$ |
| | | $A4 = -0.37296 \times 10^{-2}$ | $P4 = 6.0$ |
| | | $A5 = 0.46548 \times 10^{-3}$ | $P5 = 8.0$ |
| | | $A6 = -0.43124 \times 10^{-4}$ | $P6 = 10.0$ |
| | Second aspheric surface | $1.414 \leq H < 1.549$ (Second divided surface) $\kappa = -0.12982 \times 10$ | |
| | | $A1 = 0.79671 \times 10^{-2}$ | $P1 = 3.0$ |
| | | $A2 = 0.13978 \times 10^{-1}$ | $P2 = 4.0$ |
| | | $A3 = 0.26968 \times 10^{-1}$ | $P3 = 5.0$ |
| | | $A4 = -0.11073 \times 10^{-1}$ | $P4 = 6.0$ |
| | | $A5 = 0.10432 \times 10^{-2}$ | $P3 = 8.0$ |
| | | $A6 = -0.74338 \times 10^{-4}$ | $P4 = 10.0$ |
| Third surface (refracting surface) | | $\kappa = -0.24914 \times 10^{-2}$ | |
| | | $A1 = 0.13775 \times 10^{-2}$ | $P1 = 3.0$ |
| | | $A2 = -0.41269 \times 10^{-2}$ | $P2 = 4.0$ |
| | | $A3 = 0.21236 \times 10^{-1}$ | $P3 = 5.0$ |
| | | $A4 = -0.13895 \times 10^{-1}$ | $P4 = 6.0$ |
| | | $A5 = 0.16631 \times 10^{-2}$ | $P5 = 8.0$ |
| | | $A6 = -0.12138 \times 10^{-3}$ | $P6 = 10.0$ |

In the objective lens of the present example, a position where the first aspheric surface intersects with an optical axis is the same as that where the second aspheric surface intersects with an optical axis. The symbol ni' in Table 5 represents a refractive index in the second light source ($\lambda 2=780$ nm).

Figure 12:
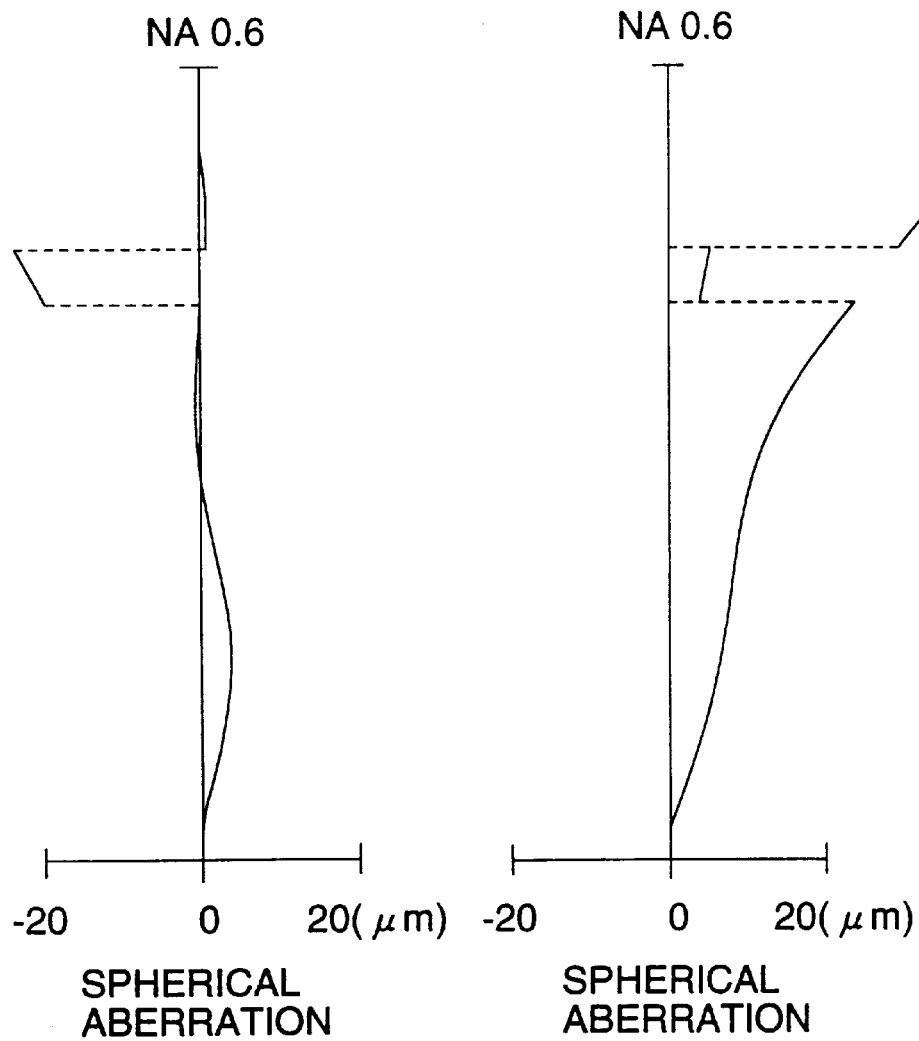
Figure 13:
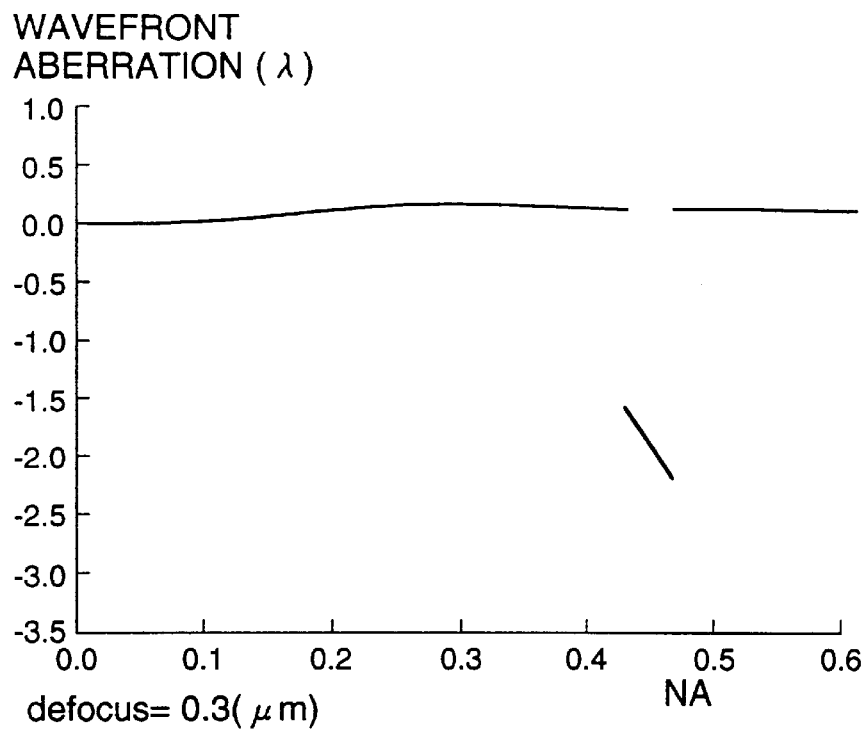
Figure 13:
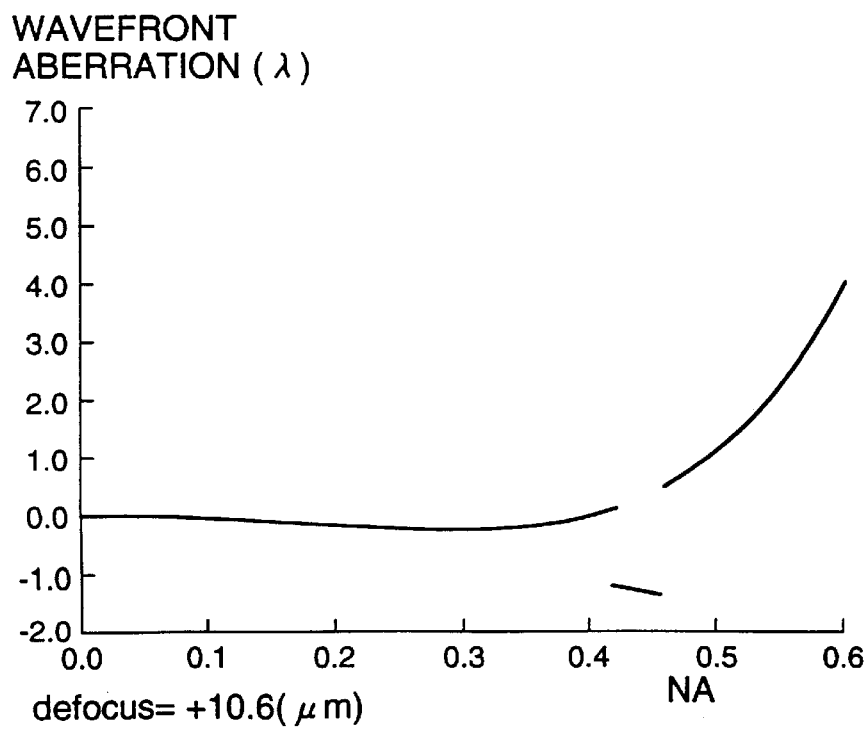

FIG. 12($a$) shows a diagram of spherical aberration in the case of reproduction of a DVD, while, FIG. 12($b$) shows a diagram of spherical aberration in the case of reproduction of a CD. FIG. 13($a$) shows a diagram of wavefront aberration viewed under the state of defocusing at the position where the best-fit wavefront aberration is obtained in the case of reproduction of a DVD, while, FIG. 13($b$) shows a diagram of wavefront aberration viewed under the state of defocusing at the position where the best-fit wavefront aberration is obtained in the case of reproduction of a CD. Table 7 shows numerical apertures for NAL and NAH, quantities of spherical aberration caused, angles each being formed between a normal line and an optical axis, normal lines and each condition.

TABLE 7

| | In DVD reproduction | | In CD reproduction (mm) | |
|---|---|---|---|---|
| | | Spherical | | |
| Height H | Numerical aperture | aberration (mm) | Numerical aperture | Spherical aberration |
| 1.414 | NAL(1) = 0.4207 | $0.24061 \times 10^{-3}$ | NAL(1) = 0.4172 | $0.2393 \times 10^{-1}$ |
| | NAL(2) = 0.4232 | $-0.20032 \times 10^{-1}$ | NAL(2) = 0.4197 | $0.37703 \times 10^{-2}$ |
| 1.549 | NAH(2) = 0.4642 | $-0.24054 \times 10^{-1}$ | NAH(2) = 0.4604 | $0.52181 \times 10^{-2}$ |
| | NAH(3) = 0.4608 | $0.60913 \times 10^{-3}$ | NAH(3) = 0.4571 | $0.2965 \times 10^{-1}$ |

$0.60 NA2 = 0.60 \times 0.45 = 0.270$
$1.1 NA2 = 1.1 \times 0.45 = 0.495$
$NAH-NAL = 0.4604 - 0.4197 = 0.0407$
$-2(\lambda 2)/(NA2)^2 = -2 \times 780 \text{ nm}/(0.45)^2 = -7.70 \ \mu m$
$5(\lambda 2)/(NA2)^2 = 5 \times 780 \text{ nm}/(0.45)^2 = 19.26 \ \mu m$
$H2mid = (1.414 + 1.549)/2 = 1.482$
$\theta 1, 3, mid = 38.62261°$
$\theta 2, mid = 38.87220°$
$\Delta\theta 2, mid = 38.87220 - 38.62261 = 0.24959°$ FIG. 14 shows a diagram of relative intensity distribution of a light-converged spot in the case where the best spot shape is obtained in reproduction of a DVD, while, FIG. 15 shows a diagram of relative intensity distribution of a light-converged spot in the case where the best spot shape is obtained in reproduction of a CD.

Even when the objective lens in the present embodiment is mounted on optical pickup apparatus 10 employing a single light source (wavelength $\lambda 1$ of the light source=635 nm), reproduction was possible not only for DVD but also for CD. FIG. 16 shows a diagram of relative intensity distribution of a light-converged spot in the case where the best spot shape is obtained in reproduction of a CD. Numerical apertures for NAL and NAH, quantities of spherical aberration caused, angles each being formed between a normal line and an optical axis, normal lines and each condition in this case are shown in Table 8.

TABLE 8

$\lambda = 635$ nm

| | In DVD reproduction | | In CD reproduction | |
|---|---|---|---|---|
| | | Spherical | | |
| Height H | Numerical aperture | aberration (mm) | Numerical aperture | Spherical aberration |
| 1.414 | NAL(1) = 0.4207 | $0.24061 \times 10^{-3}$ | NAL(1) = 0.4207 | $0.22575 \times 10^{-1}$ |
| | NAL(2) = 0.4232 | $-0.20032 \times 10^{-1}$ | NAL(2) = 0.4232 | $0.25983 \times 10^{-2}$ |
| 1.549 | NAH(2) = 0.4642 | $-0.24054 \times 10^{-1}$ | NAH(2) = 0.4642 | $0.38067 \times 10^{-2}$ |
| | NAH(3) = 0.4608 | $0.60913 \times 10^{-3}$ | NAH(3) = 0.4608 | $0.28016 \times 10^{-1}$ |

$0.60 NA2 = 0.60 \times 0.366 = 0.220$
$1.3 NA2 = 1.3 \times 0.366 = 0.476$
$NAH-NAL = 0.4642 - 0.4232 = 0.0410$
$-2(\lambda 2)/(NA2)^2 = -2 \times 635 \text{ nm}/(0.366)^2 = -9.48 \ \mu m$
$5(\lambda 2)/(NA2)^2 = 5 \times 635 \text{ nm}/(0.366)^2 = 23.7 \ \mu m$
$H2mid = (1.414 + 1.549)/2 = 1.482$
$\theta 1, 3, mid = 38.62261°$
$\theta 2, mid = 38.87220°$
$\Delta\theta 2, mid = 38.87220 - 38.62261 = 0.24959°$

EXAMPLE 3

Example 3 represents an example wherein the invention is applied to objective lens 16 which is to be mounted on optical pickup apparatus 10 with a single light source and is provided with a step on a boundary between the second divided surface Sd2 and the third divided surface Sd3 and is provided with no step on a boundary between the first divided surface Sd1 and the second divided surface Sd3 of the objective lens.

Optical data of the objective lens are shown in Tables 9 and 10.

TABLE 9

| Wavelength $\lambda$ | | | 635 nm | |
|---|---|---|---|---|
| Focal length | | | 3.36 mm | |
| Aperture-stop diameter | | | $\phi$4.04 mm | |
| Lateral magnification of objective lens | | | 0 | |
| i | ri | di | di' | ni |
| 1 | $\infty$ | 0.000 | | 1.0 |
| 2 | 2.114 | 2.2000 | | 1.5383 |
| 3 | −7.96 | 1.757 | 1.377 | 1.0 |
| 4 | $\infty$ | 0.600 | 1.200 | 1.58 |

TABLE 10

Aspheric surface data

| Second surface (refracting surface) | First aspheric surface | 0 < H < 1.212 (First divided surface)<br>1.347 ≦ H (Third divided surface)<br>$\kappa$ = −0.88658<br>A1 = 0.51091 × 10$^{-2}$   P1 = 4.0<br>A2 = 0.27414 × 10$^{-3}$   P2 = 6.0<br>A3 = 0.11020 × 10$^{-4}$   P3 = 8.0<br>A4 = −0.72311 × 10$^{-5}$   P4 = 10.0 |
|---|---|---|
| | Second aspheric surface | 1.212 ≦ H < 1.347 (Second divided surface)<br>d2 = 2.200702<br>$\kappa$ = −0.94120<br>A1 = 0.61109 × 10$^{-2}$   P1 = 4.0<br>A2 = 0.30854 × 10$^{-3}$   P2 = 6.0<br>A3 = 0.20160 × 10$^{-4}$   P3 = 8.0<br>A4 = −0.81949 × 10$^{-5}$   P4 = 10.0 |
| Third surface (refracting surface) | | $\kappa$ = −0.24879 × 10$^{-2}$<br>A1 = 0.94269 × 10$^{-2}$   P1 = 4.0<br>A2 = −0.32152 × 10$^{-2}$   P2 = 6.0<br>A3 = 0.53282 × 10$^{-3}$   P3 = 8.0<br>A4 = −0.37853 × 10$^{-4}$   P4 = 10.0 |

The expression of "d2=2.200702" in the column of "Second aspheric surface" in Table 9 represents a distance on an optical axis between an intersecting point where the optical axis intersects with the second aspheric surface (second divided surface) when it is extended, following the aspherical shape thereof, and the third surface. Namely, owing to this value, the first divided surface is connected with the second divided surface continuously (without having any steps).

FIG. 17(a) shows a diagram of spherical aberration in the case of reproduction of a DVD, while, FIG. 17(b) shows a diagram of spherical aberration in the case of reproduction of a CD. FIG. 18(a) shows a diagram of wavefront aberration viewed under the state of defocusing at the position where the best-fit wavefront aberration is obtained in the case of reproduction of a DVD, while, FIG. 18(b) shows a diagram of wavefront aberration viewed under the state of defocusing at the position where the best-fit wavefront aberration is obtained in the case of reproduction of a CD. Table 11 shows numerical apertures for NAL and NAH, quantities of spherical aberration caused, angles each being formed between a normal line and an optical axis, normal lines and each condition.

TABLE 11

| | | Spherical aberration (mm) | |
|---|---|---|---|
| Height H | Numerical aperture | In DVD reproduction | In CD reproduction |
| 1.212 | NAL(1) = 0.3606 | −0.15363 × 10$^{-4}$ | 0.15933 × 10$^{-1}$ |
| | NAL(2) = 0.3617 | −0.11068 × 10$^{-1}$ | 0.49864 × 10$^{-2}$ |
| 1.374 | NAH(2) = 0.4024 | −0.13857 × 10$^{-1}$ | 0.63914 × 10$^{-2}$ |
| | NAH(3) = 0.4008 | −0.16412 × 10$^{-4}$ | 0.20059 × 10$^{-1}$ |

0.60NA2 = 0.60 × 0.366 = 0.220
1.3NA2 = 1.3 × 0.366 = 0.476
NAH-NAL = 0.4024 − 0.3617 = 0.0407
−2$\kappa$/(NA2)$^2$ = −2 × 635 nm/(0.366)$^2$ = −9.48 $\mu$m
5$\kappa$/(NA2)$^2$ = 5 × 635 nm/(0.366)$^2$ = 23.7 $\mu$m
H2mid = (1.212 + 1.374)/2 = 1.280
$\theta$1, 3, mid = 33.69622°
$\theta$2, mid = 33.81796°
$\Delta\theta$2 mid = 33.81796 − 33.69622 = 0.12174°

FIG. 19 shows a diagram of relative intensity distribution of a light-converged spot in the case where the best spot shape is obtained in reproduction of a DVD, while, FIG. 20 shows a diagram of relative intensity distribution of a light-converged spot in the case where the best spot shape is obtained in reproduction of a CD.

EXAMPLE 4

Example 4 represents an example wherein the invention is applied to objective lens 116 which is to be mounted on optical pickup apparatus 100 (wavelength $\lambda$1 of the first light source=635 nm, and wavelength $\lambda$2 of the second light source=780 nm) and is provided with steps on boundaries of the first divided surface Sd1—the third divided surface Sd3 of the objective lens 116.

Optical data of the objective lens are shown in Tables 12 and 13.

TABLE 12

| Wavelength $\lambda$ | | | 635 nm | 780 nm |
|---|---|---|---|---|
| Focal length | | | 3.36 mm | 3.39 mm |
| Aperture-stop diameter | | | $\phi$4.04 mm | |
| Lateral magnification of objective lens | | | 0 | |
| i | ri | di | di' | ni | ni' |
| 1 | $\infty$ | 0.000 | | 1.0 | 1.0 |
| 2 | 2.114 | 2.200 | | 1.5383 | 1.5337 |
| 3 | −7.963 | 1.757 | 1.401 | 1.0 | 1.0 |
| 4 | $\infty$ | 0.600 | 1.200 | 1.58 | 1.58 |
| 5 | $\infty$ | | | | |

TABLE 13

Aspheric surface data

| Second surface (refracting surface) | First aspheric surface | 0 ≦ H < 1.397 (First divided surface)<br>1.532 ≦ H (Third divided surface)<br>$\kappa$ = −0.97700<br>A1 = 0.63761 × 10$^{-3}$   P1 = 3.0<br>A2 = 0.36688 × 10$^{-3}$   P1 = 4.0<br>A3 = 0.83511 × 10$^{-2}$   P1 = 5.0<br>A4 = −0.37296 × 10$^{-2}$   P1 = 6.0<br>A5 = 0.46548 × 10$^{-3}$   P1 = 8.0<br>A6 = −0.43124 × 10$^{-4}$   P1 = 10.0 |
|---|---|---|

TABLE 13-continued

Aspheric surface data

| | | |
|---|---|---|
| Second aspheric surface | $1.397 \leq H < 1.532$ (Second divided surface) $d2 = 2.1996$ $\kappa = -0.11481 \times 10^{+1}$ $A1 = 0.70764 \times 10^{-2}$ $A2 = 0.13388 \times 10^{-1}$ $A3 = 0.24084 \times 10^{-1}$ $A4 = -0.97636 \times 10^{-2}$ $A5 = 0.93136 \times 10^{-3}$ $A6 = -0.68008 \times 10^{-4}$ | $P1 = 3.0$ $P1 = 4.0$ $P1 = 5.0$ $P1 = 6.0$ $P1 = 8.0$ $P1 = 10.0$ |
| Third surface (refracting surface) | $\kappa = -0.24914 \times 10^{+2}$ $A1 = 0.13775 \times 10^{-2}$ $A2 = -0.41269 \times 10^{-1}$ $A3 = 0.21236 \times 10^{-1}$ $A4 = -0.13895 \times 10^{-1}$ $A5 = 0.16631 \times 10^{-2}$ $A6 = -0.12138 \times 10^{-3}$ | $P1 = 3.0$ $P1 = 4.0$ $P1 = 5.0$ $P1 = 6.0$ $P1 = 8.0$ $P1 = 10.0$ |

The expression of "d2=2.1996" in the column of "Second aspheric surface" in Table 13 represents a distance on an optical axis between an intersecting point where the optical axis intersects with the second aspheric surface (second divided surface) when it is extended, following the aspherical shape thereof, and the third surface. This is to increase a quantity of converged light (peak intensity) by shifting the second divided surface toward the optical axis by d2 and thereby by providing a phase difference. The symbol ni' in Table 12 represents a refractive index in the second light source ($\lambda 2 = 780$ nm).

Figure 21:
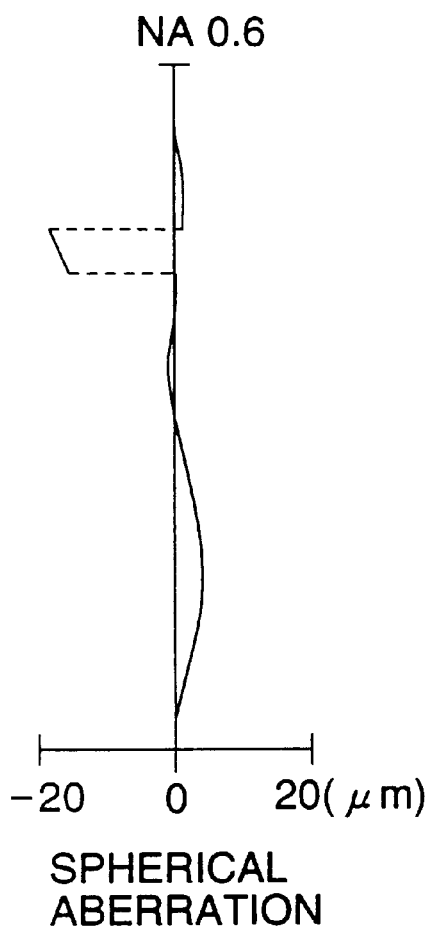
Figure 21:
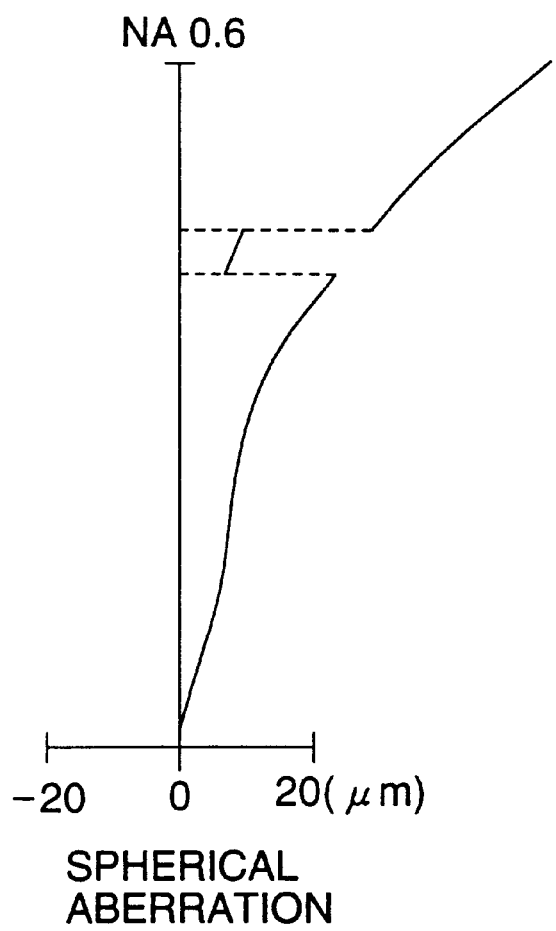
Figure 22:
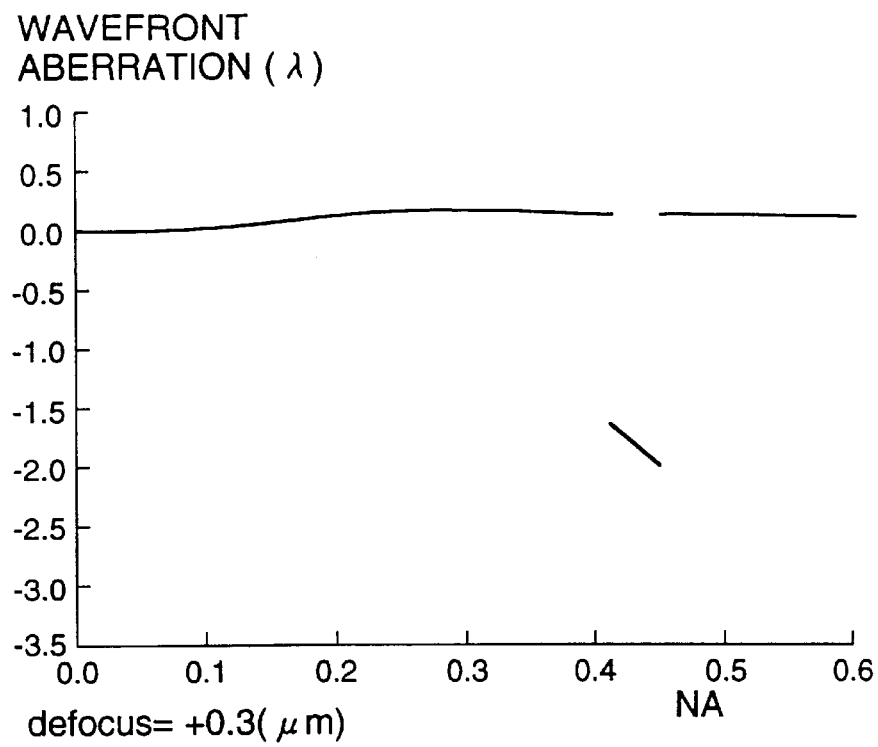
Figure 22:
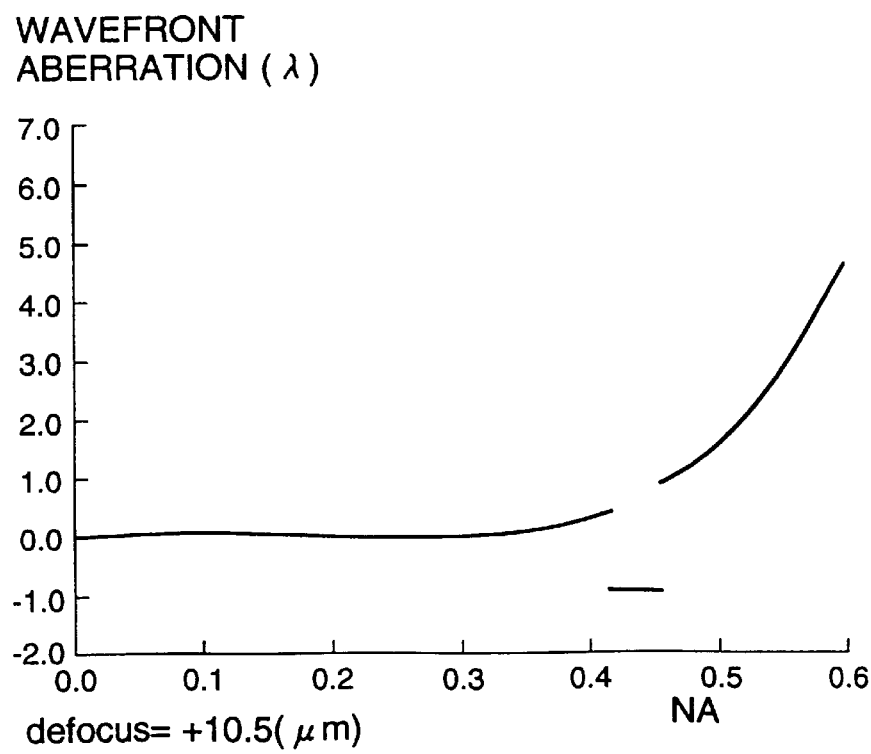

FIG. 21(*a*) shows a diagram of spherical aberration in the case of reproduction of a DVD, while, FIG. 21(*b*) shows a diagram of spherical aberration in the case of reproduction of a CD. FIG. 22(*a*) shows a diagram of wavefront aberration viewed under the state of defocusing at the position where the best-fit wavefront aberration is obtained in the case of reproduction of a DVD, while, FIG. 22(*b*) shows a diagram of wavefront aberration viewed under the state of defocusing at the position where the best-fit wavefront aberration is obtained in the case of reproduction of a CD. Table 14 shows numerical apertures for NAL and NAH, quantities of spherical aberration caused, angles each being formed between a normal line and an optical axis, normal lines and each condition.

TABLE 14

| | In DVD reproduction | | In CD reproduction | |
|---|---|---|---|---|
| | | Spherical | | |
| Height H | Numerical aperture | aberration (mm) | Numerical aperture | Spherical aberration (mm) |
| 1.397 | NAL(1) = 0.4156 | $0.16787 \times 10^{-3}$ | NAL(1) = 0.4122 | $0.23237 \times 10^{-1}$ |
| | NAL(2) = 0.4176 | $-0.15961 \times 10^{-1}$ | NAL(2) = 0.4142 | $0.71899 \times 10^{-2}$ |
| 1.532 | NAH(2) = 0.4584 | $-0.19079 \times 10^{-1}$ | NAH(2) = 0.4547 | $0.94214 \times 10^{-2}$ |
| | NAH(3) = 0.4558 | $0.59045 \times 10^{-3}$ | NAH(3) = 0.4521 | $0.28918 \times 10^{-1}$ |

$0.60\text{NA}2 = 0.60 \times 0.45 = 0.270$
$1.1\text{NA}2 = 1.1 \times 0.45 = 0.495$
$\text{NAH-NAL} = 0.4547 - 0.4142 = 0.0405$
$-2(\lambda 2)/(\text{NA}2)^2 = -2 \times 780 \text{ nm}/(0.45)^2 = -7.70 \ \mu\text{m}$
$5(\lambda 2)/(\text{NA}2)^2 = 5 \times 780 \text{ nm}/(0.45)^2 = 19.26 \ \mu\text{m}$
$H2\text{mid} = (1.397 + 1.532)/2 = 1.465$
$\theta 1, 3, \text{mid} = 38.21395°$ TABLE 14-continued

| | In DVD reproduction | | In CD reproduction | |
|---|---|---|---|---|
| | | Spherical | | |
| Height H | Numerical aperture | aberration (mm) | Numerical aperture | Spherical aberration (mm) |
| | $\theta 2, \text{mid} = 38.41159°$ | | | |
| | $\Delta\theta 2, \text{mid} = 38.41159 - 38.21395 = 0.19764°$ | | | |

FIG. 23 shows a diagram of relative intensity distribution of a light-converged spot in the case where the best spot shape is obtained in reproduction of a DVD, while, FIG. 24 shows a diagram of relative intensity distribution of a light-converged spot in the case where the best spot shape is obtained in reproduction of a CD.

Even when the objective lens in the present embodiment is mounted on optical pickup apparatus 10 employing a single light source (wavelength $\lambda 1$ of the light source=635 nm), reproduction was possible not only for DVD but also for CD. FIG. 25 shows a diagram of relative intensity distribution of a light-converged spot in the case where the best spot shape is obtained in reproduction of a CD. Numerical apertures for NAL and NAH, quantities of spherical aberration caused, angles each being formed between a normal line and an optical axis, normal lines and each condition in this case are shown in Table 15.

TABLE 15

$\lambda = 635$ nm

| | In DVD reproduction | | In CD reproduction | |
|---|---|---|---|---|
| | | Spherical | | |
| Height H | Numerical aperture | aberration (mm) | Numerical aperture | Spherical aberration (mm) |
| 1.397 | NAL(1) = 0.4156 | $0.16787 \times 10^{-3}$ | NAL(1) = 0.4156 | $0.21913 \times 10^{-1}$ |
| | NAL(2) = 0.4176 | $-0.15961 \times 10^{-1}$ | NAL(2) = 0.4176 | $0.60126 \times 10^{-2}$ |
| 1.532 | NAH(2) = 0.4584 | $-0.19079 \times 10^{-1}$ | NAH(2) = 0.4584 | $0.80011 \times 10^{-2}$ |
| | NAH(3) = 0.4558 | $0.59045 \times 10^{-3}$ | NAH(3) = 0.4558 | $0.27319 \times 10^{-1}$ |

$0.60\text{NA}2 = 0.60 \times 0.366 = 0.220$
$1.3\text{NA}2 = 1.3 \times 0.366 = 0.476$
$\text{NAH-NAL} = 0.4584 - 0.4176 = 0.0408$
$-2(\lambda 2)/(\text{NA}2)^2 = -2 \times 635 \text{ nm}/(0.366)^2 = -9.48 \ \mu\text{m}$
$5(\lambda 2)/(\text{NA}2)^2 = 5 \times 635 \text{ nm}/(0.366)^2 = 23.7 \ \mu\text{m}$
$H2\text{mid} = (1.397 + 1.532)/2 = 1.465$
$\theta 1, 3, \text{mid} = 38.21395°$
$\theta 2, \text{mid} = 38.41159°$
$\Delta\theta 2, \text{mid} = 38.41159 - 38.21395 = 0.19764°$

EXAMPLE 5

Example 5 represents an example wherein the invention is applied to objective lens 116 which is to be mounted on optical pickup apparatus 100 (wavelength $\lambda 1$ of the first light source=635 nm, and wavelength $\lambda 2$ of the second light source=780 nm) and is provided with steps on boundaries of the first divided surface Sd1—the third divided surface Sd3 of the objective lens 116. In the present example, a CD-R is assumed as the second optical disk, which indicates the relation of NA2=0.5 accordingly.

Optical data of the objective lens are shown in Tables 16 and 17.

TABLE 16

| Wavelength λ | | | | 635 nm | 780 nm |
|---|---|---|---|---|---|
| Focal length | | | | 3.36 mm | 3.39 mm |
| Aperture-stop diameter | | | | φ4.04 mm | |
| Lateral magnification of objective lens | | | | 0 | |
| i | ri | di | di' | ni | ni' |
| 1 | ∞ | 0.000 | | 1.0 | 1.0 |
| 2 | 2.114 | 2.200 | | 1.5383 | 1.5337 |
| 3 | −7.963 | 1.757 | 1.401 | 1.0 | 1.0 |
| 4 | ∞ | 0.600 | 1.200 | 1.58 | 1.58 |
| 5 | ∞ | | | | |

TABLE 17

| Aspheric surface data | | | |
|---|---|---|---|
| Second surface (refracting surface) | First aspheric surface | $0 \leq H < 1.515$ (First divided surface) $1.751 \leq H$ (Third divided surface) $\kappa = -0.97700$ | |
| | | $A1 = 0.63761 \times 10^{-3}$ | $P1 = 3.0$ |
| | | $A2 = 0.36688 \times 10^{-3}$ | $P1 = 4.0$ |
| | | $A3 = 0.83511 \times 10^{-2}$ | $P1 = 5.0$ |
| | | $A4 = -0.37296 \times 10^{-2}$ | $P1 = 6.0$ |
| | | $A5 = 0.46548 \times 10^{-3}$ | $P1 = 8.0$ |
| | | $A6 = -0.43124 \times 10^{-4}$ | $P1 = 10.0$ |
| | Second aspheric surface | $1.515 \leq H < 1.751$ (Second divided surface) $\kappa = -0.11481 \times 10^{+1}$ | |
| | | $A1 = 0.70764 \times 10^{-2}$ | $P1 = 3.0$ |
| | | $A2 = 0.13388 \times 10^{-1}$ | $P1 = 4.0$ |
| | | $A3 = 0.24084 \times 10^{-1}$ | $P1 = 5.0$ |
| | | $A4 = -0.97636 \times 10^{-2}$ | $P1 = 6.0$ |
| | | $A5 = 0.93136 \times 10^{-3}$ | $P1 = 8.0$ |
| | | $A6 = -0.68008 \times 10^{-4}$ | $P1 = 10.0$ |
| Third surface (refracting surface) | | $\kappa = -0.24914 \times 10^{+2}$ | |
| | | $A1 = 0.13775 \times 10^{-2}$ | $P1 = 3.0$ |
| | | $A2 = -0.41269 \times 10^{-2}$ | $P1 = 4.0$ |
| | | $A3 = 0.21236 \times 10^{-1}$ | $P1 = 5.0$ |
| | | $A4 = -0.13895 \times 10^{-1}$ | $P1 = 6.0$ |
| | | $A5 = 0.16631 \times 10^{-2}$ | $P1 = 8.0$ |
| | | $A6 = -0.12138 \times 10^{-3}$ | $P1 = 10.0$ |

In the objective lens of the present example, a position where the first aspheric surface intersects with an optical axis is the same as that where the second aspheric surface intersects with an optical axis. The symbol ni' in Table 16 represents a refractive index in the second light source ($\lambda 2 = 780$ nm).

FIG. 26(a) shows a diagram of spherical aberration in the case of reproduction of a DVD, while, FIG. 26(b) shows a diagram of spherical aberration in the case of reproduction of a CD-R. FIG. 27(a) shows a diagram of wavefront aberration viewed under the state of defocusing at the position where the best-fit wavefront aberration is obtained in the case of reproduction of a DVD, while, FIG. 27(b) shows a diagram of wavefront aberration viewed under the state of defocusing at the position where the best-fit wavefront aberration is obtained in the case of reproduction of a CD-R. Table 18 shows numerical apertures for NAL and NAH, quantities of spherical aberration caused, angles each being formed between a normal line and an optical axis, normal lines and each condition.

TABLE 18

| | In DVD reproduction | | In CD-R reproduction | |
|---|---|---|---|---|
| Height H | Numerical aperture | Spherical aberration (mm) | Numerical aperture | Spherical aberration (mm) |
| 1.515 | NAL(1) = 0.4507 | $0.56250 \times 10^{-3}$ | NAL(1) = 0.4470 | $0.28187 \times 10^{-1}$ |
| | NAL(2) = 0.4532 | $-0.18638 \times 10^{-1}$ | NAL(2) = 0.4496 | $0.91439 \times 10^{-2}$ |
| 1.751 | NAH(2) = 0.5253 | $-0.26720 \times 10^{-1}$ | NAH(2) = 0.5211 | $0.12335 \times 10^{-1}$ |
| | NAH(3) = 0.5212 | $0.22836 \times 10^{-3}$ | NAH(3) = 0.5170 | $0.38838 \times 10^{-1}$ |

0.60NA2 = 0.60 × 0.50 = 0.300
1.1NA2 = 1.1 × 0.50 = 0.550
NAH − NAL = 0.5211 − 0.4496 = 0.0715
$-2(\lambda 2)/(NA2)^2 = -2 \times 780$ nm$/(0.50)^2 = -6.24$ μm
$5(\lambda 2)/(NA2)^2 = 5 \times 780$ nm$/(0.50)^2 = 15.6$ μm
H2mid = (1.515 + 1.751)/2 = 1.633
θ1, 3, mid = 42.17430°
θ2, mid = 42.44207°
Δθ2, mid = 42.44207 − 42.17430 = 0.26777°

FIG. 28 shows a diagram of relative intensity distribution of a light-converged spot in the case where the best spot shape is obtained in reproduction of a DVD, while, FIG. 29 shows a diagram of relative intensity distribution of a light-converged spot in the case where the best spot shape is obtained in reproduction of a CD-R.

Even when the objective lens in the present embodiment is mounted on optical pickup apparatus 10 employing a single light source (wavelength λ1 of the light source=635 nm), reproduction was possible not only for DVD but also for CD. FIG. 30 shows a diagram of relative intensity distribution of a light-converged spot in the case where the best spot shape is obtained in reproduction of a CD. Numerical apertures for NAL and NAH, quantities of spherical aberration caused, angles each being formed between a normal line and an optical axis, normal lines and each condition in this case are shown in Table 19.

TABLE 19

| | In DVD reproduction | | In CD reproduction | |
|---|---|---|---|---|
| Height H | Numerical aperture | Spherical aberration (mm) | Numerical aperture | Spherical aberration (mm) |
| 1.515 | NAL(1) = 0.4507 | $0.56250 \times 10^{-3}$ | NAL(1) = 0.4507 | $0.26624 \times 10^{-1}$ |
| | NAL(2) = 0.4532 | $-0.18638 \times 10^{-1}$ | NAL(2) = 0.4532 | $0.77566 \times 10^{-2}$ |
| 1.751 | NAH(2) = 0.5253 | $-0.26720 \times 10^{-1}$ | NAH(2) = 0.5253 | $0.10403 \times 10^{-1}$ |
| | NAH(3) = 0.5212 | $0.22836 \times 10^{-3}$ | NAH(3) = 0.5212 | $0.36667 \times 10^{-1}$ |

0.60NA2 = 0.60 × 0.366 = 0.220
1.3NA2 = 1.3 × 0.366 = 0.476
NAH − NAL = 0.5253 − 0.4532 = 0.0721
$-2(\lambda 2)/(NA2)^2 = -2 \times 635$ nm$/(0.366)^2 = -9.48$ μm
$5(\lambda 2)/(NA2)^2 = 5 \times 635$ nm$/(0.366)^2 = 23.7$ μm
H2mid = (1.515 + 1.751)/2 = 1.633
θ1, 3, mid = 42.17430°
θ2, mid = 42.44207°
Δθ2 , mid = 42.44207 − 42.17430 = 0.26777°

EXAMPLE 6

Example 6 represents an example wherein objective lens 216 which is to be mounted on optical pickup apparatus 100

(wavelength λ1 of the first light source=635 nm, and wavelength λ2 of the second light source=780 nm), and the objective lens 216 wherein steps are provided on boundaries of the first divided surface Sd1—the fifth divided surface Sd5 of the objective lens 216 is mounted. In the present example, a CD-R is assumed as the second optical disk, which indicates the relation of NA2=0.5 accordingly.

h. Spherical Aberration

Optical data of the objective lens are shown in Tables 20 and 21.

TABLE 20

| Wavelength λ | | | | 635 nm | 780 nm |
|---|---|---|---|---|---|
| Focal length | | | | 3.36 mm | 3.39 mm |
| Aperture-stop diameter | | | | φ4.04 mm | |
| Lateral magnification of objective lens | | | | 0 | |
| i | ri | di | di' | ni | ni' |
| 1 | ∞ | 0.000 | | 1.0 | 1.0 |
| 2 | 2.114 | 2.200 | | 1.5383 | 1.5337 |
| 3 | −7.963 | 1.757 | 1.401 | 1.0 | 1.0 |
| 4 | ∞ | 0.600 | 1.200 | 1.58 | 1.58 |
| 5 | ∞ | | | | |

TABLE 21

Aspheric surface data

| Second surface (refracting surface) | First aspheric surface | $0 \leq H < 1.481$ (First divided surface) $1.549 \leq H < 1.700$ (Third divided surface) $1.784 \leq H$ (Fifth divided surface) $\kappa = -0.97700$ | |
|---|---|---|---|
| | | A1 = 0.63761 × 10$^{-3}$ | P1 = 3.0 |
| | | A2 = 0.36688 × 10$^{-3}$ | P1 = 4.0 |
| | | A3 = 0.83511 × 10$^{-2}$ | P1 = 5.0 |
| | | A4 = −0.37296 × 10$^{-2}$ | P1 = 6.0 |
| | | A5 = 0.46548 × 10$^{-3}$ | P1 = 8.0 |
| | | A6 = −0.43124 × 10$^{-4}$ | P1 = 10.0 |
| | Second aspheric surface | $1.481 \leq H < 1.549$ (Second divided surface) $1.700 \leq H < 1.784$ (Fourth divided surface) $\kappa = -0.11481 \times 10^{+1}$ | |
| | | A1 = 0.70764 × 10$^{-2}$ | P1 = 3.0 |
| | | A2 = 0.13388 × 10$^{-1}$ | P1 = 4.0 |
| | | A3 = 0.24084 × 10$^{-1}$ | P1 = 5.0 |
| | | A4 = −0.97636 × 10$^{-2}$ | P1 = 6.0 |
| | | A5 = 0.93136 × 10$^{-3}$ | P1 = 8.0 |
| | | A6 = −0.68008 × 10$^{-4}$ | P1 = 10.0 |
| Third surface (refracting surface) | | $\kappa = -0.24914 \times 10^{+2}$ | |
| | | A1 = 0.13775 × 10$^{-2}$ | P1 = 3.0 |
| | | A2 = −0.41269 × 10$^{-2}$ | P1 = 4.0 |
| | | A3 = 0.21236 × 10$^{-1}$ | P1 = 5.0 |
| | | A4 = −0.13895 × 10$^{-1}$ | P1 = 6.0 |
| | | A5 = 0.16631 × 10$^{-2}$ | P1 = 8.0 |
| | | A6 = −0.12138 × 10$^{-3}$ | P1 = 10.0 |

In the objective lens of the present example, a point where the first aspheric surface (surfaces of the first, the third and the fifth divided surfaces (or their extended surfaces) intersects with an optical axis and a point where a surface formed by extending each of the second divided surface Sd2 and the fourth divided surface Sd4 (both composing the second aspheric surface) intersects with an optical axis are on the same position. The symbol ni' in Table 22 represents a refractive index in the second light source (λ2=780 nm).

FIG. 31(a) shows a diagram of spherical aberration in the case of reproduction of a DVD, while, FIG. 31(b) shows a diagram of spherical aberration in the case of reproduction of a CD-R. FIG. 32(a) shows a diagram of wavefront aberration viewed under the state of defocusing at the position where the best-fit wavefront aberration is obtained in the case of reproduction of a DVD, while, FIG. 32(b) shows a diagram of wavefront aberration viewed under the state of defocusing at the position where the best-fit wavefront aberration is obtained in the case of reproduction of a CD-R. Table 22 shows numerical apertures for NAL and NAH, quantities of spherical aberration caused, angles each being formed between a normal line and an optical axis, normal lines and each condition.

TABLE 22

| | In DVD reproduction | | In CD-R reproduction | |
|---|---|---|---|---|
| Height H | Numerical aperture | Spherical aberration (mm) | Numerical aperture | Spherical aberration (mm) |
| 1.481 | NAL(1) = 0.4406 | 0.48121 × 10$^{-3}$ | NAL(1) = 0.4370 | 0.26737 × 10$^{-1}$ |
| | NAL(2) = 0.4430 | −0.17798 × 10$^{-1}$ | NAL(2) = 0.4393 | 0.85891 × 10$^{-2}$ |
| 1.549 | NAH(2) = 0.4636 | −0.19553 × 10$^{-1}$ | NAH(2) = 0.4598 | 0.96765 × 10$^{-2}$ |
| | NAH(3) = 0.4608 | 0.60932 × 10$^{-3}$ | NAH(3) = 0.4571 | 0.29652 × 10$^{-1}$ |
| 1.700 | NAL(3) = 0.5059 | 0.39402 × 10$^{-3}$ | NAL(3) = 0.5018 | 0.36389 × 10$^{-1}$ |
| | NAL(4) = 0.5096 | −0.24649 × 10$^{-1}$ | NAL(4) = 0.5055 | 0.11709 × 10$^{-1}$ |
| 1.784 | NAH(4) = 0.5354 | −0.28119 × 10$^{-1}$ | NAH(4) = 0.5312 | 0.12767 × 10$^{-1}$ |
| | NAH(5) = 0.5310 | 0.13146 × 10$^{-3}$ | NAH(5) = 0.5268 | 0.40512 × 10$^{-1}$ |

0.60NA2 = 0.60 × 0.50 = 0.300
1.1NA2 = 1.1 × 0.50 = 0.550
NAH(4) − NAL(2) = 0.5312 − 0.4393 = 0.0919
−2(λ2)/(NA2)$^2$ = −2 × 780 nm/(0.50)$^2$ = −6.24 μm
5(λ2)/(NA2)$^2$ = 5 × 780 nm/(0.50)$^2$ = 15.6 μm
H2mid = (1.481 + 1.549)/2 = 1.515
θ1, 3, mid = 39.41130°
θ2, mid = 39.62807°
Δθ2, mid = θ1, 3, mid − θ2mid = 39.62807 − 39.41130 = 0.21677°
H4mid = (1.700 + 1.784)/2 = 1.742
θ3, 5, mid = 44.62556°
θ4, mid = 44.94902°
Δθ4, mid = θ3, 5, mid − θ4mid = 44.94902 − 44.62556 = 0.32346°

FIG. 33 shows a diagram of relative intensity distribution of a light-converged spot in the case where the best spot shape is obtained in reproduction of a DVD, while, FIG. 34 shows a diagram of relative intensity distribution of a light-converged spot in the case where the best spot shape is obtained in reproduction of a CD-R.

Even when the objective lens in the present embodiment is mounted on optical pickup apparatus 10 employing a single light source (wavelength λ1 of the light source=635 nm), reproduction was possible not only for DVD but also for CD. FIG. 35 shows a diagram of relative intensity distribution of a light-converged spot in the case where the best spot shape is obtained in reproduction of a CD. Numerical apertures for NAL and NAH, quantities of spherical aberration caused, angles each being formed between a normal line and an optical axis, normal lines and each condition in this case are shown in Table 23.

TABLE 23

| | In DVD reproduction | | In CD reproduction | |
|---|---|---|---|---|
| Height | Numerical | Spherical aberration | Numerical | Spherical aberration |

TABLE 23-continued

| H | aperture | (mm) | aperture | (mm) |
|---|---|---|---|---|
| 1.481 | NAL(1) = 0.4406 | $0.48121 \times 10^{-3}$ | NAL(1) = 0.4406 | $0.25244 \times 10^{-1}$ |
| | NAL(2) = 0.4430 | $-0.17798 \times 10^{-1}$ | NAL(2) = 0.4430 | $0.72646 \times 10^{-2}$ |
| 1.549 | NAH(2) = 0.4636 | $-0.19553 \times 10^{-1}$ | NAH(2) = 0.4636 | $0.82240 \times 10^{-2}$ |
| | NAH(3) = 0.4608 | $0.60932 \times 10^{-3}$ | NAH(3) = 0.4608 | $0.28016 \times 10^{-1}$ |
| 1.700 | NAL(3) = 0.5059 | $0.39402 \times 10^{-3}$ | NAL(3) = 0.5059 | $0.34375 \times 10^{-1}$ |
| | NAL(4) = 0.5096 | $-0.24649 \times 10^{-1}$ | NAL(4) = 0.5096 | $0.99199 \times 10^{-2}$ |
| 1.784 | NAH(4) = 0.5354 | $-0.28119 \times 10^{-1}$ | NAH(4) = 0.5354 | $0.10732 \times 10^{-1}$ |
| | NAH(5) = 0.5310 | $0.13146 \times 10^{-3}$ | NAH(5) = 0.5310 | $0.38227 \times 10^{-1}$ |

0.60NA2 = 0.60 × 0.366 = 0.220
1.3NA2 = 1.3 × 0.366 = 0.476
NAH(4) − NAL(2) = 0.5354 − 0.4430 = 0.0924
$-2(\lambda 2)/(NA2)^2 = -2 \times 635$ nm/$(0.366)^2 = -9.48$ $\mu$m
$5(\lambda 2)/(NA2)^2 = 5 \times 635$ nm/$(0.366)^2 = 23.7$ $\mu$m
H2mid = (1.481 + 1.549)/2 = 1.515
θ1, 3, mid = 39.41130°
θ2, mid = 39.62807°
Δθ2, mid = θ1, 3, mid − θ2mid = 39.62807 − 39.41130 = 0.21677°
H4mid = (1.700 + 1.784)/2 = 1.742
θ3, 5, mid = 44.62556°
θ4, mid = 44.94902°
Δθ4, mid = θ3, 5, mid − θ4mid = 44.94902 − 44.62556 = 0.32346°

EXAMPLE 7

Example 7 represents an example wherein objective lens 216 which is to be mounted on optical pickup apparatus 100 (wavelength λ1 of the first light source=635 nm, and wavelength λ2 of the second light source=780 nm), and the objective lens 216 wherein steps are provided on boundaries of the first divided surface Sd1—the fifth divided surface Sd5 of the objective lens 216 is mounted. In the present example, a CD-R is assumed as the second optical disk, which indicates the relation of NA2=0.5 accordingly.

Optical data of the objective lens are shown in Tables 24 and 25.

TABLE 24

| Wavelength λ | | | | 635 nm | 780 nm |
|---|---|---|---|---|---|
| Focal length | | | | 3.36 mm | 3.39 mm |
| Aperture-stop diameter | | | | φ4.04 mm | |
| Lateral magnification of objective lens | | | | 0 | |
| i | ri | di | di' | ni | ni' |
| 1 | ∞ | 0.000 | | 1.0 | 1.0 |
| 2 | 2.114 | 2.200 | | 1.5383 | 1.5337 |
| 3 | −7.963 | 1.757 | 1.401 | 1.0 | 1.0 |
| 4 | ∞ | 0.600 | 1.200 | 1.58 | 1.58 |
| 5 | ∞ | | | | |

TABLE 25

| Aspheric surface data | | |
|---|---|---|
| Second surface (refracting | First aspheric surface | 0 ≦ H < 1.481 (First divided surface) |
| | | 1.549 ≦ H < 1.700 (Third divided surface) |

TABLE 25-continued

| Aspheric surface data | | | |
|---|---|---|---|
| surface) | | 1.784 ≦ H (Fifth divided surface) | |
| | | κ = −0.97700 | |
| | | A1 = $0.63761 \times 10^{-3}$ | P1 = 3.0 |
| | | A2 = $0.36688 \times 10^{-3}$ | P1 = 4.0 |
| | | A3 = $0.83511 \times 10^{-2}$ | P1 = 5.0 |
| | | A4 = $-0.37296 \times 10^{-2}$ | P1 = 6.0 |
| | | A5 = $0.46548 \times 10^{-3}$ | P1 = 8.0 |
| | | A6 = $-0.43124 \times 10^{-4}$ | P1 = 10.0 |
| | Second aspheric surface | 1.481 ≦ H < 1.549 (Second divided surface) | |
| | | 1.700 ≦ H < 1.784 (Fourth divided surface) | |
| | | d2 = 21996 | |
| | | d4 = 2.2003 | |
| | | κ = $-0.11481 \times 10^{+1}$ | |
| | | A1 = $0.70764 \times 10^{-2}$ | P1 = 3.0 |
| | | A2 = $0.13388 \times 10^{-1}$ | P1 = 4.0 |
| | | A3 = $0.24084 \times 10^{-1}$ | P1 = 5.0 |
| | | A4 = $-0.97636 \times 10^{-2}$ | P1 = 6.0 |
| | | A5 = $0.93136 \times 10^{-3}$ | P1 = 8.0 |
| | | A6 = $-0.68008 \times 10^{-4}$ | P1 = 10.0 |
| Third surface (refracting surface) | | κ = $-0.24914 \times 10^{+2}$ | |
| | | A1 = $0.13775 \times 10^{-2}$ | P1 = 3.0 |
| | | A2 = $-0.41269 \times 10^{-2}$ | P1 = 4.0 |
| | | A3 = $0.21236 \times 10^{-1}$ | P1 = 5.0 |
| | | A4 = $-0.13895 \times 10^{-1}$ | P1 = 6.0 |
| | | A5 = $0.16631 \times 10^{-2}$ | P1 = 8.0 |
| | | A6 = $-0.12138 \times 10^{-3}$ | P1 = 10.0 |

Descriptions of "d2=2.1996" and "d4=2.2003" in the column of "Second aspheric surface" in Table 25 respectively represent a distance on the optical axis between the third surface and a point where the optical axis intersects with the second divided surface (on the second aspheric surface) extended to the optical axis according to the expression of an aspheric surface shape, and a distance on the optical axis between the third surface and a point where the optical axis intersects with the fourth divided surface (on the second aspheric surface) extended to the optical axis according to the expression of an aspheric surface shape. This means that the second divided surface is shifted toward the optical axis by d2 and the fourth divided surface is shifted toward the optical axis by d4 to provide a phase difference between them so that a quantity of converged light (peak intensity) may be increased. The symbol ni' in Table 24 represents a refractive index in the second light source (λ2=780 nm)

FIG. 36(a) shows a diagram of spherical aberration in the case of reproduction of a DVD, while, FIG. 36(b) shows a diagram of spherical aberration in the case of reproduction of a CD-R. FIG. 37(a) shows a diagram of wavefront aberration viewed under the state of defocusing at the position where the best-fit wavefront aberration is obtained in the case of reproduction of a DVD, while, FIG. 37(b) shows a diagram of wavefront aberration viewed under the state of defocusing at the position where the best-fit wavefront aberration is obtained in the case of reproduction of a CD-R. Table 26 shows numerical apertures for NAL and NAH, quantities of spherical aberration caused, angles each being formed between a normal line and an optical axis, normal lines and each condition.

TABLE 26

| | In DVD reproduction | | In CD-R reproduction | |
|---|---|---|---|---|
| Height H | Numerical aperture | Spherical aberration (mm) | Numerical aperture | Spherical aberration (mm) |
| 1.481 | NAL(1) = 0.4406 | $0.48121 \times 10^{-3}$ | NAL(1) = 0.4370 | $0.26737 \times 10^{-1}$ |
| | NAL(2) = 0.4430 | $-0.17794 \times 10^{-1}$ | NAL(2) = 0.4393 | $0.85936 \times 10^{-2}$ |
| 1.549 | NAH(2) = 0.4636 | $-0.19550 \times 10^{-1}$ | NAH(2) = 0.4598 | $0.96802 \times 10^{-1}$ |
| | NAH(3) = 0.4608 | $0.60932 \times 10^{-3}$ | NAH(3) = 0.4571 | $0.29652 \times 10^{-1}$ |
| 1.700 | NAL(3) = 0.5059 | $0.39402 \times 10^{-3}$ | NAL(3) = 0.5018 | $0.36389 \times 10^{-1}$ |
| | NAL(4) = 0.5096 | $-0.24648 \times 10^{-1}$ | NAL(4) = 0.5055 | $0.11708 \times 10^{-1}$ |
| 1.784 | NAH(4) = 0.5354 | $-0.28114 \times 10^{-1}$ | NAH(4) = 0.5312 | $0.12771 \times 10^{-1}$ |
| | NAH(5) = 0.5310 | $0.13146 \times 10^{-3}$ | NAH(5) = 0.5268 | $0.40512 \times 10^{-1}$ |

$0.60NA2 = 0.60 \times 0.50 = 0.300$
$1.1NA2 = 1.1 \times 0.50 = 0.550$
$NAH(4) - NAL(2) = 0.5312 - 0.4393 = 0.0919$
$-2(\lambda 2)/(NA2)^2 = -2 \times 780 \text{ nm}/(0.50)^2 = -6.24 \,\mu m$
$5(\lambda 2)/(NA2)^2 = 5 \times 780 \text{ nm}/(0.50)^2 = 15.6 \,\mu m$
$H2\text{mid} = (1.481 + 1.549)/2 = 1.515$
$\theta 1, 3, \text{mid} = 39.41130°$
$\theta 2, \text{mid} = 39.62807°$
$\Delta\theta 2, \text{mid} = \theta 1, 3, \text{mid} - \theta 2\text{mid} = 39.62807 - 39.41130 = 0.21677°$
$H4\text{mid} = (1.700 + 1.784)/2 = 1.742$
$\theta 3, 5, \text{mid} = 44.62556°$
$\theta 4, \text{mid} = 44.94902°$
$\Delta\theta 4, \text{mid} = \theta 3, 5, \text{mid} - \theta 4\text{mid} = 44.94902 - 44.62556 = 0.32346°$ FIG. 38 shows a diagram of relative intensity distribution of a light-converged spot in the case where the best spot shape is obtained in reproduction of a DVD, while, FIG. 39 shows a diagram of relative intensity distribution of a light-converged spot in the case where the best spot shape is obtained in reproduction of a CD-R.

Even when the objective lens in the present embodiment is mounted on optical pickup apparatus 10 employing a single light source (wavelength λ1 of the light source=635 nm), reproduction was possible not only for DVD but also for CD. FIG. 40 shows a diagram of relative intensity distribution of a light-converged spot in the case where the best spot shape is obtained in reproduction of a CD. Numerical apertures for NAL and NAH, quantities of spherical aberration caused, angles each being formed between a normal line and an optical axis, normal lines and each condition in this case are shown in Table 27.

TABLE 27

| | In DVD reproduction | | In CD reproduction | |
|---|---|---|---|---|
| Height H | Numerical aperture | Spherical aberration (mm) | Numerical aperture | Spherical aberration (mm) |
| 1.481 | NAL(1) = 0.4406 | $0.48121 \times 10^{-3}$ | NAL(1) = 0.4406 | $0.25244 \times 10^{-1}$ |
| | NAL(2) = 0.4430 | $-0.17798 \times 10^{-1}$ | NAL(2) = 0.4430 | $0.72688 \times 10^{-2}$ |
| 1.549 | NAH(2) = 0.4636 | $-0.19550 \times 10^{-1}$ | NAH(2) = 0.4636 | $0.82274 \times 10^{-1}$ |
| | NAH(3) = 0.4608 | $0.60932 \times 10^{-3}$ | NAH(3) = 0.4608 | $0.28016 \times 10^{-1}$ |

TABLE 27-continued

| 1.700 | NAL(3) = 0.5059 | $0.39402 \times 10^{-3}$ | NAL(3) = 0.5059 | $0.34375 \times 10^{-1}$ |
|---|---|---|---|---|
| | NAL(4) = 0.5096 | $-0.24648 \times 10^{-1}$ | NAL(4) = 0.5096 | $0.99201 \times 10^{-2}$ |
| 1.784 | NAH(4) = 0.5354 | $-0.28114 \times 10^{-1}$ | NAH(4) = 0.5354 | $0.10737 \times 10^{-1}$ |
| | NAH(5) = 0.5310 | $0.13146 \times 10^{-3}$ | NAH(5) = 0.5310 | $0.38277 \times 10^{-1}$ |

$0.60NA2 = 0.60 \times 0.366 = 0.220$
$1.3NA2 = 1.3 \times 0.366 = 0.476$
$NAH(4) - NAL(2) = 0.5354 - 0.4430 = 0.0924$
$-2(\lambda 2)/(NA2)^2 = -2 \times 635 \text{ nm}/(0.366)^2 = -9.48 \,\mu m$
$5(\lambda 2)/(NA2)^2 = 5 \times 635 \text{ nm}/(0.366)^2 = 23.7 \,\mu m$
$H2\text{mid} = (1.481 + 1.549)/2 = 1.515$
$\theta 1, 3, \text{mid} = 39.41130°$
$\theta 2, \text{mid} = 39.62807°$
$\Delta\theta 2, \text{mid} = \theta 1, 3, \text{mid} - \theta 2\text{mid} = 39.62807 - 39.41130 = 0.21677°$
$H4\text{mid} = (1.700 + 1.784)/2 = 1.742$
$\theta 3, 5, \text{mid} = 44.62556°$
$\theta 4, \text{mid} = 44.94902°$
$\Delta\theta 4, \text{mid} = \theta 3, 5, \text{mid} - \theta 4\text{mid} = 44.94902 - 44.62556 = 0.32346°$

EXAMPLE 8

Example 8 represents an example wherein the invention is applied to objective lens 116 which is to be mounted on optical pickup apparatus 100 (wavelength λ1 of the first light source=635 nm, and wavelength λ2 of the second light source=780 nm), and in which the steps are provided on boundaries of the first divided surface Sd1—the third divided surface Sd3.

Optical data of the objective lens are shown in Tables 28 and 29.

TABLE 28

| Wavelength λ | | | 635 nm | 780 nm |
|---|---|---|---|---|
| Focal length | | | 3.36 mm | 3.39 mm |
| Aperture-stop diameter | | | φ4.04 mm | |
| Lateral magnification of objective lens | | | 0 | |
| i | ri | di | di' | ni | ni' |
| 1 | ∞ | 0.000 | | 1.0 | 1.0 |
| 2 | 2.114 | 2.200 | | 1.5383 | 1.5337 |
| 3 | -7.963 | 1.757 | 1.401 | 1.0 | 1.0 |
| 4 | ∞ | 0.600 | 1.200 | 1.58 | 1.58 |
| 5 | ∞ | | | | |

TABLE 29

| Aspheric surface data | | |
|---|---|---|
| Second surface (refracting surface) | First aspheric surface | $0 \leq H < 1.279$ (First divided surface) $1.532 \leq H$ (Third divided surface) $\kappa = -0.97700$ $A1 = 0.63761 \times 10^{-3}$ $P1 = 3.0$ $A2 = 0.36688 \times 10^{-3}$ $P1 = 4.0$ $A3 = 0.83511 \times 10^{-2}$ $P1 = 5.0$ $A4 = -0.37296 \times 10^{-2}$ $P1 = 6.0$ $A5 = 0.46548 \times 10^{-3}$ $P1 = 8.0$ $A6 = -0.43124 \times 10^{-4}$ $P1 = 10.0$ |
| | Second aspheric surface | $1.279 \leq H < 1.532$ (Second divided surface) $d2 = 2.1995$ $\kappa = -0.11481 \times 10^{+1}$ $A1 = 0.70764 \times 10^{-2}$ $P1 = 3.0$ $A2 = 0.13388 \times 10^{-1}$ $P1 = 4.0$ |

TABLE 29-continued

Aspheric surface data

|  | | |
|---|---|---|
|  | A3 = 0.24084 × 10$^{-1}$ | P1 = 5.0 |
|  | A4 = −0.97636 × 10$^{-2}$ | P1 = 6.0 |
|  | A5 = 0.93136 × 10$^{-3}$ | P1 = 8.0 |
|  | A6 = −0.68008 × 10$^{-4}$ | P1 = 10.0 |
| Third surface | κ = −0.24914 × 10$^{+2}$ | |
| (refracting surface) | A1 = 0.13775 × 10$^{-2}$ | P1 = 3.0 |
|  | A2 = −0.41269 × 10$^{-2}$ | P1 = 4.0 |
|  | A3 = 0.21236 × 10$^{-1}$ | P1 = 5.0 |
|  | A4 = −0.13895 × 10$^{-1}$ | P1 = 6.0 |
|  | A5 = 0.16631 × 10$^{-2}$ | P1 = 8.0 |
|  | A6 = −0.12138 × 10$^{-3}$ | P1 = 10.0 |

Descriptions of "d2=2.1996" in the column of "Second aspheric surface" in Table 29 represents a distance on the optical axis between the third surface and a point where the optical axis intersects with the second divided surface (on the second aspheric surface) extended to the optical axis according to the expression of an aspheric surface shape.

In the objective lens of the present example, a position where the first aspheric surface intersects with an optical axis is the same as that where the second aspheric surface intersects with an optical axis. The symbol ni' in Table 28 represents a refractive index in the second light source ($\lambda 2$=780 nm).

FIG. 41(a) shows a diagram of spherical aberration in the case of reproduction of a DVD, while, FIG. 41(b) shows a diagram of spherical aberration in the case of reproduction of a CD. FIG. 42(a) shows a diagram of wavefront aberration viewed under the state of defocusing at the position where the best-fit wavefront aberration is obtained in the case of reproduction of a DVD, while, FIG. 42(b) shows a diagram of wavefront aberration viewed under the state of defocusing at the position where the best-fit wavefront aberration is obtained in the case of reproduction of a CD-R. Table 30 shows numerical apertures for NAL and NAH, quantities of spherical aberration caused, angles each being formed between a normal line and an optical axis, normal lines and each condition.

TABLE 30

| | In DVD reproduction | | In CD-R reproduction | |
|---|---|---|---|---|
| Height H | Numerical aperture | Spherical aberration (mm) | Numerical aperture | Spherical aberration (mm) |
| 1.279 | NAL(1) = 0.3806 | −0.35533 × 10$^{-3}$ | NAL(1) = 0.3775 | 0.18675 × 10$^{-1}$ |
|  | NAL(2) = 0.3821 | −0.13685 × 10$^{-1}$ | NAL(2) = 0.3790 | 0.53763 × 10$^{-2}$ |
| 1.532 | NAH(2) = 0.4584 | −0.19077 × 10$^{-1}$ | NAH(2) = 0.4547 | 0.94234 × 10$^{-2}$ |
|  | NAH(3) = 0.4558 | 0.59045 × 10$^{-3}$ | NAH(3) = 0.4521 | 0.28918 × 10$^{-1}$ |

0.60NA2 = 0.60 × 0.45 = 0.270
1.1NA2 = 1.1 × 0.45 = 0.495
NAH − NAL = 0.4547 − 0.3790 = 0.0757
−2($\lambda 2$)/(NA2)$^2$ = −2 × 780 nm/(0.45)$^2$ = −7.70 μm
5($\lambda 2$)/(NA2)$^2$ = 5 × 780 nm/(0.45)$^2$ = 19.26 μm
H2mid = (1.279 + 1.532)/2 = 1.406
θ1, 3, mid = 36.78417°
θ2, mid = 36.96074°
Δθmid = 36.96074 − 36.78417 = 0.17657°

FIG. 43 shows a diagram of relative intensity distribution of a light-converged spot in the case where the best spot shape is obtained in reproduction of a DVD, while, FIG. 44 shows a diagram of relative intensity distribution of a light-converged spot in the case where the best spot shape is obtained in reproduction of a CD.

Even when the objective lens in the present embodiment is mounted on optical pickup apparatus 10 employing a single light source (wavelength $\lambda 1$ of the light source=635 nm), reproduction was possible not only for DVD but also for CD. FIG. 45 shows a diagram of relative intensity distribution of a light-converged spot in the case where the best spot shape is obtained in reproduction of a CD. Numerical apertures for NAL and NAH, quantities of spherical aberration caused, angles each being formed between a normal line and an optical axis, normal lines and each condition in this case are shown in Table 31.

TABLE 31

| | In DVD reproduction | | In CD reproduction | |
|---|---|---|---|---|
| Height H | Numerical aperture | Spherical aberration (mm) | Numerical aperture | Spherical aberration (mm) |
| 1.279 | NAL(1) = 0.3806 | −0.35533 × 10$^{-3}$ | NAL(1) = 0.3806 | 0.17571 × 10$^{-1}$ |
|  | NAL(2) = 0.3821 | −0.13685 × 10$^{-1}$ | NAL(2) = 0.3820 | 0.43934 × 10$^{-2}$ |
| 1.532 | NAH(2) = 0.4584 | −0.19077 × 10$^{-1}$ | NAH(2) = 0.4584 | 0.80030 × 10$^{-2}$ |
|  | NAH(3) = 0.4558 | 0.59045 × 10$^{-3}$ | NAH(3) = 0.4558 | 0.27319 × 10$^{-1}$ |

0.60NA2 = 0.60 × 0.366 = 0.220
1.3NA2 = 1.3 × 0.366 = 0.476
NAH − NAL = 0.4584 − 0.3820 = 0.0764
−2($\lambda 2$)/(NA2)$^2$ = −2 × 635 nm/(0.366)$^2$ = −9.48 μm
5($\lambda 2$)/(NA2)$^2$ = 5 × 635 nm/(0.366)$^2$ = 23.7 μm
H2mid = (1.279 + 1.532)/2 = 1.406
θ1, 3, mid = 36.78417°
θ2, mid = 36.96074°
Δθmid = 36.96074 − 36.78417 = 0.17657°

EXAMPLE 9

Example 9 represents an example wherein the invention is applied to objective lens 116 which is to be mounted on optical pickup apparatus 100 (wavelength $\lambda 1$ of the first light source=635 nm, and wavelength $\lambda 2$ of the second light source=780 nm), and in which the steps are provided on boundaries of the first divided surface Sd1—the third divided surface Sd3.

Optical data of the objective lens are shown in Tables 32 and 33.

TABLE 32

| Wavelength λ | | | | 635 nm | 780 nm |
|---|---|---|---|---|---|
| Focal length | | | | 3.36 mm | 3.39 mm |
| Aperture-stop diameter | | | | φ4.04 mm | |
| Lateral magnification of objective lens | | | | 0 | |
| i | ri | di | di' | ni | ni' |
| 1 | ∞ | 0.0000 | | 1.0 | 1.0 |
| 2 | 2.117 | 2.2000 | | 1.5383 | 1.5337 |
| 3 | −7.903 | 1.7580 | 1.3890 | 1.0 | 1.0 |
| 4 | ∞ | 0.6000 | 1.2000 | 1.58 | 1.58 |
| 5 | ∞ | | | | |

TABLE 33

Aspheric surface data

| Second surface (refracting surface) | First aspheric surface | $0 \leq H < 1.270$ (First divided surface) $1.520 \leq H$ (Third divided surface) $\kappa = -0.97700$ | |
|---|---|---|---|
| | | $A1 = -0.36792 \times 10^{-2}$ | $P1 = 3.0$ |
| | | $A2 = 0.21127 \times 10^{-1}$ | $P2 = 4.0$ |
| | | $A3 = -0.24914 \times 10^{-1}$ | $P3 = 5.0$ |
| | | $A4 = 0.23908 \times 10^{-1}$ | $P4 = 6.0$ |
| | | $A5 = -0.12789 \times 10^{-1}$ | $P5 = 7.0$ |
| | | $A6 = 0.32635 \times 10^{-2}$ | $P6 = 8.0$ |
| | | $A7 = -0.11776 \times 10^{-3}$ | $P7 = 10.0$ |
| | Second aspheric surface | $1.270 \leq H < 1.520$ (Second divided surface) $d2 = 2.200$ $\kappa = -0.96758 \times 10^{+0}$ | |
| | | $A1 = -0.44081 \times 10^{-2}$ | $P1 = 3.0$ |
| | | $A2 = 0.21265 \times 10^{-1}$ | $P2 = 4.0$ |
| | | $A3 = -0.24757 \times 10^{-1}$ | $P3 = 5.0$ |
| | | $A4 = 0.24042 \times 10^{-1}$ | $P4 = 6.0$ |
| | | $A5 = -0.12826 \times 10^{-1}$ | $P5 = 7.0$ |
| | | $A6 = 0.32570 \times 10^{-2}$ | $P6 = 8.0$ |
| | | $A7 = -0.11713 \times 10^{-3}$ | $P7 = 10.0$ |
| Third surface (refracting surface) | | $\kappa = -0.19532 \times 10^{+2}$ | |
| | | $A1 = 0.25586 \times 10^{-4}$ | $P1 = 3.0$ |
| | | $A2 = 0.22177 \times 10^{-1}$ | $P2 = 4.0$ |
| | | $A3 = -0.32988 \times 10^{-1}$ | $P3 = 5.0$ |
| | | $A4 = 0.32771 \times 10^{-1}$ | $P4 = 6.0$ |
| | | $A5 = -0.17803 \times 10^{-1}$ | $P5 = 7.0$ |
| | | $A6 = 0.40149 \times 10^{-2}$ | $P6 = 8.0$ |
| | | $A7 = -0.92804 \times 10^{-4}$ | $P7 = 10.0$ |

Descriptions of "d2=2.200" in the column of "Second aspheric surface" in Table 33 represents a distance on the optical axis between the third surface and a point where the optical axis intersects with the second divided surface (on the second aspheric surface) extended to the optical axis according to the expression of an aspheric surface shape.

In the objective lens of the present example, a position where the first aspheric surface intersects with an optical axis is the same as that where the second aspheric surface intersects with an optical axis. The symbol ni' in Table 32 represents a refractive index in the second light source ($\lambda 2=780$ nm).

Figure 47:
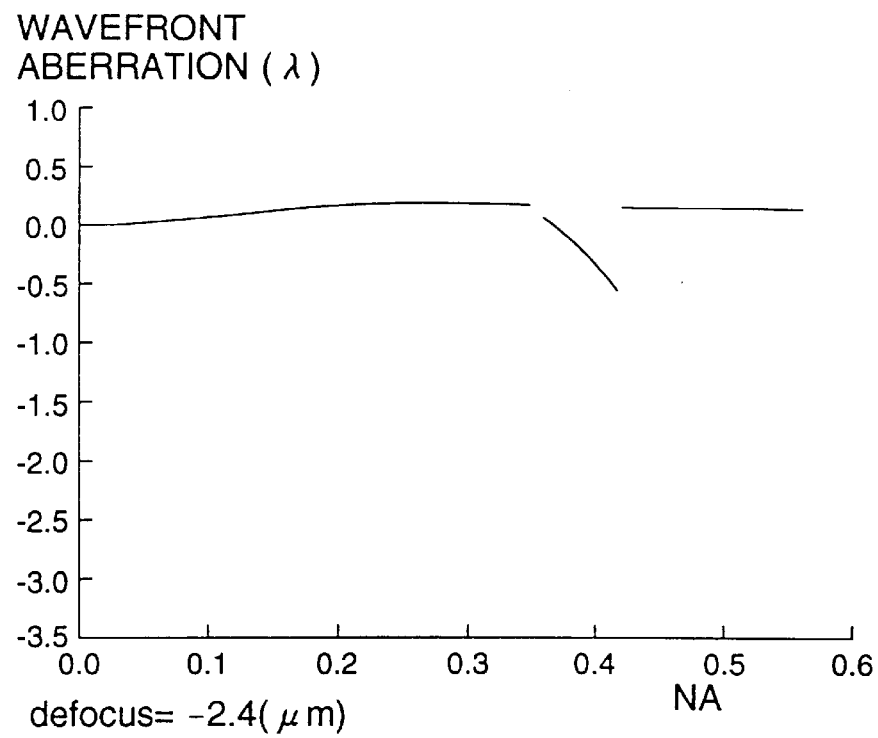
Figure 47:
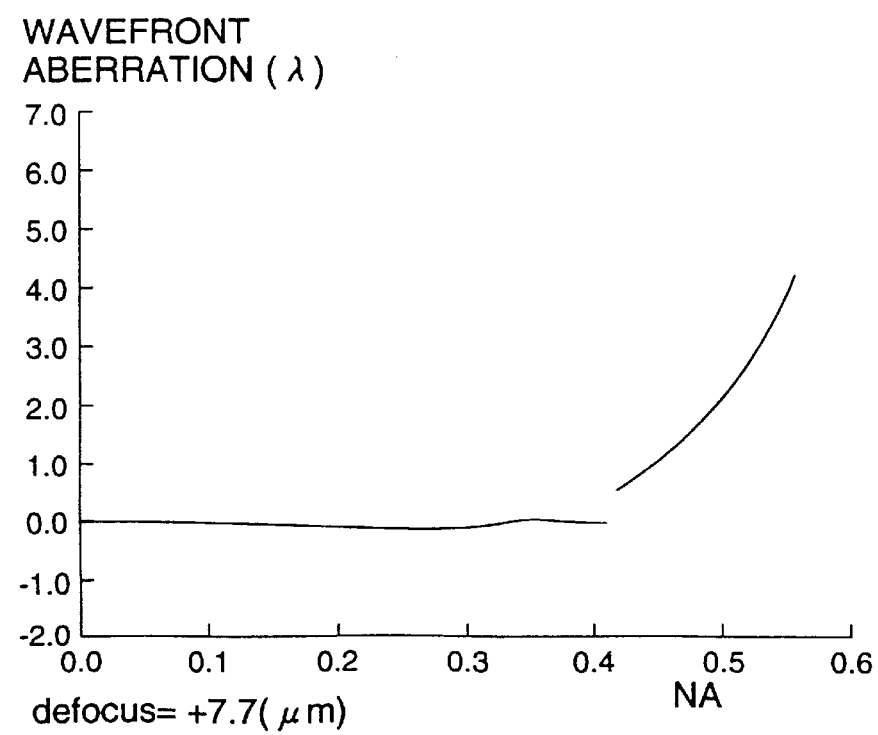

FIG. 46(*a*) shows a diagram of spherical aberration in the case of reproduction of a DVD, while, FIG. 46(*b*) shows a diagram of spherical aberration in the case of reproduction of a CD. FIG. 47(*a*) shows a diagram of wavefront aberration viewed under the state of defocusing at the position where the best-fit wavefront aberration is obtained in the case of reproduction of a DVD, while, FIG. 47(*b*) shows a diagram of wavefront aberration viewed under the state of defocusing at the position where the best-fit wavefront aberration is obtained in the case of reproduction of a CD-R. Table 34 shows numerical apertures for NAL and NAH, quantities of spherical aberration caused, angles each being formed between a normal line and an optical axis, normal lines and each condition.

TABLE 34

| | In DVD reproduction | | In CD-R reproduction | |
|---|---|---|---|---|
| Height H | Numerical aperture | Spherical aberration (mm) | Numerical aperture | Spherical aberration (mm) |
| 1.270 | NAL(1) = 0.3780 | $-0.29200 \times 10^{-3}$ | NAL(1) = 0.3748 | $0.15633 \times 10^{-1}$ |
| | NAL(2) = 0.3789 | $-0.11676 \times 10^{-1}$ | NAL(2) = 0.3758 | $0.68900 \times 10^{-2}$ |
| 1.520 | NAH(2) = 0.4546 | $-0.20034 \times 10^{-1}$ | NAH(2) = 0.4508 | $0.77675 \times 10^{-2}$ |
| | NAH(3) = 0.4523 | $-0.24165 \times 10^{-2}$ | NAH(3) = 0.4485 | $0.25251 \times 10^{-1}$ |

| 0.60NA2 = 0.60 × 0.45 = 0.270 |
| 1.1NA2 = 1.1 × 0.45 = 0.495 |
| NAH − NAL = 0.4508 − 0.3758 = 0.0750 |
| $-2(\lambda 2)/(NA2)^2 = -2 \times 780$ nm$/(0.45)^2 = -7.70$ μm |
| $5(\lambda 2)/(NA2)^2 = 5 \times 780$ nm$/(0.45)^2 = 19.26$ μm |
| H2mid = (1.270 + 1.520)/2 = 1.395 |
| θ1, 3, mid = 36.54832° |
| θ2, mid = 36.68357° |
| Δθmid = 36.68357 − 36.54832 = 0.13525° |

FIG. 48 shows a diagram of relative intensity distribution of a light-converged spot in the case where the best spot shape is obtained in reproduction of a DVD, while, FIG. 49 shows a diagram of relative intensity distribution of a light-converged spot in the case where the best spot shape is obtained in reproduction of a CD.

Even when the objective lens in the present embodiment is mounted on optical pickup apparatus 10 employing a single light source (wavelength λ1 of the light source=635 nm), reproduction was possible not only for DVD but also for CD. FIG. 50 shows a diagram of relative intensity distribution of a light-converged spot in the case where the best spot shape is obtained in reproduction of a CD. Numerical apertures for NAL and NAH, quantities of spherical aberration caused, angles each being formed between a normal line and an optical axis, normal lines and each condition in this case are shown in Table 35.

TABLE 35

| | In DVD reproduction | | In CD (λ635 nm) reproduction | |
|---|---|---|---|---|
| Height H | Numerical aperture | Spherical aberration (mm) | Numerical aperture | Spherical aberration (mm) |
| 1.270 | NAL(1) = 0.3780 | $-0.29200 \times 10^{-3}$ | NAL(1) = 0.3780 | $0.14740 \times 10^{-1}$ |
| | NAL(2) = 0.3789 | $-0.11676 \times 10^{-1}$ | NAL(2) = 0.3789 | $0.60778 \times 10^{-2}$ |
| 1.520 | NAH(2) = 0.4546 | $-0.20034 \times 10^{-1}$ | NAH(2) = 0.4546 | $0.65378 \times 10^{-2}$ |
| | NAH(3) = 0.4523 | $-0.24165 \times 10^{-2}$ | NAH(3) = 0.4523 | $0.23856 \times 10^{-1}$ |

| 0.60NA2 = 0.60 × 0.366 = 0.220 |
| 1.3NA2 = 1.3 × 0.366 = 0.476 |
| NAH-NAL = 0.4546 − 0.3789 = 0.0757 |
| $-2 (\lambda 2)/(NA2)^2 = -2 \times 635$ nm$/(0.366)^2 = -9.48$ μm |
| $5 (\lambda 2)/(NA2)^2 = 5 \times 635$ nm$/(0.366)^2 = 23.7$ μm |
| H2mid = (1.270 + 1.520)/2 = 1.395 |
| θ1,3,mid = 36.54832° |
| θ2,mid = 36.6835° |
| Δθmid = 36.68357 − 36.54832 = 0.1352° |

EXAMPLE 10

Example 10 represents an example wherein the invention is applied to objective lens 116 which is to be mounted on the optical pickup apparatus 100 (wavelength λ1 of the first light source=635 nm, and wavelength λ2 of the second light source=780 nm), and in which the steps are provided on boundaries of the first divided surface Sd1—the third divided surface Sd3.

Optical data of the objective lens are shown in Tables 36 and 37.

TABLE 36

| Wavelength λ | 635 mm | 780 nm |
|---|---|---|
| Focal length | 3.36 mm | 3.39 mm |
| Aperture-stop diameter | | 4.04 mm |
| Lateral magnification of objective lens | | 0 |

| i | ri | di | di' | ni | ni' |
|---|---|---|---|---|---|
| 1 | ∞ | 0.0000 | | 1.0 | 1.0 |
| 2 | 2.114 | 2.2000 | | 1.5383 | 1.5337 |
| 3 | −7.963 | 1.757 | 1.401 | 1.0 | 1.0 |
| 4 | ∞ | 0.6000 | 1.2000 | 1.58 | 1.58 |
| 5 | ∞ | | | | |

TABLE 37

Aspheric surface data

| Second surface (refracting surface) | First aspheric surface | $0 \leq H < 1.111$ (First divided surface) $1.481 \leq H$ (Third divided surface) $\kappa = -0.97700$ | |
|---|---|---|---|
| | | $A1 = 0.63761 \times 10^{-3}$ | $P1 = 3.0$ |
| | | $A2 = 0.36688 \times 10^{-3}$ | $P1 = 4.0$ |
| | | $A3 = 0.83511 \times 10^{-2}$ | $P1 = 5.0$ |
| | | $A4 = -0.37296 \times 10^{-2}$ | $P1 = 6.0$ |
| | | $A5 = 0.46548 \times 10^{-3}$ | $P1 = 8.0$ |
| | | $A6 = -0.43124 \times 10^{-4}$ | $P1 = 10.0$ |
| | Second aspheric surface | $1.111 \leq H > 1.481$ (Second divided surface) $d2 = 2.1995$ $\kappa = -0.11481 \times 10^{+1}$ | |
| | | $A1 = 0.70764 \times 10^{-2}$ | $P1 = 3.0$ |
| | | $A2 = -0.13388 \times 10^{-1}$ | $P1 = 4.0$ |
| | | $A3 = 0.24084 \times 10^{-1}$ | $P1 = 5.0$ |
| | | $A4 = -0.97636 \times 10^{-2}$ | $P1 = 6.0$ |
| | | $A5 = 0.93136 \times 10^{-3}$ | $P1 = 8.0$ |
| | | $A6 = -0.68008 \times 10^{-4}$ | $p1 = 10.0$ |
| Third surface (refracting surface) | | $\kappa = -0.24914 \times 10^{+2}$ | |
| | | $A1 = 0.13775 \times 0\, 10^{-2}$ | $P1 = 3.0$ |
| | | $A2 = -0.41269 \times 10^{-2}$ | $P1 = 4.0$ |
| | | $A3 = 0.21236 \times 10^{-1}$ | $P1 = 5.0$ |
| | | $A4 = -0.13895 \times 10^{-1}$ | $P1 = 6.0$ |
| | | $A5 = 0.16631 \times 10^{-2}$ | $P1 = 8.0$ |
| | | $A6 = -0.12138 \times 10^{-3}$ | $P1 = 10.0$ |

The value of "d2=2.1995" of the second aspheric surface in Table 37 represents a distance from an intersecting point between the second aspheric surface (the second divided surface) extended to an optical axis in accordance with the expression for an aspheric surface shape and the optical axis to the third surface. The symbol ni' in Table 32 represents a refractive index in the second light source (λ2=780 nm).

FIG. 51(a) shows a diagram of spherical aberration in the case of reproduction of a DVD, while, FIG. 51(b) shows a diagram of spherical aberration in the case of reproduction of a CD. FIG. 52(a) shows a diagram of wavefront aberration viewed under the state of defocusing at the position where the best-fit wavefront aberration is obtained in the case of reproduction of a DVD, while, FIG. 52(b) shows a diagram of wavefront aberration viewed under the state of defocusing at the position where the best-fit wavefront aberration is obtained in the case of reproduction of a CD. Table 38 shows numerical apertures for NAL and NAH, quantities of spherical aberration caused, angles each being formed between a normal line and an optical axis, normal lines and each condition.

TABLE 38

| | In DVD reproduction | | In CD (λ = 780 nm) reproduction | |
|---|---|---|---|---|
| Height H | Numerical aperture | Spherical aberration (mm) | Numerical aperture | Spherical aberration (mm) |
| 1.111 | NAL(1) = 0.3307 | $-0.65069 \times 10^{-3}$ | NAL(1) = 0.3280 | $0.13417 \times 10^{-1}$ |
| | NAL(2) = 0.3317 | $-0.10281 \times 10^{-1}$ | NAL(2) = 0.3289 | $0.37802 \times 10^{-2}$ |
| 1.481 | NAH(2) = 0.4430 | $-0.17788 \times 10^{-1}$ | NAH(2) = 0.4393 | $0.86005 \times 10^{-2}$ |
| | NAH(3) = 0.4406 | $0.48121 \times 10^{-3}$ | NAH(3) = 0.4370 | $0.26737 \times 10^{-1}$ |
| | 0.60NA2 = 0.60 × 0.45 = 0.270 | | | |
| | 1.1NA2 = 1.1 × 0.45 = 0.495 | | | |
| | NAH-NAL = 0.4393 − 0.3289 = 0.1104 | | | |
| | $-2\,(\lambda)/(NA2)^2 = -2 \times 780\,nm/(0.45)^2 = -7.70\,\mu m$ | | | |
| | $5\,(\lambda)/(NA2)^2 = 5 \times 780\,nm/(0.45)^2 = 19.26\,\mu m$ | | | |
| | H2mid = (1.111 + 1.481)/2 = 1.296 | | | |
| | θ1,3,mid = 34.07635° | | | |
| | θ2,mid = 34.21711° | | | |
| | Δθmid = 34.21711 − 34.07635 = 0.14076° | | | |

FIG. 53 shows a diagram of relative intensity distribution of a light-converged spot in the case where the best spot shape is obtained in reproduction of a DVD, while, FIG. 54 shows a diagram of relative intensity distribution of a light-converged spot in the case where the best spot shape is obtained in reproduction of a CD.

Even when the objective lens in the present embodiment is mounted on optical pickup apparatus 10 employing a single light source (wavelength λ1 of the light source=635 nm), reproduction was possible not only for DVD but also for CD. FIG. 55 shows a diagram of relative intensity distribution of a light-converged spot in the case where the best spot shape is obtained in reproduction of a CD. Numerical apertures for NAL and NAH, quantities of spherical aberration caused, angles each being formed between a normal line and an optical axis, normal lines and each condition in this case are shown in Table 39.

TABLE 39

| | In DVD reproduction | | In CD (λ = 635 nm) reproduction | |
|---|---|---|---|---|
| Height H | Numerical aperture | Spherical aberration (mm) | Numerical aperture | Spherical aberration (mm) |
| 1.111 | NAL(1) = 0.3307 | $-0.65069 \times 10^{-3}$ | NAL(1) = 0.3307 | $0.12601 \times 10^{-1}$ |
| | NAL(2) = 0.3317 | $-0.10281 \times 10^{-1}$ | NAL(2) = 0.3317 | $0.30498 \times 10^{-2}$ |
| 1.481 | NAH(2) = 0.4430 | $-0.17788 \times 10^{-1}$ | NAH(2) = 0.4430 | $0.72752 \times 10^{-2}$ |
| | NAH(3) = 0.4406 | $0.48121 \times 10^{-3}$ | NAH(3) = 0.4406 | $0.25244 \times 10^{-1}$ |
| | 0.60NA2 = 0.60 × 0.366 = 0.220 | | | |
| | 1.1NA2 = 1.1 × 0.366 = 0.476 | | | |
| | NAH-NAL = 0.4430 − 0.3317 = 0.1113 | | | |
| | $-2\,(\lambda)/(NA2)^2 = -2 \times 635\,nm/(0.366)^2 = -9.48\,\mu m$ | | | |
| | $5\,(\lambda)/(NA2)^2 = 5 \times 635\,nm/(0.366)^2 = 23.7\,\mu m$ | | | |
| | H2mid = (1.111 + 1.481)/2 = 1.296 | | | |
| | θ1,3,mid = 34.07635° | | | |
| | θ2,mid = 34.21711° | | | |
| | Δθmid = 34.21711 − 34.07635 = 0.14076° | | | |

Examples 1–10 stated above show that two optical disks each being different in terms of a thickness of a transparent substrate were reproduced satisfactorily by a single light-converging optical system (a single objective lens in the system). There was not problem even in the case of recording. In Examples 2 and 4 through 10, in particular, it was possible to reproduce a DVD representing the first optical disk and a CD-R representing the second optical disk (requiring the wavelength of a light source of 780 nm), by using two light sources. Further, in these Examples 2 and 4 through 10, it was possible to reproduce a DVD and a CD satisfactorily by the use of a single light source. In addition, Examples 5–7 were capable of handling the second optical disk with necessary numerical aperture NA that is as high as 0.5, and of being used for recording a CD-R.

In Examples 1, 3, and 8–10 among Examples 1–10, the reproduction signals of the second optical disk having a 1.2 mm-thick transparent substrate were excellent. The reason for the foregoing is that the best-fit wavefront aberration of the light flux passing through the first divided surface (that is called an amount of wavefront aberration in the first divided surface) satisfies $0.07\lambda$ which is the diffraction limited performance as shown in Table 40.

TABLE 40

Thickness of a transparent substrate of an optical information recording medium 1.2 (mm)

| Example No. | Amount of wavefront aberration in the first divided surface |
|---|---|
| Light source wavelength λ = 635 (nm) | |
| 1. | 0.063 (λrms) |
| 2. | 0.097 (λrms) |
| 3. | 0.063 (λrms) |
| 4. | 0.090 (λrms) |
| 5. | 0.143 (λrms) |
| 6. | 0.126 (λrms) |
| 7. | 0.126 (λrms) |
| 8. | 0.054 (λrms) |
| 9. | 0.047 (λrms) |
| 10. | 0.025 (λrms) |
| Light source wavelength λ = 780 (nm) | |
| 2. | 0.083 (λrms) |
| 4. | 0.078 (λrms) |
| 5. | 0.123 (λrms) |
| 6. | 0.108 (λrms) |
| 7. | 0.108 (λrms) |
| 8. | 0.047 (λrms) |
| 9. | 0.040 (λrms) |
| 10. | 0.022 (λrms) |

In Table 36, an amount of wavefront aberration in the first divided surface in the case of reproducing the second optical disk having a 1.2 mm-thick transparent substrate under the light source wavelength λ of 635 nm is shown on the upper portion of the table, while in Examples 2 and 4 through 9, an amount of wavefront aberration in the first divided surface in the case of reproducing the second optical disk having a 1.2 mm-thick transparent substrate under the light source wavelength λ of 780 nm is shown on the lower portion of the table, because two light sources are used.

When assuming that "n" represents a natural number in Example 1–10 stated above, Table 41 shows a value of (ΔnL) π (e.g., (Δ1L) π or (Δ2L) π) (rad) which is a phase difference between light passing through the (2n−1)th divided surface (e.g., the first divided surface Sd1 or the third divided surface Sd3) and (emitted from the transparent substrate) and light passing through the almost center and the portion closer to the optical axis than the center on the (2n)th divided surface (e.g., th e second divided surface Sd2 or the fourth divided surface Sd4) and that of (ΔnH) π (e.g., (Δ1H) π or (Δ2H) π) (rad) which is a phase difference between light passing through the (2n+1)th divided surface (e.g., the third divided surface Sd3 or the fifth divided surface Sd5) and (emitted from the transparent substrate) and light passing through the portion farther from the optical axis than the center on the (2n)th divided surface (e.g., the second divided surface Sd2 or the fourth divided surface Sd4) and (emitted from the transparent substrate). In this case, with regard to the sign of the phase difference, the direction of light advancement (the direction toward the optical disk) is positive, and a phase difference between light passing through the (2n−1)th divided surface or the (2n+1)th divided surface and (emitted from the transparent substrate) and light passing through the (2n)th divided surface and (emitted from the transparent substrate) is compared.

TABLE 37

Thickness of a transparent substrate of an optical information recording medium 0.6 (mm)
Light source wavelength λ = 635 (nm)

| Example No. | (Δ1H) π (rad) | (Δ1L) π (rad) | (Δ2H) π (rad) | (Δ2L) π (rad) |
|---|---|---|---|---|
| 1. | 1.64π | 1.19π | — | — |
| 2. | 4.67π | 3.36π | — | — |
| 3. | 0.53π | 0.00π | — | — |
| 4. | 4.24π | 3.46π | — | — |
| 5. | 6.27π | 3.93π | — | — |
| 6. | 3.93π | 3.35π | 6.76π | 5.80π |
| 7. | 4.23π | 3.65π | 6.33π | 5.36π |
| 8. | 4.39π | 2.83π | — | — |
| 9. | 1.50π | 0.33π | — | — |
| 10. | 3.86π | 2.17π | — | — |

As is apparent from the table above, the condition of (ΔnH)>(ΔnL) is satisfied in all of the Examples 1–10. Each value in Table 41 shows a phase difference of a light flux entering each divided surface on each of boundaries of divided surfaces Sd1–Sd3 (or Sd5)

As stated above, recording and reproduction of plural optical information recording media can be conducted by a single light-converging optical system in the invention, which therefore realizes low cost without complicating a matter, and makes it possible to handle optical information recording media each having a high NA. In addition, in the invention, generation of spherical aberration is utilized positively, and recording and reproduction of plural optical information recording media can therefore be conducted by a single light-converging optical system.

What is claimed is:

1. An optical pickup apparatus comprising:
   a light source for emitting light flux;
   a converging optical system having an optical axis, a first portion, a second portion, and a third portion, the third portion being farther from the optical axis than the first portion, and the second portion being provided between the first portion and the third portion, and
   an image sensor,
   wherein the first portion and the third portion are capable of converging the light flux on a first information recording plane of a first optical information recording medium having a first transparent substrate of thickness t1, to reproduce information recorded in the first optical information recording medium,
   wherein the first portion and the second portion are capable of converging the light flux on a second information recording plane of a second optical information recording medium having a second transparent substrate of thickness t2, to reproduce information recorded in the second optical information recording medium wherein t2 is greater than t1, and wherein the image sensor is capable of receiving light flux reflected from the first information recording plane or the second information recording plane.

2. The optical pickup apparatus of claim 1, wherein the first optical information recording medium and the second optical information recording medium are optical disks.

3. The optical pickup apparatus of claim 1, wherein t1 is 0.6 mm and t2 is 1.2 mm.

4. The optical pickup apparatus of claim 3, wherein when a refractive index of the first transparent substrate is 1.58, the first portion and the third portion are capable of converging the light flux on the first information recording plane of the first optical information recording medium having the first transparent substrate of thickness t1, to reproduce information recorded in the first optical information recording medium, wherein when the refractive index of the second transparent substrate is 1.58, the first portion and the second portion are capable of converging the light flux on the second information recording plane of the second optical information recording medium having the second transparent substrate of thickness t2, to reproduce information recorded in the second optical information recording medium, and wherein t2 is greater than t1.

5. The optical pickup apparatus of claim 1, wherein when the first portion and the third portion converge the light flux on a first image forming position on the first information recording plane, the second portion converges the light flux on a second image forming position different from the first image forming position and closer to the converging optical system than the first image forming position.

6. The optical pickup apparatus of claim 1, wherein the first portion and the third portion are capable of converging the light flux on the first information recording plane of the first optical information recording medium so that wave front aberrations on the first information recording plane are not more than 0.05 $\lambda$rms.

7. The optical pickup apparatus of claim 1, wherein the first portion is capable of converging the light flux on the second information recording plane of the second optical information recording medium, so that the best-fit wave front aberration on the second information recording plane is not more than 0.07 $\lambda$rms.

8. The optical pickup apparatus of claim 1, wherein the second portion has a ring shape having a width representing a circle concentric with the optical axis.

9. The optical pickup apparatus of claim 1, wherein the converging optical system comprises an objective lens comprising the optical axis, the first portion, the second portion, and the third portion.

10. The optical pickup apparatus of claim 9, wherein the optical pickup apparatus further comprises a moving member for moving the objective lens in the direction of the optical axis, so that the first portion and the third portion converge the light flux on the first information recording plane of the first optical information recording medium, and the first portion and the second portion converge the light flux on the second information recording plane of the second optical information recording medium.

11. The optical pickup apparatus of claim 9, wherein the objective lens comprises a step provided on a boundary between the first portion and the second portion or between the second portion and the third portion.

12. The optical pickup apparatus of claim 11, wherein the step is provided on a refracting surface closer to the light source of the objective lens.

13. The optical pickup apparatus of claim 11, wherein the second portion of the objective lens is indented relative to the first portion of the objective lens.

14. The optical pickup apparatus of claim 11, wherein the objective lens comprises a step provided on a boundary between the first portion and the second portion, and a step provided on a boundary between the second portion and the third portion, and at least one of the first portion, the second portion and the third portion comprises a concave surface formed by connecting bottoms of two steps.

15. The optical pickup apparatus of claim 9, wherein the objective lens comprises a protrusion portion at the circumference of the objective lens in the direction perpendicular to the optical axis.

16. The optical pickup apparatus of claim 9, wherein the objective lens comprises a first step provided on a boundary between the first portion and the second portion and a second step provided on a boundary between the second portion and the third portion, a depth of the second step being greater than a depth of the first step.

17. The optical pickup apparatus of claim 9, wherein the objective lens further comprises a fourth portion and a fifth portion, the fifth portion is farther from the optical axis than the third portion, the fourth portion is provided between the third portion and the fifth portion.

18. The optical pickup apparatus of claim 9, wherein the second portion of the objective lens comprises a hologram or a Fresnel lens.

19. The optical pickup apparatus of claim 9, wherein the objective lens is made of plastic.

20. The optical pickup apparatus of claim 9, wherein the second portion has a ring shape having a width representing a circle concentric with the optical axis, and a ratio of the width of the second portion to an aperture-stop radius of the objective lens is about 29%.

21. The optical pickup apparatus of claim 9, wherein the second portion has a ring shape having a width representing a circle concentric with the optical axis, and a ratio of the width of the second portion to an aperture-stop radius of the objective lens is about 6.7%.

22. The optical pickup apparatus of claim 9, wherein the second portion has a ring shape having a width representing a circle concentric with the optical axis, and a ratio of the width of the second portion to an aperture-stop radius of the objective lens is about 11.7%.

23. The optical pickup apparatus of claim 9, wherein the second portion has a ring shape having a width representing a circle concentric with the optical axis, and a ratio of the width of the second portion to an aperture-stop radius of the objective lens is about 6.7% to about 18.3%.

24. The optical pickup apparatus of claim 9, wherein the second portion has a ring shape having a width representing a circle concentric with the optical axis, and a width of the second portion of the objective lens is about 135 $\mu$m.

25. The optical pickup apparatus of claim 9, wherein the second portion has a ring shape having a width representing a circle concentric with the optical axis, and a ratio of an area of the second portion to an aperture-stop area of the objective lens is about 8.6%.

26. The optical pickup apparatus of claim 9, wherein the second portion has a ring shape having a width representing a circle concentric with the optical axis, and a ratio of an area of the second portion to an aperture-stop area of the objective lens is about 18.9%.

27. The optical pickup apparatus of claim 9, wherein a collimated light flux enters the objective lens.

28. The optical pickup apparatus of claim 9, wherein a divergent light flux enters the objective lens.

29. The optical pickup apparatus of claim 1, wherein an angle between a normal line at a central position of a surface of the second portion and the optical axis is larger than an angle between a normal line at a central position of a surface interpolated from the first and third portion and the optical axis.

30. The optical pickup apparatus of claim 1, wherein the first portion and the third portion converge the light flux on the first information recording plane of the first optical information recording medium, and wherein a spherical aberration curve according to the second portion is positioned under a spherical aberration curve according to the first portion.

31. The optical pickup apparatus of claim 1, wherein the following condition is satisfied:

$$0.60 \cdot NA2 < NAL < 1.30 \cdot NA2$$

where NA2 represents a numerical aperture on a side of the second optical information recording medium of the converging optical system required for reproducing information recorded in the second optical information recording medium, and NAL represents a numerical aperture in a border portion between the first portion and the second portion.

32. The optical pickup apparatus of claim 1, wherein the following condition is satisfied:

$$0.60 \cdot NA2 < NAL < 1.30 \cdot NA2$$

$$0.01 < NAH - NAL < 0.12$$

where NA2 represents a numerical aperture on a side of the second optical information recording medium of the converging optical system required for reproducing information recorded in the second optical information recording medium, NAL represents a numerical aperture in a border portion between the first portion and the second portion, and NAH represents a numerical aperture in a border portion between the second portion and the third portion.

33. The optical pickup apparatus of claim 1, wherein the first portion, the second portion, and the third portion define concentric circles.

34. An objective lens having an aspherical face for use in an optical pickup apparatus comprising:

an optical surface having a first divided surface, a second divided surface, and a third divided surface, the third divided surface being farther from the optical axis than the first divided surface, the second divided surface being provided between the first divided surface and the third divided surface, wherein the objective lens is capable of converging a first light flux which passes through the first divided surface and a third light flux which passes through the third divided surface on a first information recording plane of a first optical information recording medium through a first transparent substrate of the first optical information recording medium, to reproduce information recorded in the first optical information recording medium, and the thickness of the first transparent substrate is t1, and wherein the objective lens is capable of converging the first light flux and a second light flux which passes through the second divided surface on a second information recording plane of a second optical information recording medium through a second transparent substrate of the second optical information recording medium, to reproduce information recorded in the second optical information recording medium, the thickness of the first transparent substrate is t2, and t2 is greater than t1.

35. The objective lens of claim 34, wherein the first optical information recording medium and the second optical information recording medium are optical disks.

36. The objective lens of claim 34, wherein t1 is 0.6 mm and t2 is 1.2 mm.

37. The objective lens of claim 36, wherein when a refractive index of the first transparent substrate is 1.58, the first portion and the third portion are capable of converging the light flux on the first information recording plane of the first optical information recording medium having the first transparent substrate of thickness t1, to reproduce information recorded in the first optical information recording medium, wherein when the refractive index of the second transparent substrate is 1.58, the first portion and the second portion are capable of converging the light flux on the second information recording plane of the second optical information recording medium having the second transparent substrate of thickness t2, to reproduce information recorded in the second optical information recording medium, and wherein t2 is greater than t1.

38. The objective lens of claim 34, wherein the objective lens is capable of converging the first light flux and the third light flux on the first information recording plane of the first optical information recording medium, so that wave front aberrations of the first light flux and the third light flux on the first information recording plane are not more than 0.05 λrms.

39. The objective lens of claim 34, wherein the objective lens is capable of converging the first light flux on the second information recording plane of the second optical information recording medium, so that the best-fit wave front aberration of the first light flux on the second information recording plane is not more than 0.07 λrms.

40. The objective lens of claim 34, wherein the second divided surface has a ring shape having a width representing a circle concentric with the optical axis.

41. The objective lens of claim 34, wherein the objective lens further comprises a step provided on a boundary between the first divided surface and the second divided surface or between the second divided surface and the third divided surface.

42. The objective lens of claim 41, wherein the second divided surface of the objective lens is indented relative to the first divided surface of the objective lens.

43. The objective lens of claim 41, wherein the objective lens comprises a step provided on a boundary between the first divided surface and the second divided surface, and a step provided on a boundary between the second divided surface and the third divided surface, and at least one of the first divided surface, the second divided surface and the third divided surface comprises a concave surface formed by connecting bottoms of two steps.

44. The objective lens of claim 34, wherein the objective lens comprises a protrusion portion at the circumference of the objective lens in the direction perpendicular to the optical axis.

45. The objective lens of claim 34, wherein the objective lens comprises a first step provided on a boundary between the first divided surface and the second divided surface and a second step provided on a boundary between the second divided surface and the third divided surface, a depth of the second step being greater than a depth of the first step.

46. The objective lens of claim 34, wherein the objective lens further comprises a fourth portion and a fifth portion, the fifth portion being farther from the optical axis than the third portion, the fourth portion being provided between the third portion and the fifth portion.

47. The objective lens of claim 34, wherein the second divided surface comprises a hologram or a Fresnel lens.

48. The objective lens of claim 34, wherein the objective lens is made of plastic.

49. The objective lens of claim 34, wherein the second divided surface has a ring shape having a width representing a circle concentric with the optical axis, and a ratio of the width of the second divided surface to an aperture-stop radius of the objective lens is about 29%.

50. The objective lens of claim 34, wherein the second divided surface has a ring shape having a width representing a circle concentric with the optical axis, and a ratio of the width of the second divided surface to an aperture-stop radius of the objective lens is about 6.7%.

51. The objective lens of claim 34, wherein the second divided surface has a ring shape having a width representing a circle concentric with the optical axis, and a ratio of the width of the second divided surface to an aperture-stop radius of the objective lens is about 11.7%.

52. The objective lens of claim 34, wherein the second divided surface has a ring shape having a width representing a circle concentric with the optical axis, and a ratio of the width of the second divided surface to an aperture-stop radius of the objective lens is about 6.7% to about 18.3%.

53. The objective lens of claim 34, wherein the second divided surface has a ring shape having a width representing a circle concentric with the optical axis, and a width of the second divided surface of the objective lens is about 135 µm.

54. The objective lens of claim 34, wherein the second divided surface has a ring shape having a width representing a circle concentric with the optical axis, and a ratio of an area of the second divided surface to an aperture-stop area of the objective lens is about 8.6%.

55. The objective lens of claim 34, wherein the second divided surface has a ring shape having a width representing a circle concentric with the optical axis, and a ratio of an area of the second divided surface to an aperture-stop area of the objective lens is about 18.9%.

56. The objective lens of claim 34, wherein an angle between a normal line at a central position of the second divided surface and the optical axis is larger than an angle between a normal line at a central position of a surface interpolated from the first and third divided surfaces and the optical axis.

57. The objective lens of claim 34, wherein the objective lens converges the first light flux and third light flux on the first information recording plane of the first optical information recording medium, and
wherein a spherical aberration curve according to the second divided surface is positioned under a spherical aberration curve according to the first divided surface.

58. The objective lens of claim 34, wherein the following condition is satisfied:

$$0.60 \cdot NA2 < NAL < 1.30 \cdot NA2$$

where NA2 represents a numerical aperture on a side of the second optical information recording medium of the objective lens required for reproducing information recorded in the second optical information recording medium, and NAL represents a numerical aperture in a border portion between the first and second divided surfaces.

59. The objective lens of claim 34, wherein the following condition is satisfied:

$$0.60 \cdot NA2 < NAL < 1.30 \cdot NA2$$

$$0.01 < NAH - NAL < 0.12$$

where NA2 represents a numerical aperture on a side of the second optical information recording medium of the objective lens required for reproducing information recorded in the second optical information recording medium, NAL represents a numerical aperture in a border portion between the first and second divided surfaces, and NAH represents a numerical aperture in a border portion between the second and third divided surfaces.

60. The objective lens of claim 34, wherein the first divided surface, the second divided surface and the third divided surface define concentric circles.

61. A method of reproducing information recorded in an optical information recording media having a plurality of substrate thicknesses, by an optical pickup apparatus comprising a converging optical system having an optical axis, a first portion, a second portion and a third portion, the third portion being farther from the optical axis than the first portion, and the second portion being provided between the first portion and the third portion, the method comprising the steps of:

omitting light flux from a light source;

converging the light flux by the converging optical system on an optical information recording medium; and receiving light flux reflected from the optical information recording medium by an image sensor, wherein, when reproducing information recorded in a first optical information recording medium having a first transparent substrate of thickness t1, a first light flux which passes through the first portion and a third light flux which passes through the third portion converge on a first information recording plane of the first optical information recording medium through the first transparent substrate, to reproduce information recorded in the first optical information recording medium, and wherein, when reproducing information recorded in a second optical information recording medium having a second transparent substrate of thickness t2, greater than t1, the first light flux and a second light flux which passes through the second portion converge on a second information recording plane of the second optical information recording medium through the second transparent substrate, to reproduce the information recorded in the second optical information recording medium.

62. The method of claim 61, wherein the first optical information recording medium and the second optical information recording medium are optical disks.

63. The method of claim 61, wherein t1 is 0.6 mm and t2 is 1.2 mm.

64. The method of claim 61, wherein a refractive index of the first transparent substrate is 1.58 and a refractive index of the second transparent substrate is 1.58.

65. The method of claim 61, wherein when the first light flux and the third light flux converge on a first image forming position on the first information recording plane, the second light flux converges on a second image forming position different from the first image forming position and closer to the converging optical system than the first image forming position.

66. The method of claim 61, wherein the first light flux and the third light flux converge on the first information recording plane of the first optical information recording medium, so that wave front aberrations of the first light flux and the third light flux on the first information recording plane are not more than 0.05 λrms.

67. The method of claim 61, wherein the first light flux converges on the second information recording plane of the second optical information recording medium wherein the best-fit wave front aberration of the first light flux on the second information recording plane is not more than 0.07 λrms.

68. The method of claim 61, wherein the second portion has a ring shape having a width representing a circle concentric with the optical axis.

69. The method of claim 61, wherein the converging optical system comprises an objective lens comprising the optical axis, the first portion, the second portion, and the third portion.

70. The method of claim 69, wherein the optical pickup apparatus further comprises a moving member for moving the objective lens in the direction of the optical axis, so that the first light flux and the third light flux converge on the first information recording plane of the first optical information recording medium, and the first light flux and the second light flux converge on the second information recording plane of the second optical information recording medium.

71. The method of claim 69, wherein the objective lens comprises a step provided on a boundary between the first portion and the second portion or between the second portion and the third portion.

72. The method of claim 71, wherein the step is provided on a refracting surface closer to the light source of the objective lens.

73. The method of claim 71, wherein the second portion of the objective lens is indented relative to the first portion of the objective lens.

74. The method of claim 71, wherein the objective lens comprises a step provided on a boundary between the first portion and the second portion, and a step provided on a boundary between the second portion and the third portion, and at least one of the first portion, the second portion and the third portion comprises a concave surface formed by connecting bottoms of two steps.

75. The method of claim 69, wherein the objective lens comprises a protrusion portion at the circumference of the objective lens in the direction perpendicular to the optical axis.

76. The method of claim 69, wherein the objective lens comprises a first step provided on a boundary between the first portion and the second portion and a second step provided on a boundary between the second portion and the third portion, and a depth of the second step being greater than a depth of the first step.

77. The method of claim 69, wherein the objective lens further comprises a fourth portion and a fifth portion, the fifth portion being farther from the optical axis than the third portion, the fourth portion being provided between the third portion and the fifth portion.

78. The method of claim 69, wherein the second portion of the objective lens comprises a hologram or a Fresnel lens.

79. The method of claim 69, wherein the objective lens is made of plastic.

80. The method of claim 69, wherein the second portion has a ring shape having a width representing a circle concentric with the optical axis, and a ratio of the width of the second portion to a radius of the objective lens is about 29%.

81. The method of claim 69, wherein the second portion has a ring shape having a width representing a circle concentric with the optical axis, and a ratio of the width of the second portion to an aperture-stop radius of the objective lens is about 6.7%.

82. The method of claim 69, wherein the second portion has a ring shape having a width representing a circle concentric with the optical axis, and a ratio of the width of the second portion to an aperture-stop radius of the objective lens is about 11.7%.

83. The method of claim 69, wherein the second portion has a ring shape having a width representing a circle concentric with the optical axis, and a ratio of the width of the second portion to an aperture-stop radius of the objective lens is about 6.7% to about 18.3%.

84. The method of claim 69, wherein the second portion has a ring shape having a width representing a circle concentric with the optical axis, and a width of the second portion of the objective lens is about 135 μm.

85. The method of claim 69, wherein the second portion has a ring shape having a width representing a circle concentric with the optical axis, and a ratio of an area of the second portion to an aperture-stop area of the objective lens is about 8.6%.

86. The method of claim 69, wherein the second portion has a ring shape having a width representing a circle concentric with the optical axis, and a ratio of an area of the second portion to an aperture-stop area of the objective lens is about 18.9%.

87. The method of claim 69, wherein a collimated light flux enters the objective lens.

88. The method of claim 69, wherein a divergent light flux enters the objective lens.

89. The method of claim 61, wherein an angle between a normal line at a central position of a surface of the second portion and the optical axis is larger than an angle between a normal line at a central position of a surface interpolated from the first and third portion and the optical axis.

90. The method of claim 61, wherein the first light flux and the third light flux converge on the first information recording plane of the first optical information recording medium, and wherein a spherical aberration curve according to the second portion is positioned under a spherical aberration curve according to the first portion.

91. The method of claim 61, wherein the following condition is satisfied:

$$0.60 \cdot NA2 < NAL < 1.30 \cdot NA2$$

where NA2 represents a numerical aperture on a side of the second optical information recording medium of the converging optical system required for reproducing information recorded in the second optical information recording medium, and NAL represents a numerical aperture in a border portion between the first and second portions.

92. The method of claim 61, wherein the following condition is satisfied:

$$0.60 \cdot NA2 < NAL < 1.30 \cdot NA2$$
$$0.01 < NAH - NAL < 0.12$$

where NA2 represents a numerical aperture on a side of the second optical information recording medium of the converging optical system required for reproducing information recorded in the second optical information recording medium, NAL represents a numerical aperture in a border portion between the first and second portions, and NAH represents a numerical aperture in a border portion between the second and third portions.

93. The method of claim 61, wherein the first portion, the second portion and the third portion define concentric circles.

94. An optical information recording medium reproducing apparatus including an optical pickup apparatus, the optical pickup apparatus comprising:

a light source for emitting light flux;

a converging optical system having an optical axis, a first portion, a second portion, and a third portion, the third portion being farther from the optical axis than the first portion, the second portion being provided between the first portion and the third portion; and an image sensor, wherein the first portion and the third portion are capable of converging the light flux on a first information recording plane of a first optical information recording medium having a first transparent substrate of thickness t1, to reproduce information recorded in the first optical information recording medium, wherein the first portion and the second portion are capable of converging the light flux on a second information recording plane of a second optical information recording medium having a second transparent substrate of thickness t2, to reproduce information recorded in the second optical information recording medium, t2 being greater than t1, and wherein the image sensor is capable of receiving light flux reflected from the first information recording plane or the second information recording plane.

95. The optical information recording medium reproducing apparatus of claim 94, wherein the first optical information recording medium and the second optical information recording medium are optical disks.

96. The optical information recording medium reproducing apparatus of claim 94, wherein t1 is 0.6 mm and t2 is 1.2 mm.

97. The optical information recording medium reproducing apparatus of claim 94, wherein when a refractive index of the first transparent substrate is 1.58, the first portion and the third portion are capable of converging the light flux on the first information recording plane of the first optical information recording medium having the first transparent substrate of thickness t1, to reproduce information recorded in the first optical information recording medium, wherein when the refractive index of the second transparent substrate is 1.58, the first portion and the second portion are capable of converging the light flux on the second information recording plane of the second optical information recording medium having the second transparent substrate of thickness t2, to reproduce information recorded in the second optical information recording medium, and wherein t2 is greater than t1.

98. The optical information recording medium reproducing apparatus of claim 94, wherein when the first portion and the third portion converge the light flux on a first image forming position on the first information recording plane, the second portion converges the light flux on a second image forming position different from the first image forming position and closer to the converging optical system than the first image forming position.

99. The optical information recording medium reproducing apparatus of claim 94, wherein the first portion and the third portion are capable of converging the light flux on the first information recording plane of the first optical information recording medium, so that wave front aberrations on the first information recording plane are not more than 0.05 λrms.

100. The optical information recording medium reproducing apparatus of claim 94, wherein the first portion is capable of converging the light flux on the second information recording plane of the second optical information recording medium, so that the best-fit wave front aberration on the second information recording plane is not more than 0.07 λrms.

101. The optical information recording medium reproducing apparatus of claim 94, wherein the second portion has a ring shape having a width representing a circle concentric with the optical axis.

102. The optical information recording medium reproducing apparatus of claim 94, wherein the converging optical system comprises an objective lens comprising the optical axis, the first portion, the second portion, and the third portion.

103. The optical information recording medium reproducing apparatus of claim 102, wherein the optical pickup apparatus further comprises a moving member for moving the objective lens in the direction of the optical axis, so that the first portion and the third portion converge the light flux on the first information recording plane of the first optical information recording medium, and the first portion and the second portion converge the light flux on the second information recording plane of the second optical information recording medium.

104. The optical information recording medium reproducing apparatus of claim 102, wherein the objective lens comprises a step provided on a boundary between the first portion and the second portion or between the second portion and the third portion.

105. The optical information recording medium reproducing apparatus of claim 104, wherein the step is provided on a refracting surface closer to the light source of the objective lens.

106. The optical information recording medium reproducing apparatus of claim 104, wherein the second portion of the objective lens is indented relative to the first portion of the objective lens.

107. The optical information recording medium reproducing apparatus of claim 104, wherein the objective lens comprises a step provided on a boundary between the first portion and the second portion, and a step provided on a boundary between the second portion and the third portion, and at least one of the first portion, the second portion and the third portion comprises a concave surface formed by connecting bottoms of two steps.

108. The optical information recording medium reproducing apparatus of claim 102, wherein the objective lens comprises a protrusion portion at the circumference of the objective lens in the direction perpendicular to the optical axis.

109. The optical information recording medium reproducing apparatus of claim 102, wherein the objective lens comprises a first step provided on a boundary between the first portion and the second portion and a second step provided on a boundary between the second portion and the third portion, a depth of the second step being greater than a depth of the first step.

110. The optical information recording medium reproducing apparatus of claim 102, wherein the objective lens further comprises a fourth portion and a fifth portion, the fifth portion being farther from the optical axis than the third portion, the fourth portion being provided between the third portion and the fifth portion.

111. The optical information recording medium reproducing apparatus of claim 102, wherein the second portion of the objective lens comprises a hologram or a Fresnel lens.

112. The optical information recording medium reproducing apparatus of claim 102, wherein the objective lens is made of plastic.

113. The optical information recording medium reproducing apparatus of claim 102, wherein the second portion has a ring shape having a width representing a circle concentric with the optical axis, and a ratio of the width of the second portion to a radius of the objective lens is about 29%.

114. The optical information recording medium reproducing apparatus of claim 102, wherein the second portion has a ring shape having a width representing a circle concentric with the optical axis, and a ratio of the width of the second portion to an aperture-stop radius of the objective lens is about 6.7%.

115. The optical information recording medium reproducing apparatus of claim 102, wherein the second portion has a ring shape having a width representing a circle concentric with the optical axis, and a ratio of the width of the second portion to an aperture-stop radius of the objective lens is about 11.7%.

116. The optical information recording medium reproducing apparatus of claim 102, wherein the second portion has a ring shape having a width representing a circle concentric with the optical axis, and a ratio of the width of the second portion to an aperture-stop radius of the objective lens is about 6.7% to about 18.3%.

117. The optical information recording medium reproducing apparatus of claim 102, wherein the second portion has a ring shape having a width representing a circle concentric with the optical axis, and a width of the second portion of the objective lens is about 135 $\mu$m.

118. The optical information recording medium reproducing apparatus of claim 102, wherein the second portion has a ring shape having a width representing a circle concentric with the optical axis, and a ratio of an area of the second portion to an aperture-stop area of the objective lens is about 8.6%.

119. The optical information recording medium reproducing apparatus of claim 102, wherein the second portion has a ring shape having a width representing a circle concentric with the optical axis, and a ratio of an area of the second portion to an aperture stop area of the objective lens is about 18.9%.

120. The optical information recording medium reproducing apparatus of claim 102, wherein a collimated light flux enters the objective lens.

121. The optical information recording medium reproducing apparatus of claim 102, wherein a divergent light flux enters the objective lens.

122. The optical information recording medium reproducing apparatus of claim 94, wherein an angle between a normal line at a central position of a surface of the second portion and the optical axis is larger than an angle between a normal line at a central position of a surface interpolated from the first and third portion and the optical axis.

123. The optical information recording medium reproducing apparatus of claim 94, wherein the first portion and the third portion converge the light flux on the first information recording plane of the first optical information recording medium, and wherein a spherical aberration curve according to the second portion is positioned under a spherical aberration curve according to the first portion.

124. The optical information recording medium reproducing apparatus of claim 94, wherein the following condition is satisfied:

$$0.60 \cdot NA2 < NAL < 1.30 \cdot NA2$$

where NA2 represents a numerical aperture on a side of the second optical information recording medium of the converging optical system required for reproducing information recorded in the second optical information recording medium, and NAL represents a numerical aperture in a border portion between the first and second portions.

125. The optical information recording medium reproducing apparatus of claim 94, wherein the following condition is satisfied:

$$0.60 \cdot NA2 < NAL < 1.30 \cdot NA2$$

$$0.01 < NAH - NAL < 0.12$$

where NA2 represents a numerical aperture on a side of the second optical information recording medium of the converging optical system required for reproducing information recorded in the second optical information recording medium, NAL represents a numerical aperture in a border portion between the first and second portions, and NAH represents a numerical aperture in a border portion between the second and third portions.

126. The optical information recording medium reproducing apparatus of claim 94, wherein the first portion, the second portion and the third portion define concentric circles.

* * * * *